US010232369B2

(12) United States Patent
Turner et al.

(10) Patent No.: US 10,232,369 B2
(45) Date of Patent: Mar. 19, 2019

(54) DISPOSABLE FLUIDIC CARTRIDGE AND COMPONENTS

(71) Applicant: Biological Dynamics, Inc., San Diego, CA (US)

(72) Inventors: Robert Turner, San Diego, CA (US); James Madsen, San Diego, CA (US); Kai Yang, San Diego, CA (US); Juan Pablo Hinestrosa Salazar, San Diego, CA (US); Raj Krishnan, San Diego, CA (US); Pedro David Simon Herrera, San Diego, CA (US)

(73) Assignee: BIOLOGICAL DYNAMICS, INC., San Diego, CA (US)

( * ) Notice: Subject to any disclaimer, the term of this patent is extended or adjusted under 35 U.S.C. 154(b) by 0 days.

(21) Appl. No.: 15/469,406

(22) Filed: Mar. 24, 2017

(65) Prior Publication Data

US 2017/0274378 A1 Sep. 28, 2017

Related U.S. Application Data

(60) Provisional application No. 62/313,120, filed on Mar. 24, 2016.

(51) Int. Cl.

| | |
|---|---|
| ***B01L 3/00*** | (2006.01) |
| ***G01N 15/06*** | (2006.01) |
| ***G01N 35/00*** | (2006.01) |

(52) U.S. Cl.

CPC ....... *B01L 3/502715* (2013.01); *B01L 3/5027* (2013.01); *B01L 2200/0684* (2013.01); *B01L 2200/0689* (2013.01); *B01L 2200/16* (2013.01); *B01L 2300/023* (2013.01); *B01L 2300/027* (2013.01); *B01L 2300/041* (2013.01); *B01L 2300/0645* (2013.01); *B01L 2300/0654* (2013.01); *B01L 2300/0681* (2013.01); *B01L 2300/0861* (2013.01); *B01L 2300/165* (2013.01); *B01L 2300/168* (2013.01);

(Continued)

(58) Field of Classification Search

CPC ................................ G01N 15/06; G01N 35/00
USPC .......... 422/68.1, 502, 503, 504; 436/43, 180
See application file for complete search history.

(56) References Cited

U.S. PATENT DOCUMENTS

| | | |
|---|---|---|
| 5,632,957 A | 5/1997 | Heller et al. |
| 5,958,791 A | 9/1999 | Roberts et al. |

(Continued)

FOREIGN PATENT DOCUMENTS

| | | |
|---|---|---|
| CN | 1337580 A | 2/2002 |
| CN | 1348100 A | 5/2002 |

(Continued)

OTHER PUBLICATIONS

Asbury et al. Trapping of DNA by dielectrophoresis. Electrophoresis 23:2658-2666 (2002).

(Continued)

*Primary Examiner* — Brian J. Sines
(74) *Attorney, Agent, or Firm* — Wilson Sonsini Goodrich & Rosati

(57) ABSTRACT

Disclosed are cartridge components, cartridges, systems, and methods for isolating analytes from biological samples. In various aspects, the cartridge components, cartridges, systems, and methods may allow for a rapid procedure that requires a minimal amount of material from complex fluids.

28 Claims, 24 Drawing Sheets

(52) U.S. Cl.
CPC .................. *B01L 2400/0424* (2013.01); *B01L 2400/0487* (2013.01); *B01L 2400/0638* (2013.01); *B01L 2400/0694* (2013.01)

(56) References Cited

U.S. PATENT DOCUMENTS 6,149,789 A 11/2000 Benecke et al.
6,203,683 B1 3/2001 Austin et al.
6,280,590 B1 8/2001 Cheng et al.
6,289,590 B1 9/2001 McDonald
6,294,063 B1 9/2001 Becker et al.
6,403,367 B1 6/2002 Cheng et al.
6,557,575 B1* 5/2003 Gerhardt ........... B01L 3/502738 137/13
6,749,736 B1 6/2004 Fuhr et al.
6,824,664 B1 11/2004 Austin et al.
6,887,362 B2 5/2005 Huang et al.
7,081,189 B2 7/2006 Squires et al.
7,105,081 B2 9/2006 Gascoyne et al.
7,709,262 B2 5/2010 Cantor et al.
8,425,750 B2 4/2013 Sugioka
8,603,791 B2 12/2013 Krishnan et al.
8,815,554 B2 8/2014 Krishnan et al.
8,815,555 B2 8/2014 Krishnan et al.
8,871,481 B2 10/2014 Krishnan et al.
8,877,470 B2 11/2014 Krishnan et al.
8,932,447 B2 1/2015 Heller et al.
8,932,815 B2 1/2015 Krishnan et al.
8,969,059 B2 3/2015 Krishnan et al.
9,005,941 B2 4/2015 Krishnan et al.
9,034,578 B2 5/2015 Krishnan et al.
9,034,579 B2 5/2015 Krishnan et al.
9,206,416 B2 12/2015 Krishnan et al.
9,387,489 B2 7/2016 Charlot et al.
9,499,812 B2 11/2016 Krishnan et al.
9,918,702 B2 3/2018 Tariyal et al.
2001/0045359 A1 11/2001 Cheng et al.
2002/0036142 A1 3/2002 Gascoyne et al.
2003/0146100 A1 8/2003 Huang et al.
2004/0011651 A1 1/2004 Becker et al.
2004/0052689 A1 3/2004 Yao
2004/0178068 A1 9/2004 Gascoyne et al.
2004/0238052 A1 12/2004 Karp et al.
2006/0063183 A1 3/2006 Segawa et al.
2006/0096367 A1 5/2006 Meyer et al.
2006/0102482 A1 5/2006 Auerswald et al.
2006/0257993 A1* 11/2006 McDevitt .......... B01L 3/502715 435/287.2
2006/0289341 A1 12/2006 Muller et al.
2007/0080062 A1 4/2007 Harnett et al.
2007/0095669 A1 5/2007 Lau et al.
2007/0107910 A1 5/2007 McGuire et al.
2007/0125650 A1 6/2007 Scurati et al.
2007/0131554 A1 6/2007 Yu et al.
2007/0141605 A1 6/2007 Vann et al.
2007/0152206 A1 7/2007 Cho et al.
2007/0240495 A1 10/2007 Hirahara
2007/0284254 A1 12/2007 Cho et al.
2007/0289341 A1 12/2007 Hollenhorst et al.
2008/0120278 A1 5/2008 Roe et al.
2009/0314644 A1 12/2009 Golan et al.
2009/0325813 A1 12/2009 Wang et al.
2010/0155246 A1 6/2010 Schnelle et al.
2011/0009724 A1 1/2011 Hill et al.
2011/0108422 A1 5/2011 Heller et al.
2011/0139620 A1 6/2011 Stumber et al.
2012/0048403 A1 3/2012 Chappel et al.
2012/0110620 A1 5/2012 Kilar et al.
2013/0260372 A1 10/2013 Buermann et al.
2013/0273640 A1 10/2013 Krishnan et al.
2014/0054172 A1 2/2014 Jonsson et al.
2014/0093871 A1 4/2014 Shieh et al.
2014/0206412 A1 7/2014 DeJohn et al.
2014/0296089 A1* 10/2014 Holmes ................ G01N 35/026 506/9
2014/0367260 A1 12/2014 Dickerson et al.
2015/0004077 A1 1/2015 Wikswo et al.
2015/0136604 A1 5/2015 Nielsen et al.
2015/0197784 A1 7/2015 Williams et al.
2015/0219618 A1 8/2015 Krishnan et al.
2015/0301031 A1* 10/2015 Zin .................. G01N 33/48792 436/164
2016/0175840 A1* 6/2016 Ingber ............... B01L 3/502707 422/502
2016/0232562 A1 8/2016 Esayian et al.
2016/0271622 A1* 9/2016 Charlot ................... B03C 5/005
2017/0039344 A1 2/2017 Bitran et al.
2017/0072395 A1 3/2017 Krishnan et al.
2017/0137870 A1 5/2017 Krishnan et al.
2017/0184545 A1 6/2017 Azpiroz et al.
2017/0229149 A1 8/2017 Rothschild et al.

FOREIGN PATENT DOCUMENTS

| | | | |
|---|---|---|---|
| CN | 102320559 | A | 1/2012 |
| EP | 1775589 | A1 | 4/2007 |
| JP | 2001500252 | A | 1/2001 |
| JP | 2002502047 | A | 1/2002 |
| JP | 2004532968 | A | 10/2004 |
| JP | 2008298575 | A | 12/2008 |
| JP | 2011516867 | A | 5/2011 |
| WO | WO-9804355 | A1 | 2/1998 |
| WO | WO-9938612 | A1 | 8/1999 |
| WO | WO-0196025 | A2 | 12/2001 |
| WO | WO-2005012872 | A2 | 2/2005 |
| WO | WO-2005121767 | A1 | 12/2005 |
| WO | WO-2006018981 | A1 | 2/2006 |
| WO | WO-2007107910 | A1 | 9/2007 |
| WO | WO-2009146143 | A2 | 12/2009 |
| WO | WO-2014015187 | A1 | 1/2014 |
| WO | WO-2014028222 | A1 | 2/2014 |
| WO | WO-2015157217 | A1 | 10/2015 |
| WO | WO-2015196141 | A1 | 12/2015 |
| WO | WO-2017165852 | A1 | 9/2017 |

OTHER PUBLICATIONS

Asbury et al. Trapping of DNA in Nonuniform Oscillating Electric Fields. Biophys J. 74:1024-1030 (1998).
Becker et al. Separation of Human Breast Cancer Cells From Blood by Differential Dielectric Affinity. Proceedings of the National Academy of Sciences 92:860-864 (1995).
Becker et al. The removal of human leukemia cells from blood using interdigitated microelectrodes. J Phys. D: Appl. Phys. 27:2659-2662 (1994).
Bettegowda et al. Detection of Circulating Tumor DNA in Early- and Late-Stage Human Malignancies. Sci Transl Med. 6:224 (2014).
Board et al. DNA Methylation in Circulating Tumour DNA as a Biomarker for Cancer. Biomark Insights 2:307-319 (2007).
Board et al. Isolation and extraction of circulating tumor DNA from patients with small cell lung cancer. Ann. N. Y. Acad. Sci. 1137:98-107 (Aug. 2008).
Cairns. Detection of promoter hypermethylation of tumor suppressor genes in urine from kidney cancer patients. Ann N Y Acad Sci. 1022:40-43 (Jun. 2004).
Casciano et al. Circulating Tumor Nucleic Acids: Perspective in Breast Cancer. Breast Care 5:75-80 (2010).
Catarino et al. Quantification of Free circulating tumor DNA as a diagnostic marker for breast cancer. DNA Cell Biol. 27(8):415-421 (Aug. 2008).
Chan. Circulating EBV DNA as a tumor marker for nasopharyngeal carcinoma. Semin Cancer Biol. 12(6):489-496 (Dec. 2002).
Chan et al. Persistent Aberrations in Circulating DNA Integrity after Radiotherapy are Associated with Poor Prognosis in Nasopharyngeal Carcinoma Patients. Clinical Cancer Research 14(13):4141-4145 (2008).
Chan et al. Quantitative Analysis of Circulating Methylated DNA as a Biomarker for Hepatocellular Carcinoma. Clinical Chemistry 54(9):1528-1536 (2008).

(56) References Cited

OTHER PUBLICATIONS

Chan et al. Radiological, pathological and DNA remission in recurrent metastatic nasopharyngeal carcinoma. BMC Cancer 6:259 (Oct. 31, 2006).
Chan et al. Nasopharyngeal carcinoma. Annals of Oncology 13:1007-1015 (2002).
Cheng et al. Isolation of Cultured Cervical Carcinoma Cells Mixed with Peripheral Blood Cells on a Bioelectronic Chip. Analytical Chemistry 70(11):2321-2326 (1998).
Cheng et al. Preparation and Hybridization Analysis of DNA/A from *E. coli* on Microfabricated Bioelectronic Chips. Nature Biotechnology 16:541-546 (1998).
Cheng et al. Quantification of circulating cell-free DNA in the plasma of cancer patients during radiation therapy. Cancer Science 100(2):303-309 (Feb. 2009).
Chuang et al. Detectable BRAF mutation n serum DNA samples from patients with papillary thyroid carcinomas. Head Neck 32(2):229-234 (2010).
Chun et al. Circulating tumour-associated plasma DNA represents an independent and informative predictor of prostate cancer. BJU International 98(3):544-548 (2006).
Combaret et al. Circulating MYCN DNA as a Tumor-specific Marker in Neuroblastoma Patients. Cancer Research 62:3646-3648 (Jul. 1, 2002).
Cortese et al. Epigenetic markers of prostate cancer in plasma circulating DNA. Human Molecular Genetics 21:3619-3631 (2012).
Da Silva et al. Circulating cell-free DNA in serum as a biomarker of colorectal cancer. Journal of Clinical Pathology 66(9):775-778 (Sep. 2013).
Daniotti et al. Detection of mutated BRAFV600E variant in circulating DNA of stage III-IV melanoma patients. Int. J. Cancer 120:2439-2444 (Jun. 1, 2007).
Dawson et al. Analysis of Circulating Tumor DNA to Monitor Metastatic Breast Cancer. The New England Journal of Medicine 368(13):1199-1209 (Mar. 28, 2013).
De Maio et al. Circulating and stool nucleic acid analysis for colorectal cancer diagnosis. World Journal of Gastroenterology 20(4):957-967 (Jan. 28, 2014).
Delgado. Characterization of cell-free circulating DNA in plasma in patients with prostate cancer. Tumor Biol. 34(2):983-986 (Apr. 2013).
Deligezer et al. Effect of adjuvant chemotherapy on integrity of free serum DNA in patients with breast cancer. Ann N Y Acad Sci. 1137:175-179 (Aug. 2008).
Devos et al. Circulating Methylated SEPT9 DNA in Plasma is a Biomarker for Colorectal Cancer. Clinical Chemistry 55(7):1337-1346 (Jul. 2009).
Dobrzycka. Circulating free DNA and p53 antibodies in plasma of patients with ovarian epithelial cancers. Annals of Oncology 22(5):1133-1140 (May 2011).
Dobrzycka. Circulating free DNA, p53 antibody and mutations of KRAS gene in endometrial cancer. 127(3):612-621 (Aug. 1, 2010).
El Tarhouny et al. Comparison of serum VEGF and its soluble receptor sVEGFR1 with serum cell-free DNA in patients with breast tumor. Cytokine 44(1):65-69 (Oct. 2008).
Ellinger et al. Cell-free circulating DNA: diagnostic value in patients with testicular germ cell cancer. J. Urol. 181(1):363-371 (Jan. 2009).
Ellinger et al. CpG island hypermethylation of cell-free circulating serum DNA in patients with testicular cancer. J. Urol. 182(1):324-329 (Jul. 2009).
Ellinger et al. Noncancerous PTGS2 DNA fragments of apoptotic origin in sera of prostate cancer patients qualify as diagnostic and prognostic indicators. Int. J. Cancer 122(1):138-143 (Jan. 1, 2008).
Elshimali et al. The Clinical Utilization of Circulating Cell Free DNA (CCFDNA) in Blood of Cancer Patients. Int. J. Mol. Sci. 14(9):18925-18958 (Sep. 13, 2013).
Fuhr et al. Cell manipulation and cultivation under a.c. electric field influence in highly conductive culture media. Biochimica et Biophysica Acta 1201:353-360 (1994).
Gahan et al. Circulating nucleic acids in plasma and serum: diagnosis and prognosis in cancer. EPMA Journal 1(3):503-512 (Sep. 2010).
Ganepola et al. Use of blood-based biomarkers for early diagnosis and surveillance of colorectal cancer. World Journal of Gastrointestinal Oncology 6(4):83-97 (Apr. 15, 2014).
Gautschi et al. Circulating deoxyribonucleic Acid as prognostic marker in non-small-cell lung cancer patients undergoing chemotherapy. J Clin Oncol. 22(20):4157-4164 (2004).
Goessl et al. DNA Alterations in Body Fluids as Molecular Tumor Markers for Urological Malignancies. European Urology 41(6):668-676 (Jun. 2002).
Goodard et al. Handbook of Nanoscience. 2nd edition.Ch 16, p. 5-8 (2007).
Gornik et al. Free serum DNA is an early predictor of severity of acute pancreatitis. Clin Biochem. 42(1-2):38-43 (Jan. 2009).
Green et al. Ac electrokinetics: a survey of sub-micrometre paricle dynamics. J. Phys. D: Appl. Phys. 33:632-641 (2000).
Guan et al. Analysis of circulating DNA level in the plasma of cervical cancer patients. Nan fang Yi Ke Da Xue Xue Bao 28(9):1663-1667 (Aug. 2008) (English Abstract).
Haeberle et al. Centrifugal extraction of plasma from whole blood on a rotating disk. Lab Chip 6(6):776-781 (2006).
Hashad et al. Free circulating tumor DNA as a diagnostic marker for breast cancer. J Clin Lab Anal. 26(6):467-472 (Nov. 2012).
Higgins et al. Variant Ciz1 is a circulating biomarker for early-stage lung cancer. PNAS USA 109(45):E3128-3135 (Nov. 6, 2012).
Higuchi. Chromosomal DNA fragmentation inapoptosis and necrosis induced by oxidative stress. Biochem Pharacol. 66:1527-1535(2003).
Higuchi et al. Appearance of 1-2 Mbp giant DNA fragments as an early common response leading to cell death induced by various substances that cause oxidative stress. Free Radical Biology & Medicine 23:90-99 (1997).
Hoffmann et al. Methylated DAPK and APC promoter DNA detection in peripheral blood is significantly associated with apparent residual tumor and outcome. J Cancer Res Clin Oncol. 135(89):1231-1237 (Sep. 2009).
Hoffmann et al. Universal protocol for grafting PCR primers onto various lab-on-a-chip substrates for solid-phase PCR. RSC Advances 2:3885-3889 (2012).
Hohaus et al. Cell-free circulating DNA in Hodgkin's and non-Hodgkin's lymphomas. Annals of Oncology 20(8):1408-1413 (2009).
Holdhoff et al. Blood-based biomarkers for malignant gliomas. J Neurooncol 113:345-352 (2013).
Holzel et al. Trapping Single Molecules by Dielectrophoresis. Phys. Rev. Left. 95:128102 (2005).
Hosny et al. Ser-249 TP53 and CTNNB1 mutations in circulating free DNA of Egyptian patients with hepatocellular carcinoma versus chronic liver diseases. Cancer Lett. 264(2):201-208 (Jun. 18, 2008).
Huang et al. Dielectrophoretic Cell Separation and Gene Expression Profiling on Microelectronic Chip Arrays. Analytical Chem. 74:3362-3371 (2002).
Huang et al. Electric Manipulation of Bioparticles and Macromolecules on Microfabricated Electrodes. Analytical Chemistry (73):1549-1559 (2001).
Huang et al. Functionalization of Surfaces by Water-Accelerated Atom-Transfer Radical Polymerization of Hydroxyethyl Methacrylate and Subsequent Derivatization. Macromolecules 35:1175-1179 (2002).
Hughes et al. Dielectrophoretic Characterization and Separation of Antibody-Coated Submicrometer Latex Spheres. Anal Chem 71:3441-3445 (1999).
Hughes et al. Dielectrophoretic Manipulation and Characterization of Herpes Simplex Virus-1 Capsids. Eur Biophys J 30:268-272 (2001).
Hughes. Nanoparticle Manipulation by Electrostatic Forces. Handbook of Nanoscience, Engineering and Technology 2nd Ed., WA Goddard III, DW Brenner, S. Lyshenski & G. Iafrate (eds.) (CRC Press 2007), pp. 16-1 to 16-32.
Hughes. Strategies for Dielectrophoretic Separation in Laboratory-on-a-chip Systems. Electrophoresis 23:2569-2582 (2002).

(56) References Cited

OTHER PUBLICATIONS

Iida et al. Relation between serum levels of cell-free DNA and inflammation status in hepatitis C virus-related hepatocellular carcinoma. Oncology Reports 20(4):761-765 (Oct. 2008).
Iizuka et al. Elevated Levels of Circulating Cell-free DNA in the Blood of Patients with Hepatitis C Virus-associated Hepatocellular Carcinoma. Anticancer Research 26(6C):4713-4720 (2006).
Jiang et al. Dynamic monitoring of plasma circulating DNA in patients with acute myeloid leukemia and its clinical significance. Zhingguo Shi Yan Xue Ye Xue Za Zhi 20(1):53-56 (Feb. 2012) (Abstract).
Jiang et al. Increased plasma DNA integrity index in head and neck cancer patients. Int. J. Cancer 119(11):2673-2676 (Dec. 2006).
Jin et al. Circulating DNA—Important Biomarker of Cancer. Journal of Molecular Biomarkers & Diagnosis S2 (2012) (7 pgs.).
Kakimoto et al. Microsatellite analysis of serum DNA in patients with oral squamous cell carcinoma. Oncology Reports 20(5):1195-1200 (Nov. 2008).
Kolesnikova et al. Circulating DNA in the blood of gastric cancer patients. Ann N Y Acad Sci. 1137:226-231 (Aug. 2008).
Krishnan et al. Alternating current electrokinetic separation and detection of DNA nanoparticles in high-conductance solutions. Electrophoresis 29(9):1765-1774 (2008).
Krishnan et al. An AC electrokinetic method for enhanced detection of DNA nanoparticles. J. Biophotonics 2(4):253-261 (2009).
Krishnan et al. Interaction of nanoparticles at the DEP microelectrode interface under high conductance conditions. Electrochem. Comm. 11(8):1661-1666 (2009).
Kuhlmann et al. LOH at 6q and 10q in fractionated circulating DNA of ovarian cancer patients is predictive for tumor cell spread and overall survival. BMC Cancer 12:3525 (Jul. 31, 2012).
Lavon et al. Serum DNA can define tumor-specific genetic and epigenetic markers in gliomas of various grades. Neuro-Oncology 12(2):173-180 (2010).
Lee et al. Methylation of TMEFF2 Gene in Tissue and Serum DNA from Patients with Non-Small Cell Lung Cancer. Molecules and Cells 34(2):171-176 (Aug. 31, 2012).
Liggett et al. Differential Methylation of Cell-Free Circulating DNA Among Patients With Pancreatic Cancer Versus Chronic Pancreatitis. Cancer 116(7):1674-1680 (Apr. 1, 2010).
Liggett et al. Methylation patterns in cell-free plasma DNA reflect removal of the primary tumor and drug treatment of breast cancer patients. Int. J. Cancer 128(2):492-499 (Jan. 15, 2011).
Lo Nigro et al. Methylated Tissue Factor Pathway Inhibitor 2 (TFPI2) DNA in Serum is a Biomarker of Metastatic Melanoma. Journal of Investigative Dermatology 133(5):1278-1285 (May 2013).
Lofton-Day et al. DNA Methylation Biomarkers for Blood-Based Colorectal Cancer Screening. Clinical Chemistry 54(2):414-423 (Feb. 2008).
Ma et al. Detection of circulating hypermethylated tumor-specific RASSF1A DNA in ovarian cancer patients. Zhonghua Bing Li Xue Za Zhi. 34(12):785-787 (Dec. 2005) (Abstract).
Ma et al. Methylated DNA and microRNA in Body Fluids as Biomarkers for Cancer Detection. International Journal of Molecular Sciences 14(5):10307-10331 (May 16, 2013).
Majchrzak et al. Detection of MGMT, RASSF1A, p15INK4B, and p14ARF promoter methylation in circulating tumor-derived DNA of central nervous system cancer patients. J. Appl. Genetics 54:335-344 (2013).
Melnikov et al. Methylation profile of circulating plasma DNA in patients with pancreatic cancer. J Surg Oncol. 99(2):119-122 (Feb. 2009).
Menachery et al. Controlling cell destruction using dielectrophoretic forces. IEE Proc.-Nanobiotechnol. 152(4):145-149 (2005).
Mirza et al. Clinical significance of promoter hypermethylation of ERβ and RARβ2 in tumor and serum DNA in Indian breast cancer patients. Ann Surg Oncol. 19(9):3107-3115 (Sep. 2012).
Misale et al. Emergence of KRAS mutations and acquired resistance to anti EGFR therapy in colorectal cancer. Nature 486(7404):532-536 (Jun. 28, 2012).
Misawa et al. RASSF1A hypermethylation in pretreatment serum DNA of neuroblastoma patients: a prognostic marker. British Journal of Cancer 100:399-404 (2009).
Morgan et al. Separation of Sub micron Bioparticles by Dielectrophoresis Biophysical Journal. 77:516-525 (1999).
Mouliere et al. Circulating Cell-Free DNA from Colorectal Cancer Patients May Reveal High KRAS or BRAF Mutation Load. Translational Oncology 6(3):319-328 (Jun. 2013).
Muller et al. DNA Methylation in Serum of Breast Cancer Patients: An Independent Prognostic Marker. Cancer Research 63(22):7641-7645 (Nov. 15, 2003).
Muller et al. Identification of Loss of Heterozygosity on Circulating Free DNA in Peripheral Blood of Prostate Cancer Patients: Potential and Technical Improvements. Clinical Chemistry 54(4):688-696 (Apr. 2008).
Nakagawa et al. Fabrication of amino Silane-Coated Microchip for DNA extraction from Whole Blood. Journal of Biotechnology 116(2):105-111 (2005).
Nakamoto et al. Detection of Microsatellite Alterations in Plasma DNA of Malignant Mucosal Melanoma Using Whole Genome Amplification. Bull Tokyo Dent. Coll. 49(2):77-87 (May 2008).
Nakamura et al. Application of a Highly Sensitive Detection System for Epidermal Growth Factor Receptor Mutations in Plasma DNA. Journal of Thoracic Oncology 7(9):1369-1381 (Sep. 2012).
Nakayama et al. A Highly Sensitive Method for the Detection of p16 Methylation in the Serum of Colorectal Cancer Patients. Anticancer Research 27(3B):1459-1464 (2007).
Page et al. Detection of HER2 amplification in circulating free DNA in patients with breast cancer. British Journal of Cancer 104:1342-1348 (2011).
Pang et al. Microsatellite alterations of circulating DNA in the plasma of patients with hepatocellular carcinoma. Zhonghua Yi Xue Za Zhi. 86(24):1662-1665 (Jun. 27, 2006) (Abstract).
Papadopoulou et al. Cell-free DNA and RNA in Plasma as a New Molecular Marker for Prostate and Breast Cancer, Ann. NY, Acad. Sci. 1075:235-243 (2006).
PCT/US2009/039565 International Preliminary Report on Patentability and Written Opinion dated Oct. 5, 2010.
PCT/US2009/039565 International Search Report dated Dec. 23, 2009.
PCT/US2013/036845 International Preliminary Report on Patentability and Written Opinion dated Oct. 30, 2014.
PCT/US2013/036845 International Search Report and Written Opinion dated Aug. 6, 2013.
PCT/US2013/051158 International Preliminary Report on Patentability dated Jan. 20, 2015.
PCT/US2013/051158 International Search Report and Written Opinion dated Nov. 14, 2013.
PCT/US2015/024624 International Preliminary Report on Patentability dated Oct. 20, 2016.
PCT/US2015/024624 International Search Report and Written Opinion dated Aug. 21, 2015.
PCT/US2015/036789 International Preliminary Report on Patentability dated Dec. 29, 2016.
PCT/US2015/036789 International Search Report and Written Opinion dated Sep. 29, 2015.
Pethig. Dielectrophoresis: Using Inhomogenous AC Electrical Fields to Separate and Manipulate Cells, CRC Critical Reviews in Biotechnology, CRC Press, Boca Raton, FL, US. 16(4):331-348 (Jan. 1, 1996).
Ponomaryova et al. Potentialities of aberrantly methylated circulating DNA for diagnostics and post-treatment follow-up of lung cancer patients. Lung Cancer. 81(3):397-403 (Sep. 2013).
Ramos et al. Ac electrokinetics: a review of forces in microelectrode structures. J Phys. D: Appl. Phys. 31:2338-2353 (1998).
Ren et al. Circulating DNA level is negatively associated with the long-term survival of hepatocellular carcinoma patients. World Journal of Gastroenterology 12(24):3911-3914 (Jun. 28, 2006).
Sai et al. Quantification of Plasma Cell-free DNA in Patients with Gastric Cancer. Anticancer Research 27(4C):2747-2752 (2007).
Sakakura et al. Quantitative Analysis of Tumor-derived Methylated RUNX3 Sequences in the Serum of Gastric Cancer Patients. Anticancer Research 29:2619-2626 (2009).

(56) References Cited

OTHER PUBLICATIONS

Salkeni et al. Detection of EGFRvIII mutant DNA in the peripheral blood of brain tumor patients. J. Neurooncol. 115(1):27-35 (Oct. 2013).
Sawabu et al. Serum tumor markers and molecular biological diagnosis in pancreatic cancer. Pancreas 28(3):263-267 (Apr. 2004).
Schwarzenbach. Detection and monitoring of cell-free DNA in blood of patients with colorectal cancer. Ann N Y Acad Sci. 1137:190-196 (Aug. 2008).
Schwarzenbach. Loss of Heterozygosity at Tumor Suppressor Genes Detectable on Fractionated Circulating Cell-Free Tumor DNA as Indicator of Breast Cancer Progression. Clinical Cancer Research 18:5719-5730 (Sep. 25, 2012).
Sharma et al. DNA methylation of circulating DNA: a marker for monitoring efficacy of neoadjuvant chemotherapy in breast cancer patients. Tumour Biol. 33(6):1837-1843 (Dec. 2012).
Shaw et al. Genomic analysis of circulating cell-free DNA infers breast cancer dormancy. Genome Research 22(2):220-231 (Feb. 2012).
Sonnenberg et al. Dielectrophoretic Isolation of DNA and Nonoparticles from Blood. Electrophoresis 33(16):2482-2490 (2012).
Sorenson. Detection of Mutated KRAS2 Sequences as Tumor Markers in Plasma/Serum of Patients with Gastrointestinal Cancer. Clin Cancer Res 6:2129-2137 (2000).
Sosnowski et al. Rapid determination of single base mismatch mutations in DNA hybrids by direct electric field control. PNAS USA 94:1119-1123 (Feb. 1997).
Stephens et al. The dielectrophoresis enrichment of CD34+ cells from peripheral blood stern cell harvests. Bone Marrow Transplant. 18:777-782 (1996).
Stroun et al. Isolation and characterization of DNA from the plasma of cancer patients. Eur J Cancer Clin Oneol 23:707-712 (1987).
Swanson. A fully multiplexed CMOS biochip for DNA analysis. Sensors and Actuators B 64:22-30 (Jun. 2000).
Tamkovich et al. Cell-surface-bound circulating DNA as a prognostic factor in lung cancer. Ann N Y Acad Sci. 1137:214-217 (Aug. 2008).
Tanaka et al. Role of circulating free alu DNA in endometrial cancer. Int J Gynecol Cancer 22(1):82-86 (Jan. 2012).
Tangkijvanich et al. Serum LINE-1 hypomethylation as a potential prognostic marker for hepatocellular carcinoma. Clin Chim Acta. 379(1-2):127-133 (Apr. 2007).
Tani et al. An early detection of recurrence using reverse transcriptase-polymerase chain reaction (RT-PCP) and methylation-specific plymerase chain reaction (MSP) from peripheral blood in patients after gastrectomy. Gan to Kagaku Ryoho 33(12):1720-1722 (Nov. 2006) (Abstract).
Tomita et al. Quantification of Circulating Plasma DNA Fragments as Tumor Markers in Patients with Esophageal Cancer, Anticancer Research 27(4C):2737-2742 (2007).
Toner et al. Blood-on-a-chip. Annual Review of Biomedical Engineering 7:77-103 (2005).
Tong et al. Diagnostic developments involving cell-free (circulating) nucleic acids. Clinica Chimica Acta. 363:187-96 (2006).
Toth et al. Free circulating DNA based colorectal cancer screening from peripheral blood: the possibility of the methylated septin 9 gene marker. Orv. Hetil. 150(21):969-977(May 24, 2009) (English Abstract).
Trevisiol et al. Prognostic value of circulating KRAS2 gene mutations in colorectal cancer with distant metastases. Int J Biol Markers. 21(4):223-228 (Oct.-Dec. 2006).
Tuukanen et al. Carbon nanotubes as electrodes for dielectrophoresis of DNA. Nano Letters. 6:1339-1343 (2006).
Umetani et al. Increased Integrity of Free Circulating DNA in Sera of Patients with Colorectal or Periampullary Cancer: Direct Quantitative PCR for ALU Repeats. Clinical Chemistry 52(6):1062-1069 (Jun. 2006).
Umetani et al. Prediction of Breast Tumor Progression by Integrity of Free Circulating DNA in Serum. Journal of Clinical Oncology 24(26):4270-4276 (Sep. 10, 2006).
U.S. Appl. No. 12/936,147 Office Action dated Apr. 27, 2015.
U.S. Appl. No. 12/936,147 Office Action dated Aug. 12, 2015.
U.S. Appl. No. 12/936,147 Office Action dated Dec. 11, 2012.
U.S. Appl. No. 12/936,147 Office Action dated Jul. 18, 2013.
U.S. Appl. No. 12/936,147 Office Action dated Mar. 17, 2017.
U.S. Appl. No. 12/936,147 Office Action dated Oct. 31, 2012.
U.S. Appl. No. 12/936,147 Office Action dated Sep. 22, 2016.
U.S. Appl. No. 13/864,179 Office Action dated Aug. 15, 2013.
U.S. Appl. No. 14/063,884 Office Action dated Aug. 28, 2014.
U.S. Appl. No. 14/063,884 Office Action dated Feb. 12, 2014.
U.S. Appl. No. 14/067,841 Office Action dated Mar. 16, 2015.
U.S. Appl. No. 14/194,566 Office Action dated May 15, 2014.
U.S. Appl. No. 14/201,715 Office Action dated May 15, 2014.
U.S. Appl. No. 14/201,726 Office Action dated May 16, 2014.
U.S. Appl. No. 14/271,337 Office Action dated Jun. 12, 2014.
U.S. Appl. No. 14/311,037 Office Action dated Sep. 5, 2014.
U.S. Appl. No. 14/415,546 Office Action dated Apr. 28, 2016.
U.S. Appl. No. 14/415,546 Office Action dated Oct. 7, 2016.
U.S. Appl. No. 14/477,800 Office Action dated Dec. 15, 2014.
U.S. Appl. No. 14/477,800 Office Action dated Feb. 2, 2015.
U.S. Appl. No. 14/509,022 Office Action dated Jan. 15, 2015.
U.S. Appl. No. 14/512,356 Office Action dated Feb. 5, 2015.
U.S. Appl. No. 14/680,819 Office Action dated Dec. 3, 2015.
U.S. Appl. No. 14/925,157 Office Action dated Mar. 22, 2016.
U.S. Appl. No. 15/171,876 Office Action dated Oct. 12, 2016.
U.S. Appl. No. 15/293,062 Office Action dated Mar. 22, 2017.
Wallner et al. Methylation of Serum DNA is an Independent Prognostric Marker in Colorectal Cancer. Clinical Cancer Research 12(24):7347-7352 (Dec. 15, 2006).
Washizu et al. Applications of electrostatic stretch-and-positioning of DNA. Industry Applications. IEEE Transactions on Industry Applications 31:447-456 (1995).
Washizu et al. Electrostatic manipulation of DNA in microfabricated structures. Industry Applications. IEEE Transactions on Industry Applications 26:1165-1172 (1990).
Weaver et al. Methylated tumor-specific DNA as a plasma biomarker in patients with glioma. Cancer Invest. 24(1):35-40 (Feb. 2006).
Weiss et al. Circulating tumor DNA to monitor metastatic breast cancer. New England Journal of Medicine. 369(1):93 (Jul. 4, 2013).
Widschwendter et al. CDH1 and CDH13 Methylation in Serum is an Independent Prognostic Marker in Cervical Cancer Patients. Int. J. Cancer 109(2):163-166 (Mar. 20, 2004).
Wu et al. Cell-free DNA: measurement in various carcinomas and establishment of normal reference range. Clin Chim Acta. 321(1-2):77-87 (2002).
Xie et al. Quantification of plasma DNA as a screening tool for lung cancer. Chinese Medical Journal 117(10):1485-1488 (Oct. 2004).
Yoon et al. Comparison of Circulating Plasma DNA Levels between Lung Cancer Patients and Healthy Controls. Journal of Molecular Diagnostics 11(3):182-185 (May 2009).
Zachariah et al. Circulating cell-free DNA as a potential biomarker for minimal and mild endometriosis. Reprod Biomed Online 18(3):407-411 (Mar. 2009).
Zachariah et al. Levels of circulating cell-free nuclear and mitochondrial DNA in benign and malignant ovarian tumors. Obstet. Gynecol. 112(4):843-850 (Oct. 2008).
Zhou et al. Circulating cell-free nucleic acids: promising biomarkers of hepatocellular carcinoma. Semin Oncol. 39(4):440-448 (Aug. 2012).
Ziegler et al. Circulating DNA: a new diagnostic gold mine? Cancer Treat Rev. 28:255-271 (2002).
Zurita et al. Hypermethylated 14-3-3-σ and ESR1 gene promoters in serum as candidate biomarkers for the diagnosis and treatment efficacy of breast cancer metastasis. BMC Cancer 10(217) 9 pgs (May 2010).
Sonnenberg et al. Dielectrophoretic isolation and detection of cfc-DNA nanoparticulate biomarkers and virus from blood. Electrophoresis 34(7):1076-1084 (2013).
U.S. Appl. No. 15/320,730 Office Action dated Oct. 4, 2017.
PCT/US2017/024149 International Search Report and Written Opinion dated Jul. 18, 2017.
PCT/US2017/024149 Invitation to Pay Additional Fees dated May 15, 2017.
Co-pending U.S. Appl. No. 15/974,591, filed May 8, 2018.

(56) References Cited

OTHER PUBLICATIONS

PCT/US2018/031652 International Search Report and Written Opinion dated Jul. 31, 2018.
PCT/US2017/024149 International Preliminary Report on Patentability dated Oct. 4, 2018.
U.S. Appl. No. 15/974,591 Office Action dated Sep. 5, 2018.
U.S. Appl. No. 15/991,717 Office Action dated Nov. 2, 2018.
Lee et al. A micro cell lysis device. Sensors and Actuators A: Physical. 73(1-2):74-79 (1999).

* cited by examiner

DISPOSABLE FLUIDIC CARTRIDGE AND COMPONENTS

CROSS-REFERENCE

This application claims the benefit of priority from U.S. Provisional Patent Application No. 62/313,120, filed Mar. 24, 2016, which is herein incorporated by reference in its entirety.

BACKGROUND

Detection and quantification of antigens, analytes or other microparticulates is important in diagnosing and treating many conditions that impair human health. Separation of analytes from other material present in biological samples is an important step in the purification of biological analyte material needed for later diagnostic or biological characterization. There continues to be a need for products and methods capable of detecting analytes from complex biological samples.

SUMMARY

In some instances, the present invention fulfills a need for improved methods of analysis and handling of biological samples. Particular attributes of certain aspects provided herein include cartridge components such as bubble traps, which allow for fluidics cartridges in which no surface treatment is required. Additionally, the cartridge components, cartridges, systems, and methods described herein allow for a completely closed fluidics cartridge, which aids in safe handling and disposal of fluidics cartridges that have been used to process, for example, biological and environmental samples. In some embodiments, the cartridge components, cartridges, systems, and methods described herein can be used to isolate cellular and nanoscale analytes. In other embodiments, the cartridge components, cartridges, systems, and methods are amenable to multiplexed and high-throughput operation. In yet other embodiments, the cartridge components, cartridges, systems, and methods disclosed herein are capable of portability and use, for example, as a point-of-care assay.

Disclosed herein, in some embodiments, is a fluidic cartridge component, comprising: a bubble trap, comprising a reservoir for trapping air downstream from one or more liquid-holding reservoirs, wherein the bubble traps are fluidly connected to the liquid-holding reservoirs by a fluidic channel; wherein the reservoir traps air bubbles, but allows fluid to pass through the bubble trap downstream to the fluidic channel which provides an inlet and outlet to the bubble trap. In some embodiments, the fluidic cartridge component does not require surface treatment to obtain functional sample detection. In some embodiments, one bubble trap is connected to a second bubble trap component by a fluidic channel, and optionally connected to a third bubble trap by a fluidic channel. In some embodiments, the bubble trap is square, rectangular, or oval. In some embodiments, the bubble trap is at least 3 mm×3 mm×1 mm. In some embodiments, the bubble trap is at least 3 mm×5 mm×1 mm. In some embodiments, the bubble trap is at least 5 mm×8 mm×3 mm. In some embodiments, the bubble trap is at least 7 mm×10 mm×5 mm. In some embodiments, the bubble trap is at maximum 10 mm×10 mm×5 mm. In some embodiments, the bubble trap is at maximum 7 mm×10 mm×5 mm. In some embodiments, the bubble trap is at maximum 5 mm×8 mm×3 mm. In some embodiments, the bubble trap is at maximum 5 mm×5 mm×3 mm. In some embodiments, the bubble trap is a cylinder or a sphere. In some embodiments, the bubble trap has a diameter of at least 3 mm. In some embodiments, the bubble trap has a diameter of at least 5 mm. In some embodiments, the bubble trap has a diameter of at least 7 mm. In some embodiments, the bubble trap has a diameter of at least 10 mm.

Also provided herein are fluidic cartridge components, comprising: a fluidic channel; and a bubble trap, wherein the bubble trap comprises a reservoir for trapping air bubbles downstream from one or more liquid-holding reservoirs, wherein the fluidic channel provides an inlet and outlet to the bubble trap, connecting the bubble trap with one or more liquid-holding reservoirs, and wherein the bubble trap traps air bubbles in the reservoir, but allows fluid to pass through the fluidic channel. In some embodiments, any liquids in the sample reservoir and the reagent reservoir stay within the sample reservoir or the reagent reservoir until positive pressure is applied to the inlet. In some embodiments, one bubble trap is connected to a second bubble trap component by a fluidic channel, and optionally connected to a third bubble trap by a fluidic channel. In some embodiments, the bubble trap is square, rectangular, or oval. In some embodiments, the bubble trap length is at least 3 mm, the width is at least 3 mm, and the height is at least 1 mm. In some embodiments, the bubble trap length is at least 3 mm, the width is at least 5 mm, and the height is at least 1 mm. In some embodiments, the bubble trap length is at least 5 mm, the width is at least 8 mm, and the height is at least 3 mm. In some embodiments, the bubble trap length is at least 7 mm, the width is at least 10 mm, and the height is at least 5 mm. In some embodiments, the bubble trap length is at maximum 10 mm, the width is at maximum 10 mm, and the height is at maximum 5 mm. In some embodiments, the bubble trap length is at maximum 7 mm, the width is at maximum 10 mm, and the height is at maximum 5 mm. In some embodiments, the bubble trap length is at maximum 5 mm, the width is at maximum 8 mm, and the height is at maximum 3 mm. In some embodiments, the bubble trap length is at maximum 5 mm, the width is at maximum 5 mm, and the height is at maximum 3 mm. In some embodiments, the bubble trap is a cylinder or a sphere. In some embodiments, the bubble trap has a diameter of at least 3 mm. In some embodiments, the bubble trap has a diameter of at least 5 mm. In some embodiments, the bubble trap has a diameter of at least 7 mm. In some embodiments, the bubble trap has a diameter at least 10 mm.

In another aspect, disclosed herein, in some embodiments, is a fluidic cartridge component, comprising: one or more inlet/outlet(s), a reservoir, a filter, and a self-sealing polymer; wherein the self-sealing polymer is activated upon contact with liquid. In some embodiments, the air inlet/outlet(s) further comprise an air inlet/outlet port, comprising an opening smaller than the reservoir itself. In some embodiments, the filter is a porous polyurethane filter. In some embodiments, the self-sealing polymer comprises a hydrogel attached to the pore wall of a porous substrate. In some embodiments, the porous substrate comprises an organic polymer such as an acrylic, a polyolefin, a polyester, a polyamide, a poly(estersulfone), a polytetraflorethylene, a polyvinylchloride, a polycarbonate, or a polyurethane. In some embodiments, the porous substrate comprises an ultra high molecular weight (UHMW) polyethylene frit. In some embodiments, the self-sealing hydrogel of polymer comprises a hydrophilic polyurethane, a hydrophilic polyurea, or a hydrophilic polyureaurethane. In some embodiments, the inactivated self-sealing polymer is air-permeable and the activated self-sealing polymer is air-impermeable. In some embodiments, the activated self-sealing polymer does not allow liquid to leak from the fluidic cartridge component. In some embodiments, the activated self-sealing polymer creates a self-contained, disposable fluidic cartridge.

Also provided herein are fluidic cartridge components, comprising: one or more inlet(s) and one or more outlet(s), wherein the inlet and outlet comprises a port, a filter, and a self-sealing polymer; wherein the self-sealing polymer is activated upon contact with liquid. In some embodiments, the port comprises an opening smaller than the reservoir itself. In some embodiments, the filter is a porous polyurethane filter. In some embodiments, the self-sealing polymer comprises a hydrogel attached to a pore wall of a porous substrate. In some embodiments, the porous substrate comprises an organic polymer such as an acrylic, a polyolefin, a polyester, a polyamide, a poly(estersulfone), a polytetraflorethylene, a polyvinylchloride, a polycarbonate, a polyurethane, or an ultra high molecular weight (UHMW) polyethylene frit. In some embodiments, the porous substrate comprises an ultra high molecular weight (UHMW) polyethylene frit. In some embodiments, the hydrogel comprises a hydrophilic polyurethane, a hydrophilic polyurea, or a hydrophilic polyureaurethane. In some embodiments, an inactivated self-sealing polymer is air-permeable and the activated self-sealing polymer is air-impermeable. In some embodiments, the activated self-sealing polymer does not allow liquid to leak from the fluidic cartridge component. In some embodiments, the activated self-sealing polymer creates a self-contained, disposable fluidic cartridge.

In another aspect, disclosed herein, in some embodiments, is a fluidic cartridge for assaying analytes or other microparticulates comprising: plastic housing; an air inlet, an air inlet port, filter, and self-sealing polymer; a sample reservoir, a reagent reservoir, a bubble trap, a detection window; and a waste reservoir, comprising: an air outlet, comprising: an air outlet port, filter, and self-sealing polymer, wherein the sample reservoir and the reagent reservoir have a sealing, gas-impermeable, rubber cover, and wherein the air inlet, reagent reservoir, sample reservoir, bubble trap, detection window, and waste reservoir are connected by a continuous fluidic channel. In some embodiments, the fluidic cartridge contains at least one bubble trap. In some embodiments, the fluidic cartridge contains at least two bubble traps. In some embodiments, the fluidic cartridge contains at least three bubble traps. In some embodiments, the bubble traps are sequentially connected by the continuous fluidic channel. In some embodiments, the plastic housing is injection molded PMMA (acrylic), cyclic olefin copolymer (COC), cyclic olefin polymer (COP) or polycarbonate (PC). In some embodiments, the plastic housing material is selected for high levels of optical clarity, low autofluorescence, low water/fluid absorption, good mechanical properties (including compressive, tensile, and bend strength, Young's Modulus), and biocompatability. In some embodiments, the sample, reagent, bubble traps, detection window, and fluidic channels do not require surface treatment to obtain functional sample detection. In some embodiments, the fluidic cartridge filter is a porous polyurethane filter. In some embodiments, the fluidic cartridge porous polyurethane filter is coated with a self-sealing polymer. In some embodiments, the self-sealing polymer comprises a hydrogel attached to the pore wall of a porous substrate. In some embodiments, the porous substrate comprises an organic polymer such as an acrylic, a polyolefin, a polyester, a polyamide, a poly (estersulfone), a polytetraflorethylene, a polyvinylchloride, a polycarbonate, or a polyurethane. In some embodiments, the porous substrate comprises an ultra high molecular weight (UHMW) polyethylene frit. In some embodiments, the self-sealing hydrogel of polymer comprises a hydrophilic polyurethane, a hydrophilic polyurea, or a hydrophilic polyureaurethane. In some embodiments, the sample is liquid. In some embodiments, the self-sealing polymer is activated upon contact with liquid. In some embodiments, the inactivated self-sealing polymer is air-permeable and the activated self-sealing polymer is air-impermeable. In some embodiments, pressure is delivered to the inlet port which drives air into the reagent reservoir and the sample reservoir via a fluidic channel. In some embodiments, there is unidirectional flow through the fluidic channel. In some embodiments, the fluidic channel is resistant to back-flow pressure. In some embodiments, one or more air gaps in the fluidic channels of the devices and methods disclosed herein are removed via interaction with a bubble trap formed in the fluidic cartridge. In some embodiments, air gaps between reservoirs, once loaded, are very small (e.g. less than 5 μl) and the bubble traps are larger (e.g. about 40 μl). Essentially, the threshold is that the cross sectional area of the bubble trap is greater than the expected cross sectional area of a bubble of air that could reach the trap. Once the amount of air in the trap is large enough such that a bubble can fill the cross sectional area of the trap, the air will then move with the fluid motion and is capable of exiting the trap. Contemplated herein, the cross sectional area of the inlet channel is about 0.25 $mm^2$ and the cross sectional area of the bubble trap is about 8 $mm^2$. In some embodiments, the cross sectional area of the bubble trap is at least two times the cross sectional area of the inlet channel.

In some embodiments, the bubble trap is larger than the air gap itself. In some embodiments, the reagent reservoir is open to receive reagents. In some embodiments, the sample reservoir is open to receive reagents. In some embodiments, the sample reservoir is open to receive sample. In some embodiments, the bubble trap is square, rectangular, or oval. In some embodiments, the bubble trap is at least 3 mm×3 mm×1 mm. In some embodiments, the bubble trap is at least 3 mm×5 mm×1 mm. In some embodiments, the bubble trap is at least 5 mm×8 mm×3 mm. In some embodiments, the bubble trap is at least 7 mm×10 mm×5 mm. In some embodiments, the bubble trap is at maximum 10 mm×10 mm×5 mm. In some embodiments, the bubble trap is at maximum 7 mm×10 mm×5 mm. In some embodiments, the bubble trap is at maximum 5 mm×8 mm×3 mm. In some embodiments, the bubble trap is at maximum 5 mm×5 mm×3 mm. In some embodiments the bubble trap is round. In some embodiments, the bubble trap is a cylinder or a sphere. In some embodiments, the bubble trap has a diameter of at least 3 mm. In some embodiments, the bubble trap has a diameter of at least 5 mm. In some embodiments, the bubble trap has a diameter of at least 7 mm. In some embodiments, the bubble trap has a diameter of at least 10 mm. In some embodiments, the bubble trap has a height of at least 1 mm. In some embodiments, the bubble trap has a height of at least 2 mm. In some embodiments, the bubble trap has a height of at least 3 mm. In some embodiments, the bubble trap has a height of at least 4 mm. In some embodiments, the bubble trap has a height of at least 5 mm. In some embodiments, the bubble trap has a length of at least 3 mm. In some embodiments, the bubble trap has a length of at least 4 mm. In some embodiments, the bubble trap has a length of at least 5 mm. In some embodiments, the bubble trap has a length of at least 6 mm. In some embodiments, the bubble trap has a length of at least 7 mm. In some embodiments, the bubble trap has a length of at least 8 mm. In some embodiments, the bubble trap has a length of at least 10 mm. In some embodiments, the bubble trap has a width of at least 3 mm. In some embodiments, the bubble trap has a width of at least 4 mm. In some embodiments, the bubble trap has a width of at least 5 mm. In some embodiments, the bubble trap has a width of at least 6 mm. In some embodiments, the bubble trap has a width of at least 7 mm. In some embodiments, the bubble trap has a width of at least 8 mm. In some embodiments, the bubble trap has a width of at least 10 mm. In some embodiments, the detection window holds at least 0.5 microliters. In some embodiments, the detection window holds at least 1 microliter. In some embodiments, the detection window holds at least 2 microliters. In some embodiments, the detection window holds at least 3 microliters. In some embodiments, the detection window holds at least 4 microliters. In some embodiments, the detection window holds at least 5 microliters. In some embodiments, the detection window holds at least 10 microliters. In some embodiments, the detection window holds no more than 0.5 microliters. In some embodiments, the detection window holds no more than 1 microliter. In some embodiments, the detection window holds no more than 2 microliters. In some embodiments, the detection window holds no more than 3 microliters. In some embodiments, the detection window holds no more than 4 microliters. In some embodiments, the detection window holds no more than 5 microliters. In some embodiments, the detection window holds no more than 10 microliters. In some embodiments, the detection window holds no more than 50 microliters. In some embodiments, the fluidic channel is at least 50 micrometers deep. In some embodiments, the fluidic channel is at least 100 micrometers deep. In some embodiments, the fluidic channel is at least 200 micrometers deep. In some embodiments the fluidic channel is at least 300 micrometers deep. In some embodiments, the fluidic channel is at least 400 micrometers deep. In some embodiments, the fluidic channel is 250 micrometers deep. In some embodiments, the fluidic channel is no more than 50 micrometers deep. In some embodiments, the fluidic channel is no more than 100 micrometers deep. In some embodiments, the fluidic channel is no more than 300 micrometers deep. In some embodiments, the fluidic channel is no more than 400 micrometers deep. In some embodiments, the fluidic channel is no more than 500 micrometers deep.

Also provided herein, are fluidic cartridges for assaying analytes or other microparticulates comprising: at least one inlet, each inlet comprising: an inlet port; a filter; and a self-sealing polymer; at least one sample reservoir; at least one reagent reservoir; at least one bubble trap; at least one detection window; and at least one waste reservoir, comprising: at least one an outlet, each outlet comprising; an outlet port; a filter; and a self-sealing polymer; wherein the sample reservoir and the reagent reservoir have a sealing, gas-impermeable, removable rubber cover, and wherein the at least one inlet, reagent reservoir, sample reservoir, bubble trap, detection window, and waste reservoir are connected by a continuous fluidic channel. In some embodiments, the fluidic cartridge further comprises at least two bubble traps. In some embodiments, the fluidic cartridge further comprises at least three bubble traps. In some embodiments, the bubble traps are sequentially connected by the continuous fluidic channel. In some embodiments, the plastic housing is injection molded injection molded PMMA (acrylic), cyclic olefin copolymer (COC), cyclic olefin polymer (COP) or polycarbonate (PC). In some embodiments, the acrylic is injection molded PMMA (acrylic). In some embodiments, the size of the cross sectional area of the fluidic channel going into and out of the sample reservoir and the fluidic channel going into an out of the reagent reservoir provides sufficient fluidic resistance to prevent fluid in the sample reservoir or the reagent reservoir from leaving the reservoir without positive pressure applied to the inlet. In some embodiments, the filter is a porous polyurethane filter. In some embodiments, the porous polyurethane filter is coated with a self-sealing polymer. In some embodiments, the self-sealing polymer comprises a hydrogel attached to a pore wall of a porous substrate. In some embodiments, the porous substrate comprises an organic polymer such as an acrylic, a polyolefin, a polyester, a polyamide, a poly(estersulfone), a polytetraflorethylene, a polyvinylchloride, a polycarbonate, a polyurethane, or an ultra-high molecular weight (UHMW) polyethylene frit. In some embodiments, the porous substrate comprises an ultra-high molecular weight (UHMW) polyethylene frit. In some embodiments, the hydrogel comprises a hydrophilic polyurethane, a hydrophilic polyurea, or a hydrophilic polyureaurethane. In some embodiments, the sample is liquid. In some embodiments, the self-sealing polymer is activated upon contact with liquid. In some embodiments, the inactivated self-sealing polymer is air-permeable and the activated self-sealing polymer is air-impermeable. In some embodiments, pressure delivered to the inlet port drives air into the reagent reservoir and the sample reservoir via a fluidic channel. In some embodiments, there is unidirectional flow through the fluidic channel. In some embodiments, the fluidic channel is resistant to back-flow pressure. In some embodiments, an air gap is less than 5 μl. In some embodiments, the bubble trap is larger than the air gap itself. In some embodiments, the cross sectional area of the fluidic channel is about 0.25 $mm^2$. In some embodiments, the cross sectional area of the bubble trap is about 8 $mm^2$. In some embodiments, the cross sectional area of the bubble trap is at least two times the cross sectional area of the fluidic channel. In some embodiments, the reagent reservoir is open to receive reagents. In some embodiments, the sample reservoir is open to receive reagents. In some embodiments, the sample reservoir is open to receive sample. In some embodiments, the bubble trap is square, rectangular, or oval. In some embodiments, the bubble trap length is at least 3 mm, the width is at least 5 mm, and the height is at least 1 mm. In some embodiments, the bubble trap length is at least 3 mm, the width is at least 5 mm, and the height is at least 1 mm. In some embodiments, the bubble trap length is at least 5 mm, the width is at least 8 mm, and the height is at least 3 mm. In some embodiments, the bubble trap length is at least 7 mm, the width is at least 10 mm, and the height is at least 5 mm. In some embodiments, the bubble trap length is at maximum 10 mm, the width is at maximum 10 mm, and the height is at maximum 5 mm. In some embodiments, the bubble trap length is at maximum 7 mm, the width is at maximum 10 mm, and the height is at maximum 5 mm. In some embodiments, the bubble trap length is at maximum 7 mm, the width is at maximum 10 mm, and the height is at maximum 5 mm. In some embodiments, the bubble trap length is at maximum 5 mm, the width is at maximum 5 mm, and the height is at maximum 3 mm. In some embodiments, the bubble trap is round. In some embodiments, the bubble trap is a cylinder or a sphere. In some embodiments, the bubble trap has a diameter of at least 3 mm. In some embodiments, the bubble trap has a diameter of at least 5 mm. In some embodiments, the bubble trap has a diameter of at least 7 mm. In some embodiments, the bubble trap has a diameter at least 10 mm. In some embodiments, the detection window holds a minimum of 1 microliter. In some embodiments, the detection window holds a maximum of 1 microliter. In some embodiments, the fluidic channel is at least 100 micrometers deep. In some embodiments, the fluidic channel is at least 200 micrometers deep. In some embodiments, the fluidic channel is 250 micrometers deep. In some embodiments, the fluidic channel is less than 300 micrometers deep. In some embodiments, the fluidic channel is less than 400 micrometers deep.

In another aspect, disclosed herein, in some embodiments, is a method for assaying analytes or other microparticulates, comprising: introducing a sample to a sample reservoir; applying pressure on the air inlet port to drive the sample through the fluidic channel to mix with the reagent, or the reagent to mix with the sample; applying further pressure to drive the sample through the fluidic channel and into the bubble trap; trapping air bubbles in the bubble trap; passing the sample through a detection window; and into a waste reservoir, the waste reservoir having an outlet port for venting; wherein the height of the fluidic channel controls mixing rate. In some embodiments, the method further comprises monitoring the subject for the presence or absence of the biological material. In some embodiments, the presence of the biological material indicates the subject has an increased risk for a disease. In some embodiments, the disease is a cardiovascular disease, neurodegenerative disease, diabetes, auto-immune disease, inflammatory disease, cancer, metabolic disease prion disease, or pathogenic disease. In some embodiments, the fluidic channel is at least 100 micrometers deep. In some embodiments, the fluidic channel is at least 200 micrometers deep. In some embodiments, the fluidic channel is 250 micrometers deep. In some embodiments, the fluidic channel is less than 300 micrometers deep. In some embodiments, the fluidic channel is less than 400 micrometers deep.

In another aspect, disclosed herein, in some embodiments, is a method testing a subject for the presence or absence of a biological material, comprising: introducing a sample to the sample reservoir; applying pressure on the air inlet port to drive the sample through the fluidic channel to mix with the reagent, or the reagent to mix with the sample; applying further pressure to drive the sample through the fluidic channel and into the bubble trap; trapping air bubbles in the bubble trap; passing the sample through a detection window; and into a waste reservoir, the waste reservoir having an outlet port for venting; wherein the height of the fluidic channel controls mixing rate. In some embodiments, the method further comprises monitoring the subject for the presence or absence of the biological material. In some embodiments, the presence of the biological material indicates the subject has an increased risk for a disease. In some embodiments, the disease is a cardiovascular disease, neurodegenerative disease, diabetes, auto-immune disease, inflammatory disease, cancer, metabolic disease prion disease, or pathogenic disease. In some embodiments, the fluidic channel is at least 100 micrometers deep. In some embodiments, the fluidic channel is at least 200 micrometers deep. In some embodiments, the fluidic channel is 250 micrometers deep. In some embodiments, the fluidic channel is less than 300 micrometers deep. In some embodiments, the fluidic channel is less than 400 micrometers deep.

In another aspect, disclosed herein, in some embodiments, is a method of diagnosing a disease in a subject, the method comprising: introducing a sample to the sample reservoir; applying pressure on the air inlet port to drive the sample through the fluidic channel to mix with the reagent, or the reagent to mix with the sample; applying further pressure to drive the sample through the fluidic channel and into the bubble trap; trapping air bubbles in the bubble trap; passing the sample through a detection window; and into a waste reservoir, the waste reservoir having an outlet port for venting; wherein the height of the fluidic channel controls mixing rate. In some embodiments, the method further comprises monitoring the subject for the presence or absence of the biological material. In some embodiments, the presence of the biological material indicates the subject has an increased risk for a disease. In some embodiments, the disease is a cardiovascular disease, neurodegenerative disease, diabetes, auto-immune disease, inflammatory disease, cancer, metabolic disease prion disease, or pathogenic disease. In some embodiments, the fluidic channel is at least 100 micrometers deep. In some embodiments, the fluidic channel is at least 200 micrometers deep. In some embodiments, the fluidic channel is 250 micrometers deep. In some embodiments, the fluidic channel is less than 300 micrometers deep. In some embodiments, the fluidic channel is less than 400 micrometers deep.

Also provided herein are methods for assaying analytes or other microparticulates in a fluidic cartridge, the method comprising: introducing a sample to a sample reservoir; applying pressure on an inlet port to drive a sample through a fluidic channel to a reagent reservoir, mixing the sample with reagent to form a sample-reagent mixture; applying further pressure to drive the sample-reagent mixture through the fluidic channel and into the bubble trap; trapping air bubbles if present in the bubble trap; passing the sample-reagent mixture through a detection window; and into a waste reservoir, the waste reservoir having an outlet port for venting; wherein the height of the fluidic channel controls mixing rate of the sample and reagent.

Also provided herein are methods for assaying analytes or other microparticulates in a fluidic cartridge, the method comprising: introducing a sample to the fluidic cartridge of any of the above embodiments, wherein the height of the fluidic channel controls mixing rate.

Also provided herein are methods testing a subject for the presence or absence of a biological material, the method comprising: introducing a sample to the sample reservoir; applying pressure on an inlet to drive a sample through the fluidic channel and into a reagent reservoir, missing the sample with reagent to form a sample-reagent mixture; applying further pressure to drive the sample-reagent mixture through the fluidic channel and into the bubble trap; trapping bubbles if present in the bubble trap; passing the sample-reagent mixture through a detection window; and into a waste reservoir, the waste reservoir having an outlet port for venting; wherein the height of the fluidic channel controls the mixing rate of the sample and reagent.

Also provided herein are methods of diagnosing a disease in a subject, the method comprising: introducing a sample to the sample reservoir; applying pressure on the inlet to drive a sample through a fluidic channel and into an reagent reservoir, missing the sample with reagent to form a sample-reagent mixture; applying further pressure to drive the sample-reagent mixture through the fluidic channel and into the bubble trap; trapping air bubbles if present in the bubble trap; passing the sample-reagent mixture through a detection window; and into a waste reservoir, the waste reservoir having an outlet port for venting; wherein the height of the fluidic channel controls mixing rate of the sample and reagent. In some embodiments, the method further comprises monitoring the subject for the presence or absence of the biological material. In some embodiments, the presence of the biological material indicates the subject has an increased risk for a disease. In some embodiments, the disease is a cardiovascular disease, neurodegenerative disease, diabetes, auto-immune disease, inflammatory disease, cancer, metabolic disease prion disease, or pathogenic disease. In some embodiments, the fluidic channel is at least 100 micrometers deep. In some embodiments, the fluidic channel is at least 200 micrometers deep. In some embodiments, the fluidic channel is 250 micrometers deep. In some embodiments, the fluidic channel is less than 300 micrometers deep. In some embodiments, the fluidic channel is less than 400 micrometers deep.

Also provided herein are compact devices for isolating nanoscale analytes in a sample, the compact device comprising: a) a housing, b) at least one fluidic channel, c) a fluidic cartridge, the fluidic cartridge comprising a sample reservoir, a reagent reservoir, and a waste reservoir, and a plurality of alternating current (AC) electrodes configured to be selectively energized to establish dielectrophoretic (DEP) high field and dielectrophoretic (DEP) low field regions, wherein AC electrokinetic effects provide for separation of nanoscale analytes from larger entities, wherein the compact device is controlled by a mobile computing device and the power requirements for the compact device are less than 5 Watts. In some embodiments, the method further comprises a mobile computing device, wherein the mobile computing device is a smart phone, a tablet computer, or a laptop computer. In some embodiments, the mobile computing device comprises a connection port that connects to the compact device via a charging port, a USB port, or a headphone port of the portable computing device. In some embodiments, the compact device is powered by the mobile computing device. In some embodiments, the compact device is powered by a battery, a solar panel, or a wall outlet. In some embodiments, the compact device comprises a pump, wherein the pump is a syringe, a peristaltic pump, or a piezo pump. In some embodiments, the compact device comprises an optical pathway for detecting the analyte. In some embodiments, the analyte is detected with a camera on the mobile computing device. In some embodiments, the camera produces an image that is analyzed by the mobile computing device. In some embodiments, the fluidic cartridge is the fluidic cartridge of any one of the embodiments herein. In some embodiments, the fluidic cartridge is connected to the compact device by a hinge. In some embodiments, the fluidic cartridge is inserted into a slot of the compact device. In some embodiments, the fluidic cartridge comprises a bubble trap. In some embodiments, the fluidic cartridge comprises at least one sample reservoir and at least one control solution reservoir. In some embodiments, the fluidic cartridge comprises a slider that seals the sample reservoir. In some embodiments, the compact device comprises an interchangeable top plate to allow the device to connect to a variety of mobile computing devices. In some embodiments, the sample comprises blood, saliva, tear fluid, sweat, sputum, or combinations thereof. In some embodiments, the sample comprises an environmental sample. In some embodiments, the compact device comprises a flat top plate, such that the mobile computing device rests on the flat top plate of the compact device.

Also provided herein are fluidic cartridges, comprising: at least one inlet; a sample chamber; a reagent chamber; at least one bubble trap; a detection window; and a waste reservoir, comprising at least one outlet, wherein the sample chamber and the excipient chamber comprises a sealing, gas-impermeable, removable cover, and wherein the at least one inlet, excipient chamber, sample chamber, bubble trap, detection window, and waste reservoir are connected by a continuous fluidic channel. In some embodiments, any liquids in the sample chamber and the excipient chamber stay within the sample chamber or the excipient chamber until positive pressure is applied to the inlet. In some embodiments, the at least one inlet and the at least one outlet each comprising: a port, a filter, and a self-sealing polymer. In some embodiments, the port is an opening smaller than the inlet or outlet itself, the filter is a porous polyurethane filter, and wherein the self-sealing polymer is activated upon contact with liquid. In some embodiments, the self-sealing polymer comprises a hydrophilic polyurethane, a hydrophilic polyurea, or a hydrophilic polyureaurethane. In some embodiments, the bubble trap comprises a chamber downstream from the sample chamber and the reagent chamber, by a continuous fluidic channel, wherein the fluidic channel provides an inlet and outlet to the bubble trap. In some embodiments, the fluidic cartridge further comprises two or more bubble traps. In some embodiments, the bubble traps are sequentially connected by the continuous fluidic channel. In some embodiments, the size of the cross sectional area of the fluidic channel going into and out of the sample chamber and the fluidic channel going into and out of the excipient chamber provides sufficient fluidic resistance to prevent fluid in the sample chamber or the excipient chamber from leaving the chamber without positive pressure applied to the inlet. In some embodiments, the cross sectional area of the bubble trap is at least two times the cross sectional area of the fluidic channel. In some embodiments, the cross sectional area of the fluidic channel is about 0.25 mm2 and the cross sectional area of the bubble trap is about 8 $mm^2$. In some embodiments, the bubble trap length is at least 3 mm, the width is at least 3 mm, and the height is at least 1 mm. In some embodiments, the bubble trap length is at least 3 mm, the width is at least 5 mm, and the height is at least 1 mm. In some embodiments, the bubble trap length is at maximum 7 mm, the width is at maximum 10 mm, and the height is at maximum 5 mm.

Also provided herein are fluidic cartridges, wherein the bubble trap length is at maximum 5 mm, the width is at maximum 8 mm, and the height is at maximum 3 mm. In some embodiments, the bubble trap is a cylinder or a sphere, the cylinder or sphere having a diameter of at least 3 mm. In some embodiments, the bubble trap is a cylinder or a sphere, the cylinder or a sphere having a diameter of at least 5 mm.

Also provided herein are compact devices for isolating nanoscale analytes in a sample, the compact device comprising: a housing; an optical pathway; a fluid-moving mechanism; an electronic chip; and any fluidic cartridge disclosed herein; wherein the compact device is controlled by a portable computing device and the power requirements for the device are less than 5 Watts. In some embodiments, the analyte in a sample is detected with a camera on the mobile computing device and the camera produces an image that is analyzed by the mobile computing device. In some embodiments, the fluid-moving mechanism comprises a pump, wherein the pump is a syringe, a peristaltic pump, or a piezo pump. In some embodiments, the electronic chip is configured to control the fluidic cartridge and to apply an electric current to the sample. In some embodiments, the fluidic cartridge further comprises a plurality of alternating current (AC) electrodes configured to be selectively energized to establish dielectrophoretic (DEP) high field and dielectrophoretic low field regions, wherein AC electrokinetic effects separate nanoscale analytes from larger entities. In some embodiments, the fluidic cartridge is inserted into a fluidic cartridge slot of the compact device.

Also provided herein are methods for assaying analytes or other microparticulates in a fluidic cartridge, the method comprising: introducing a sample to a sample chamber;

applying pressure on an inlet port to drive the sample through a fluidic channel and into a reagent chamber, mixing the sample with excipient reagents to form a sample-reagent mixture; applying further pressure to drive the sample-reagent mixture through the fluidic channel and into a bubble trap; trapping air bubbles if present in the bubble trap; passing the sample-reagent mixture through a detection window; obtaining one or more images, wherein the images are used for assay analysis; and passing the sample-reagent mixture into a waste chamber, the waste chamber having an outlet for venting. In some embodiments, the height of the fluidic channel controls the mixing rate of the sample and the reagent.

Also provided herein are systems for detecting analytes or other microparticulates in a sample, the system comprising: a compact device comprising: a housing, an optical pathway, a fluid-moving mechanism, and an electrical chip, wherein the compact device is configured to receive a mobile computing device and a fluidic cartridge; a mobile computing device comprising: at least one processor, a memory, and an operating system configured to perform executable instructions; and a fluidic cartridge, wherein the compact device positions the mobile computing device and the fluidic cartridge relative to each other to detect analytes or other microparticulates in the sample. In some embodiments, the mobile computing device is a smart phone, a tablet computer, or a laptop computer. In some embodiments, the mobile computing device comprises a connection port that connects to the compact device via a charging port, a USB port, or a headphone port of the mobile computing device. In some embodiments, the compact device is powered by the mobile computing device, a battery, a solar panel, or a wall outlet. In some embodiments, the analyte or other microparticulates in the sample are detected with a camera on the mobile computing device.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
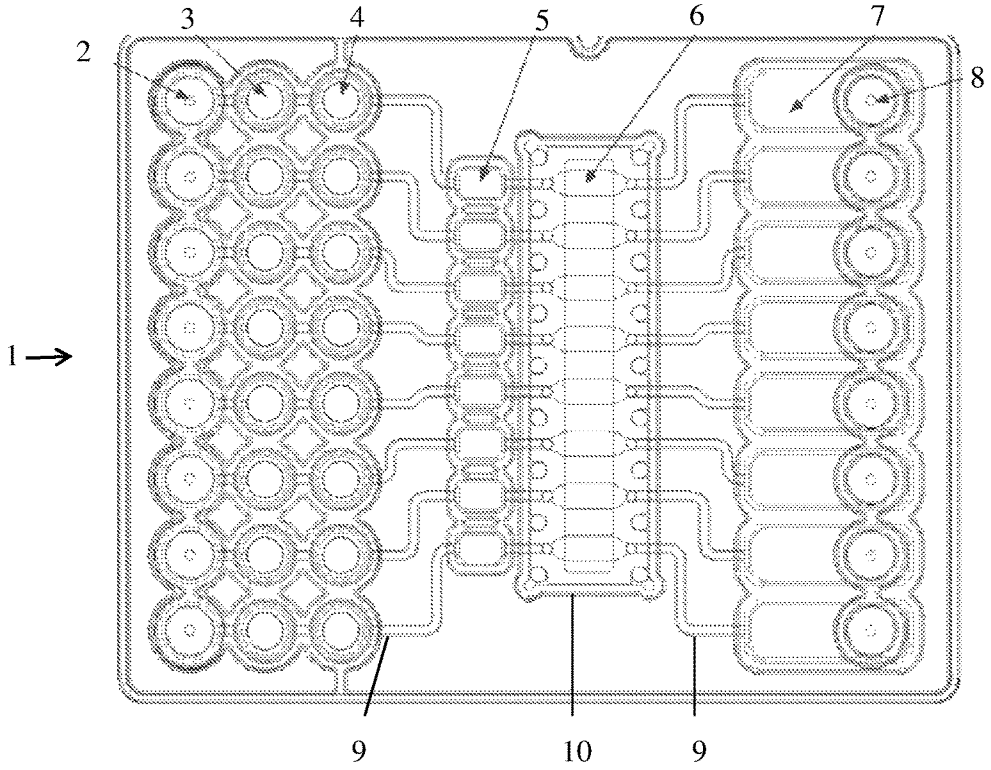
FIG. 1 shows a drawing of an 8 channel version of the fluidic cartridge which includes an inlet port, reagent reservoir, sample reservoir, bubble trap, flowcell, waste reservoir, and outlet port.

Fluidic cartridges in the art, in some cases, experience clogs which cause problems in the use of the fluidic cartridge. In some cases, these clogs are caused by bubbles of air which enter the fluidic cartridge during use. Described herein are cartridge components, cartridges, methods, and systems suitable for isolating or separating analytes from complex samples. In specific embodiments, provided herein are cartridge components, cartridges, methods, and systems for isolating or separating an analyte from a sample comprising other particulate material. In some aspects, the cartridge components, cartridges, methods, and systems may allow for rapid separation of particles and analytes in a sample. In other aspects, the cartridge components, cartridges, methods, and systems may allow for rapid isolation of analytes from particles in a sample. In various aspects, the cartridge components, cartridges, methods, and systems may allow for a rapid procedure that requires a minimal amount of material and/or results in a highly purified analyte isolated from complex fluids such as blood or environmental samples.

Provided in certain embodiments herein are cartridge components, cartridges, methods, and systems for isolating or separating analytes from a sample, the cartridge components, cartridges, methods, and systems allowing for analyzing a fluid sample. In some embodiments, the analytes may be analyzed using a device comprising an array of electrodes being capable of generating AC electrokinetic forces (e.g., when the array of electrodes are energized). AC Electrokinetics (ACE) capture is a functional relationship between the dielectrophoretic force ($F_{DEP}$) and the flow force ($F_{FLOW}$) derived from the combination of AC electrothermal (ACET) and AC electroosmostic (ACEO) flows. In some embodiments, the dielectrophoretic (DEP) field generated is a component of AC electrokinetic force effects. In other embodiments, the component of AC electrokinetic force effects is AC electroosmosis or AC electrothermal effects. In some embodiments, the AC electrokinetic force, including dielectrophoretic fields, comprises high-field regions (positive DEP, i.e. area where there is a strong concentration of electric field lines due to a non-uniform electric field) and/or low-field regions (negative DEP, i.e. area where there is a weak concentration of electric field lines due to a non-uniform electric field).

In specific instances, the analytes (e.g., nucleic acid) are isolated (e.g., isolated or separated from particulate material) in a field region (e.g., a high field region) of a dielectrophoretic field. In some embodiments, the cartridge components, cartridges, methods, and systems includes isolating and concentrating analytes in a high field DEP region. In some embodiments, the cartridge components, cartridges, methods, and systems includes isolating and concentrating analytes in a low field DEP region. The methods disclosed herein also optionally include cartridge components and cartridges capable of assisting in one or more of the following steps: washing or otherwise removing residual (e.g., cellular or proteinaceous) material from the analyte (e.g., rinsing the array with water or reagent while the analyte is concentrated and maintained within a high field DEP region of the array), degrading residual proteins (e.g., degradation occurring according to any suitable mechanism, such as with heat, a protease, or a chemical), flushing degraded proteins from the analyte, and collecting the analyte. In some embodiments, the result of the methods described herein is an isolated analyte, optionally of suitable quantity and purity for further analysis or characterization in, for example, enzymatic assays (e.g. PCR assays).

In some embodiments, the isolated analyte comprises less than about 10% non-analyte by mass. In some embodiments, the methods disclosed herein are completed in less than 10 minutes. In some embodiments, the methods further comprise degrading residual proteins on the array. In some embodiments, the residual proteins are degraded by one or more chemical degradants or an enzymatic degradants. In some embodiments, the residual proteins are degraded by Proteinase K.

In some embodiments, the analyte is a nucleic acid. In other embodiments, the nucleic acid is further amplified by polymerase chain reaction. In some embodiments, the nucleic acid comprises DNA, RNA, or any combination thereof. In some embodiments, the isolated nucleic acid comprises less than about 80%, less than about 70%, less than about 60%, less than about 50%, less than about 40%, less than about 30%, less than about 20%, less than about 10%, less than about 5%, or less than about 2% non-nucleic acid cellular material and/or protein by mass. In some embodiments, the isolated nucleic acid comprises greater than about 99%, greater than about 98%, greater than about 95%, greater than about 90%, greater than about 80%, greater than about 70%, greater than about 60%, greater than about 50%, greater than about 40%, greater than about 30%, greater than about 20%, or greater than about 10% nucleic acid by mass. In some embodiments, the methods described herein can be completed in less than about one hour. In some embodiments, centrifugation is not used. In some embodiments, the residual proteins are degraded by one or more of chemical degradants or enzymatic degradants. In some embodiments, the residual proteins are degraded by Proteinase K. In some embodiments, the residual proteins are degraded by an enzyme, the method further comprising inactivating the enzyme following degradation of the proteins. In some embodiments, the enzyme is inactivated by heat (e.g., 50 to 95° C. for 5-15 minutes). In some embodiments, the residual material and the degraded proteins are flushed in separate or concurrent steps. In some embodiments, an analyte is isolated in a form suitable for sequencing. In some embodiments, the analyte is isolated in a fragmented form suitable for shotgun-sequencing.

Devices and Systems

In some embodiments, the cartridge components, cartridges, systems, and methods described herein may be used as components in devices for isolating, purifying and collecting an analyte from a sample. In one aspect, described herein are cartridge components, cartridges, systems, and methods for isolating, purifying and collecting or eluting from a complex sample other particulate material, including cells and the like. In other aspects, the cartridge components, cartridges, systems, and methods disclosed herein are capable of isolating, purifying, collecting and/or eluting analytes from a sample comprising cellular or protein material. In yet other aspects, the cartridge components, cartridges, systems, and methods disclosed herein are capable of isolating, purifying, collecting and/or eluting analytes from samples comprising a complex mixture of organic and inorganic materials. In some aspects, the cartridge components, cartridges, systems, and methods disclosed herein are capable of isolating, purifying, collecting and/or eluting analytes from samples comprising organic materials. In yet other aspects, the devices disclosed herein are capable of isolating, purifying, collecting and/or eluting analytes from samples comprising inorganic materials.

Accordingly the cartridge components, cartridges, systems, and methods provided herein may be used in conjunction with systems and devices comprising a plurality of alternating current (AC) electrodes, the AC electrodes configured to be selectively energized to establish a dielectrophoretic (DEP) field region. In some aspects, the AC electrodes may be configured to be selectively energized to establish multiple dielectrophoretic (DEP) field regions, including dielectrophoretic (DEP) high field and dielectrophoretic (DEP) low field regions. In some instances, AC electrokinetic effects provide for concentration of larger particulate material in low field regions and/or concentration (or collection or isolation) of analytes (e.g., macromolecules, such as nucleic acid) in high field regions of the DEP field. For example, further description of the electrodes and the concentration of cells in DEP fields may be found in PCT patent publication WO 2009/146143 A2, which is incorporated herein for such disclosure. Alternatively, the systems and devices employing the cartridge components, cartridges, systems, and methods provided herein utilize direct current (DC) electrodes. In some embodiments, the plurality of DC electrodes comprises at least two rectangular electrodes, spread throughout the array. In some embodiments, DC electrodes are interspersed between AC electrodes.

DEP is a phenomenon in which a force is exerted on a dielectric particle when it is subjected to a non-uniform electric field. Depending on the step of the methods described herein, the dielectric particle in various embodiments herein is a biological analyte, such as a nucleic acid molecule. The dielectrophoretic force generated in the device does not require the particle to be charged. In some instances, the strength of the force depends on the medium and the specific electrical properties, shape, and size of the particles, as well as on the frequency of the electric field. In some instances, fields of a particular frequency selectively manipulate particles. In certain aspects described herein, these processes allow for the separation of analytes, including nucleic acid molecules, from other components, such as cells and proteinaceous material.

In some embodiments, the cartridge components, cartridges, systems, and methods may be used in conjunction with a device for isolating an analyte in a sample, the device comprising: (1) a housing; (2) a plurality of alternating current (AC) electrodes as disclosed herein within the housing, the AC electrodes configured to be selectively energized to establish AC electrokinetic high field and AC electrokinetic low field regions, whereby AC electrokinetic effects provide for concentration of the analytes cells in an electrokinetic field region of the device. In some embodiments, the plurality of electrodes is configured to be selectively energized to establish a dielectrophoretic high field and dielectrophoretic low field regions.

In some embodiments, the cartridge components, cartridges, systems, and methods may be used in conjunction with a device for isolating an analtye in a sample, the device comprising: (1) a plurality of alternating current (AC) electrodes as disclosed herein, the AC electrodes configured to be selectively energized to establish AC electrokinetic high field and AC electrokinetic low field regions; and (2) a module capable of performing enzymatic reactions, such as polymerase chain reaction (PCR) or other enzymatic reaction. In some embodiments, the plurality of electrodes is configured to be selectively energized to establish a dielectrophoretic high field and dielectrophoretic low field regions. In some embodiments, the device is capable of isolating an analtye from a sample, collecting or eluting the analyte and further performing an enzymatic reaction on the analyte. In some embodiments, the enzymatic reaction is performed in the same reservoir as the isolation and elution stages. In other embodiments, the enzymatic reaction is performed in another reservoir than the isolation and elution stages. In still other embodiments, an analyte is isolated and the enzymatic reaction is performed in multiple reservoirs.

In various embodiments, the cartridge components, cartridges, systems, and methods described herein may be used in conjunction with devices and systems that operate in the AC frequency range of from 1,000 Hz to 100 MHz, at voltages which could range from approximately 1 volt to 2000 volts pk-pk; at DC voltages from 1 volt to 1000 volts, at flow rates of from 10 microliters per minute to 10 milliliter per minute, and in temperature ranges from 1° C. to 120° C. In some embodiments, the cartridge components, cartridges, systems, and methods described herein may be used in conjunction with devices and systems that operate in AC frequency ranges of from about 3 to about 15 kHz. In some embodiments, the cartridge components, cartridges, systems, and methods described herein may be used in conjunction with devices and systems that operate at voltages of from 5-25 volts pk-pk. In some embodiments, the cartridge components, cartridges, systems, and methods described herein may be used in conjunction with devices and systems that operate at voltages of from about 1 to about 50 volts/cm. In some embodiments, the cartridge components, cartridges, systems, and methods described herein may be used in conjunction with devices and systems that operate at DC voltages of from about 1 to about 5 volts. In some embodiments, the cartridge components, cartridges, systems, and methods described herein may be used in conjunction with devices and systems that operate at a flow rate of from about 10 microliters to about 500 microliters per minute. In some embodiments, the cartridge components, cartridges, systems, and methods described herein may be used in conjunction with devices and systems that operate within temperature ranges of from about 20° C. to about 60° C. In some embodiments, the cartridge components, cartridges, systems, and methods described herein may be used in conjunction with devices and systems that operate at AC frequency ranges of from 1,000 Hz to 10 MHz. In some embodiments, the cartridge components, cartridges, systems, and methods described herein may be used in conjunction with devices and systems that operate at AC frequency ranges of from 1,000 Hz to 100 kHz. In some embodiments, the cartridge components, cartridges, systems, and methods described herein may be used in conjunction with devices and systems that operate at AC frequency ranges of from 1,000 Hz to 10 kHz. In some embodiments, the cartridge components, cartridges, systems, and methods described herein may be used in conjunction with devices and systems that operate at AC frequency ranges from 10 kHz to 100 kHz. In some embodiments, the cartridge components, cartridges, systems, and methods described herein may be used in conjunction with devices and systems that operate at AC frequency ranges from 100 kHz to 1 MHz.

In some embodiments, the cartridge components, cartridges, systems, and methods described herein may be used in conjunction with devices and systems that operate at DC voltages from 1 volt to 1000 volts. In some embodiments, the cartridge components, cartridges, systems, and methods described herein may be used in conjunction with devices and systems that operate at DC voltages from 1 volt to 500 volts. In some embodiments, the cartridge components, cartridges, systems, and methods described herein may be used in conjunction with devices and systems that operate at DC voltages from 1 volt to 250 volts. In some embodiments, the cartridge components, cartridges, systems, and methods described herein may be used in conjunction with devices and systems that operate at DC voltages from 1 volt to 100 volts. In some embodiments, the cartridge components, cartridges, systems, and methods described herein may be used in conjunction with devices and systems that operate at DC voltages from 1 volt to 50 volts.

In some embodiments, the cartridge components, cartridges, systems, and methods described herein may be used in conjunction with devices and systems that create an alternating current dielectrophoretic field region. The alternating current has any amperage, voltage, frequency, and the like suitable for concentrating cells. In some embodiments, the dielectrophoretic field region is produced using an alternating current having an amperage of 0.1 micro Amperes-10 Amperes; a voltage of 1-2000 Volts peak to peak; and/or a frequency of 1-100,000,000 Hz. In some embodiments, the DEP field region is produced using an alternating current having a voltage of 5-25 volts peak to peak. In some embodiments, the DEP field region is produced using an alternating current having a frequency of from 3-15 kHz.

In some embodiments, the DEP field region is produced using an alternating current having an amperage of 100 milliamps to 5 amps. In some embodiments, the DEP field region is produced using an alternating current having an amperage of 0.5 Ampere-1 Ampere. In some embodiments, the DEP field region is produced using an alternating current having an amperage of 0.5 Ampere-5 Ampere. In some embodiments, the DEP field region is produced using an alternating current having an amperage of 100 milliamps-1 Ampere. In some embodiments, the DEP field region is produced using an alternating current having an amperage of 500 milli Amperes-2.5 Amperes.

In some embodiments, the DEP field region is produced using an alternating current having a voltage of 1-25 Volts peak to peak. In some embodiments, the DEP field region is produced using an alternating current having a voltage of 1-10 Volts peak to peak. In some embodiments, the DEP field region is produced using an alternating current having a voltage of 25-50 Volts peak to peak. In some embodiments, the DEP field region is produced using a frequency of from 10-1,000,000 Hz. In some embodiments, the DEP field region is produced using a frequency of from 100-100,000 Hz. In some embodiments, the DEP field region is produced using a frequency of from 100-10,000 Hz. In some embodiments, the DEP field region is produced using a frequency of from 10,000-100,000 Hz. In some embodiments, the DEP field region is produced using a frequency of from 100,000-1,000,000 Hz.

In some embodiments, the cartridge components, cartridges, systems, and methods described herein may be used in conjunction with devices and systems that create a direct current dielectrophoretic field region. The direct current has any amperage, voltage, frequency, and the like suitable for concentrating cells. In some embodiments, the first dielectrophoretic field region is produced using a direct current having an amperage of 0.1 micro Amperes-1 Amperes; a voltage of 10 milli Volts-10 Volts; and/or a pulse width of 1 milliseconds-1000 seconds and a pulse frequency of 0.001-1000 Hz. In some embodiments, the DEP field region is produced using a direct current having an amperage of 1 micro Amperes-1 Amperes. In some embodiments, the DEP field region is produced using a direct current having an amperage of 100 micro Amperes-500 milli Amperes. In some embodiments, the DEP field region is produced using a direct current having an amperage of 1 milli Amperes-1 Amperes. In some embodiments, the DEP field region is produced using a direct current having an amperage of 1 micro Amperes-1 milli Amperes. In some embodiments, the DEP field region is produced using a direct current having a pulse width of 500 milliseconds-500 seconds. In some embodiments, the DEP field region is produced using a direct current having a pulse width of 500 milliseconds-100 seconds. In some embodiments, the DEP field region is produced using a direct current having a pulse width of 1 second-1000 seconds. In some embodiments, the DEP field region is produced using a direct current having a pulse width of 500 milliseconds-1 second. In some embodiments, the DEP field region is produced using a pulse frequency of 0.01-1000 Hz. In some embodiments, the DEP field region is produced using a pulse frequency of 0.1-100 Hz. In some embodiments, the DEP field region is produced using a pulse frequency of 1-100 Hz. In some embodiments, the DEP field region is produced using a pulse frequency of 100-1000 Hz.

In some embodiments, the cartridge components, cartridges, systems, and methods described herein may be used in conjunction with devices and systems used to analyze samples that may comprise a mixture of cell types. For example, blood comprises red blood cells and white blood cells. Environmental samples comprise many types of cells and other particulate material over a wide range of concentrations. In some embodiments, the cartridge components, cartridges, systems, and methods described herein may be used in conjunction with devices and systems to concentrate one cell type (or any number of cell types less than the total number of cell types comprising the sample). In another non-limiting example, the cartridge components, cartridges, systems, and methods described herein may be used in conjunction with devices and systems are used to specifically concentrate viruses and not cells (e.g., in a fluid with conductivity of greater than 300 mS/m, viruses concentrate in a DEP high field region, while larger cells will concentrate in a DEP low field region).

Accordingly, in some embodiments, the cartridge components, cartridges, systems, and methods described herein may be used in conjunction with devices and systems suitable for isolating or separating specific cell types in order to enable efficient isolation and collection of analytes. In some embodiments, the cartridge components, cartridges, systems, and methods described herein may be used in conjunction with devices and systems to provide more than one field region wherein more than one type of cell is isolated or concentrated.

Compact Devices and Systems

Also provided herein are compact devices and systems, optionally for use with cartridge components, cartridges, systems, and methods described herein, which are small enough to be easily carried or transported and have low power requirements. Compact devices herein are optionally used with a mobile computing device such as a phone, tablet, or laptop computer.

Power

Compact devices described herein have the feature of running on low power, for example on the power provided by a USB or micro USB port. In some cases, the power is provided by the mobile computing device. In some cases, the power is provided by a battery pack. In some cases, the power is provided by a solar charger. In some cases, the power is provided by a wall outlet. In some cases, the power is provided by a headphone jack. In some embodiments, it is contemplated that compact devices herein are configured to use multiple power sources depending on the source that is available at the time.

Power provided by a USB port is typically understood to be about 5 volts. The maximum current recommended to be drawn from a USB port is about 1000 mA. The maximum load of power to be generated by a USB port is 5 Watts. Therefore, compact devices described herein, in some embodiments, have lower power requirements than 5 volts, 1000 mA, or 5 Watts. In some embodiments, compact devices require no more than about 1-10 volts. In some embodiments, compact devices require no more than about 1, 2, 3, 4, 5, 6, 7, 8, 9, or 10 volts. In some embodiments, compact devices require no more than about 500 to about 1500 mA. In some embodiments compact devices here in require no more than about 500, 600, 700, 800, 900, 1000, 1100, 1200, 1300, 1400, or 1500 mA. In some embodiments, compact devices herein are powered by a battery pack or wall outlet and have larger power requirements, for example about 2.5 to about 10 Watts. In some embodiments, compact devices herein have power requirements of less than 0.01 to 10 Watts. In some embodiments, compact devices herein require no more than about 10, 9.5, 9.0, 8.5, 8.0, 7.5, 7.0, 6.5, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 Watts.

Compact devices herein, are contemplated to couple to a mobile computing device via a connection port, such as a USB connection port or a micro USB connection port. Connection of the compact device to the mobile computing device, in some embodiments, allows the compact device to draw power and also allows the mobile computing device to control the compact device. In some embodiments, compact devices herein comprise more than one connection port. In some embodiments, compact devices herein comprise a connection port adapter that allows a user to connect different mobile computing device to compact device.

Digital Processing Device

Figure 17:
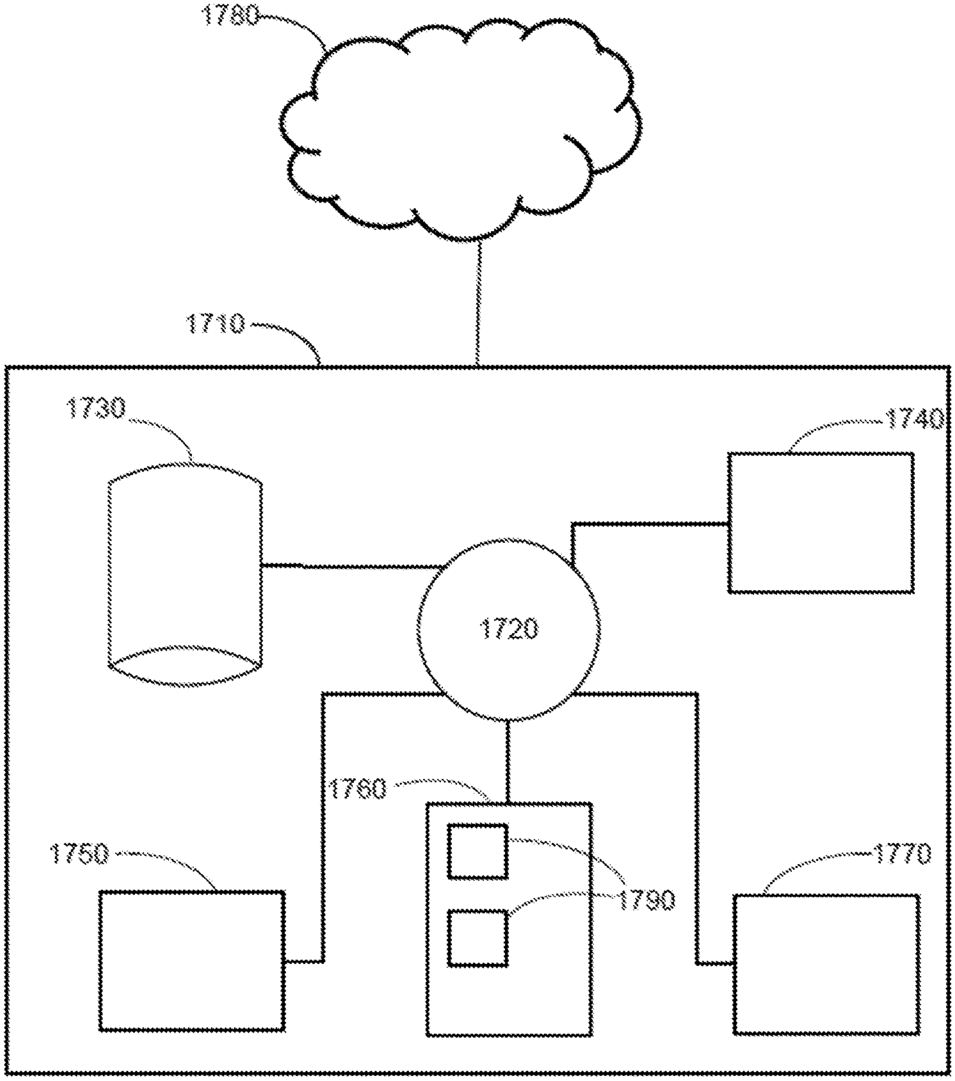
FIG. 17 schematically illustrates a computer control system that is programmed or configured to implement methods provided herein.

In various embodiments, the subject matter described herein include a digital processing device, or use of the same. FIG. 17 shows a digital processing device 1710 that is programmed or otherwise configured to carry out executable instructions. The digital processing device may be programmed to process and analyze one or more signals of an assayed biological sample to generate a result. The digital processing device may be programmed with a trained algorithm for analyzing the signals to generate the result. The digital processing device can regulate various aspects of the methods of the present disclosure, such as, for example, training the algorithm with the signals of a set of samples to generate a trained algorithm. The digital processing device may determine the positive predictive value of a trained algorithm by analyzing a set of independent samples with the algorithm and comparing predicted results generated by the algorithm with confirmed results. The digital processing device can be an electronic device of a user or a computer system that is remotely located with respect to the electronic device (e.g., a remote server). The digital processing device can be a mobile computing device. In further embodiments, the digital processing device includes one or more hardware central processing units (CPU) 1720 that carry out the device's functions. In still further embodiments, the digital processing device further comprises an operating system and/or application 1760 configured to perform executable instructions. The operating system or application 1760 may comprise one or more software modules 1790 configured to perform executable instructions (e.g., a data analysis module). In some embodiments, the digital processing device is optionally connected a computer network 1780. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the device includes a storage 1730 and/or memory device 1750. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display 1740 to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In some embodiments, the display is a touchscreen. In still further embodiments, the display is a combination of devices such as those disclosed herein.

In some embodiments, the digital processing device includes an interface 1770 for interacting with and/or receiving information from a user. In some embodiments, the interface comprises a touchscreen. In some embodiments, the interface comprises an input device. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a camera or video camera to capture motion or visual input. In still further embodiments, the input device is a combination of devices such as those disclosed herein.

Communication

In various embodiments, the subject matter disclosed herein includes a communication interface. In some embodiments, a communication interface is embedded in a digital processing device. In some embodiments, a communication interface operates on one or more of the following transmission technologies: 3G communication protocols, 4G communication protocols, IEEE 802.11 standards, BlueTooth protocols, short range, RF communications, satellite communications, visible light communications, and infrared communications.

In some embodiments, a communication interface comprises a wired communication interface. Examples include USB, RJ45, serial ports, and parallel ports.

Non-Transitory Computer Readable Storage Medium

In various embodiments, the subject matter disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Optics

Compact devices herein are capable of relying upon the camera of a mobile computing device, such as a camera on a phone, tablet, or laptop computer to obtain a measurement. It is contemplated that compact devices described herein comprise at least one optical pathway through which the camera of the mobile computing device can obtain an image. Cameras on mobile computing devices, in some embodiments are integrated into the mobile computing devices, such as a camera on a phone, a tablet, or a laptop computer. In some embodiments, external lenses can be adapted onto a camera on a mobile computing device to enable the camera to obtain a better image. In some embodiments, the camera is a 12 megapixel camera. In some embodiments, the camera is a 10, 9, 8, 7, 6, 5, 4, or 3 megapixel camera.

Compact devices herein comprise an optical pathway through which the camera on the mobile computing device is able to obtain an image. Optical pathways in compact devices herein, in some embodiments comprise a typical epi-fluorescence optical pathway, known by those of skill in the art, which detect fluorescent signals via a camera sensor in the mobile computing device or an external CMOS or CCD sensor to determine a quantity of an analyte of interest in a sample. In some embodiments, the optical pathway comprises a microscope objective. In some embodiments, the optical pathway comprises an endoscope objective.

Fluidics

Compact devices herein are capable of using a variety of mechanisms for moving fluids through the device including a syringe, a peristaltic pump or a piezo pump. Fluids move through the device using a compact fluidics reservoir of a fluidics cartridge. Exemplary fluidics cartridges are described herein and in the case of compact devices, are sized and shaped to fit inside or dock with the compact device. In some embodiments, the fluidics cartridge is inserted into the compact device. In some embodiments, the fluidics cartridge is connected to the compact device by a hinge. In some embodiments, the fluidics cartridge comprises a slider to cover the sample input port. In some embodiments, the fluidics cartridge comprises a reservoir, for example a sample reservoir, a reagent reservoir, and a waste reservoir. In some embodiments, the fluidics cartridge comprises at least two assay chambers, for example a test chamber and a control solution chamber. In some embodiments, the fluidics cartridge comprises a port, for example a sample input port, a sample reservoir port, a waste reservoir port, and a reagent reservoir port. In some embodiments, the reagent reservoir port also comprises a pump interface location. In some embodiments, the fluidics cartridge comprises a chip.

Electronics

In various embodiments, a compact device disclosed herein comprises an electronic chip to control the compact device. In some embodiments, an electronic chip comprises a signal amplifier. In some designs, an electronic chip comprises a differential amplifier.

In various embodiments, an electronic chip is configured to control the cartridge to receive the biological sample. In further embodiments, an electronic chip is configured to control the cartridge to assay the biological sample.

In some embodiments, an electronic chip is configured to energize the biological sample. In further embodiments, energizing the biological sample comprises ionizing the biological sample. In other embodiments, the method further comprises applying an electric current to the biological sample.

In some embodiments, an electronic chip is configured to acquire signals from the assayed biological sample. Examples of signals include, but not limited to, fluorescence, non-fluorescence, electric, chemical, a current of ions, a current of charged molecules, a pressure, a temperature, a light intensity, a color intensity, a conductance level, an impedance level, a concentration level (e.g., a concentration of ions), and a kinetic signal.

In certain embodiments, signals comprise an alternating current (AC) electrokinetic signal. In some cases, the signals comprise one or more AC electrokinetic high field regions and one or more AC electrokinetic low field regions.

Computer Program

In various embodiments, the subject matter disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some implementations, compact devices herein are controlled by a user using a computer program on a mobile computing device, such as a phone, tablet, or laptop computer. Computer programs for compact devices are also capable of performing analysis of the output data.

In some embodiments, a computer program comprises a data analysis module configured to analyze signals of an assayed biological sample. In further embodiments, analyzing the signals comprises a use of a statistical analysis. In some cases, analyzing the signals comprises comparing the signals with a signal template. There are various analyses, which can be combined to assemble an analysis module in the computer program. Examples of analyzing the signals include: analyzing strength of the signals, analyzing a frequency of the signals, identifying a spatial distribution pattern of the signals, identifying a temporal pattern of the one or more signals, detecting a discrete fluctuation in the signals corresponding to a chemical reaction event, inferring a pressure level, inferring a temperature level, inferring a light intensity, inferring a color intensity, inferring a conductance level, inferring an impedance level, inferring a concentration of ions, analyzing patterns of one or more AC electrokinetic high field regions and one or more AC electrokinetic low field regions, and analyzing a chemical reaction event. In still further embodiments, a chemical reaction event comprises one or more of the following: a molecular synthesis, a molecular destruction, a molecular breakdown, a molecular insertion, a molecular separation, a molecular rotation, a molecular spinning, a molecular extension, a molecular hybridization, a molecular transcription, a sequencing reaction, and a thermal cycling.

In some embodiments, the data analysis module is configured to detect signals of an assayed biological sample. The signals can comprise one or more images taken of the assayed biological sample. The one or more images can comprise pixel image data. The one or more images can be received as raw image data. The data detection module can be configured to receive pixel image data from a mobile computing device. The pixel image data can be from an image captured by a camera on the mobile computing device. In various embodiments, the data analysis module performs image processing upon the pixel image data. A pixel in an image may be produced by a signal that is a combination of photons produced by the assayed sample and a background signal. Background signal can come from photons emitted or reflected by external light sources. In some cases, certain auto-fluorescent materials can interfere with fluorescence-based assays. Accordingly, measurements of optical signals using the unprocessed pixels may overestimate the signal of the assay. Image processing can be used to reduce noise or filter an image. Image processing can be used to improve signal quality. In various embodiments, the data analysis module performs calibration in order to correct for background noise level using a reference signal (e.g., a null sample). In various embodiments, the data analysis module processes the image to normalize contrast and/or brightness. The data analysis module may perform gamma correction. In some embodiments, the data analysis module converts the image into grayscale, RGB, or LAB color space.

In various embodiments, the data analysis module processes the pixel image data using data processing algorithms to convert the data into a distribution of numerical values based on signal intensity. The pixel image data can comprise spatial information and intensity for each pixel. In various embodiments, the data analysis module selects one or more subfields within the image to be used in determining the result. This process may be necessary in some circumstances. For example, the signal being detected may not fill up the entire field of view of a camera or may be out of position due to misalignment between the camera lens and the assayed biological sample (e.g., the sample may be off-center in the camera's field of view). The one or more subfields can be selected based on the distribution of numerical values. For example, the one or more subfields can be selected based on having a distribution of the highest numerical values. In some embodiments, the data analysis module divides an image into a plurality of subfields and selects one or more subfields to be used in determining the result (e.g., positive or negative detection of cell-free circulating tumor DNA). The data analysis module can use an algorithm to locate a sub-field having an area that comprises a distribution of numerical values representing the highest signal intensity out of a plurality of possible sub-fields. As an illustrative example, an assay that utilizes a fluorescent dye to detect an analyte can produce a fluorescent signal of a certain frequency or color. The data analysis module then divides the image into sub-fields and locates a sub-field having the highest signal intensity. The sub-field having the highest signal intensity may then be used for calculating whether the result is positive or negative for the presence of the analyte. In various embodiments, signal intensity for a sub-field is calculated based on an average, median, or mode of signal intensity for all pixels located within the sub-field. The spatial intensity of the signal can be captured as an image by a camera of a mobile computing device. The image can be converted into a distribution of numerical values based on signal intensity. In various embodiments, the data analysis module normalizes the pixel image set. In various embodiments, the data analysis module receives multiple images or sets of pixel image data corresponding to said multiple images for an assayed biological sample. The data analysis module can analyze the multiple images to generate a more accurate result than analyzing a single image. In some embodiments, the data analysis module analyzes at least 2, 3, 4, 5, 6, 7, 8, 9, 10, 15, 20, 30, 40, or 50 images for an assayed biological sample.

In some embodiments, the data analysis module performs feature extraction using a feature extraction algorithm to obtain relevant information about the signal while leaving out irrelevant information. Some examples of feature extraction algorithms include histogram of oriented gradients (HOG), scale-invariant feature transform (SIFT), and speeded up robust feature (SURF). Feature extraction algorithms can be used in image processing for threshold detection (thresholding), edge detection, corner detection, blob detection, and ridge detection. In view of the disclosure provided herein, those of skill in the art will recognize that many algorithms are available for performing feature extraction.

In some embodiments, the data analysis module uses a trained algorithm to determine a result for the sample (e.g., positive or negative detection of an analyte or microparticulate). The trained algorithm of the present disclosure as described herein can comprise one feature space. The trained algorithm of the present disclosure as described herein can comprise two or more feature spaces. The two or more feature spaces may be distinct from one another. Each feature space can comprise types of information about a sample, such as presence of a nucleic acid, protein, carbohydrate, lipid, or other macromolecule. Algorithms can be selected from a non-limiting group of algorithms including principal component analysis, partial least squares regression, and independent component analysis. Algorithms can include methods that analyze numerous variables directly and are selected from a non-limiting group of algorithms including methods based on machine learning processes. Machine learning processes can include random forest algorithms, bagging techniques, boosting methods, or any combination thereof. Algorithms can utilize statistical methods such as penalized logistic regression, prediction analysis of microarrays, methods based on shrunken centroids, support vector machine analysis, or regularized linear discriminant analysis. The algorithm may be trained with a set of sample data (e.g., images or pixel image data) obtained from various subjects. The sample data may be obtained from a database described herein such as, for example, an online database storing the results of analyte analyses. A set of samples can comprise samples from at least 10, 20, 30, 40, 50, 60, 70, 80, 90, 100, 150, 200, 250, 300, 350, 400, 450, 500, 600, 700, 800, 900, or 1000 or more subjects. The trained algorithm can be tested using independent samples to determine its accuracy, specificity, sensitivity, positive predictive value, negative predictive value, or any combination thereof. The trained algorithm can have an accuracy of at least 80, 90, 95, or 99%% for a set of at least 100 independent samples. The trained algorithm can have a positive predictive value of at least 80, 90, 95, or 99% for a set of at least 100 independent samples. The trained algorithm can have a specificity of at least 80, 90, 95, or 99% for a set of at least 100 independent samples.

Databases

In various embodiments, the subject matter disclosed herein includes one or more databases, or use of the same to store signals and template signals. In view of the disclosure provided herein, those of skill in the art will recognize that many databases are suitable for storage and retrieval of the sequence information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Size

Compact devices herein are sized to be easily carried by an average person with one hand. The size and shape of the device is variable depending on the type of mobile computing device to be used. In some embodiments, a compact device comprises a housing frame to hold a mobile computing device, at least one fluidic channel, and a fluidic cartridge. In some embodiments, compact devices are measured by a length, a width, and a height. A length herein is the measurement along one side of the device, parallel to a surface on which the device is resting. A width herein is the measurement along one side of the device, parallel to a surface on which the device is resting. In some embodiments, the length is greater than the width. In some embodiments, the width is greater than the length. A height herein is a measurement taken along either the length or the width of the device, perpendicular to the surface on which the device is resting. In some embodiments, a height is the same measurement as a depth. In some embodiments, compact devices herein have a height ranging from about 130 mm to about 320 mm, for example about 130, 140, 150, 160, 170, 180, 190, 200, 210, 220, 230, 240, 250, 260, 270, 280, 290, 300, 310, or 320 mm. In some embodiments, compact devices herein have a width ranging from about 60 mm to about 230 mm, for example about 60, 70, 80, 90, 100, 110, 120, 130, 140, 150, 160, 170, 180, 190, 200, 210, 220, or 230 mm. In some embodiments, compact devices herein have a depth ranging from about 20 mm to about 100 mm, for example about 20, 30, 40, 50, 60, 70, 80, 90, or 100 mm.

Samples

In one aspect, the cartridge components, cartridges, systems, and methods described herein may be used to isolate analytes from a sample. In some embodiments, the sample comprises a fluid. In one aspect, the sample comprises cells or other particulate material and the analytes. In some embodiments, the sample does not comprise cells.

In some embodiments, the sample is a liquid, optionally water or an aqueous solution or dispersion. In some embodiments, the sample is a bodily fluid. Exemplary bodily fluids include blood, serum, plasma, bile, milk, cerebrospinal fluid, gastric juice, ejaculate, mucus, peritoneal fluid, saliva, sweat, tears, urine, synovial fluid and the like. In some embodiments, analytes are isolated from bodily fluids using the cartridge components, cartridges, systems, and methods described herein as part of a medical therapeutic or diagnostic procedure, device or system. In some embodiments, the sample is tissues and/or cells solubilized and/or dispersed in a fluid medium. For example, the tissue can be a cancerous tumor from which analytes, such as nucleic acids, can be isolated using the methods, devices or systems described herein.

In some embodiments, the sample is an environmental sample. In some embodiments, the environmental sample is assayed or monitored for the presence of a particular nucleic acid sequence indicative of a certain contamination, infestation incidence or the like. The environmental sample can also be used to determine the source of a certain contamination, infestation incidence or the like using the methods, devices or systems described herein. Exemplary environmental samples include municipal wastewater, industrial wastewater, water or fluid used in or produced as a result of various manufacturing processes, lakes, rivers, oceans, aquifers, ground water, storm water, plants or portions of plants, animals or portions of animals, insects, municipal water supplies, and the like.

In some embodiments, the sample is a food or beverage. The food or beverage can be assayed or monitored for the presence of a particular analyte indicative of a certain contamination, infestation incidence or the like. The food or beverage can also be used to determine the source of a certain contamination, infestation incidence or the like using the methods, devices or systems described herein. In various embodiments, the methods, devices and systems described herein can be used with one or more of bodily fluids, environmental samples, and foods and beverages to monitor public health or respond to adverse public health incidences.

In some embodiments, the sample is a growth medium. The growth medium can be any medium suitable for culturing cells, for example lysogeny broth (LB) for culturing *E. coli*, Ham's tissue culture medium for culturing mammalian cells, and the like. The medium can be a rich medium, minimal medium, selective medium, and the like. In some embodiments, the medium comprises or consists essentially of a plurality of clonal cells. In some embodiments, the medium comprises a mixture of at least two species. In some embodiments, the cells comprise clonal cells, pathogen cells, bacteria cells, viruses, plant cells, animal cells, insect cells, and/or combinations thereof.

In some embodiments, the sample is water.

In some embodiments, the sample may also comprise other particulate material. Such particulate material may be, for example, inclusion bodies (e.g., ceroids or Mallory bodies), cellular casts (e.g., granular casts, hyaline casts, cellular casts, waxy casts and pseudo casts), Pick's bodies, Lewy bodies, fibrillary tangles, fibril formations, cellular debris and other particulate material. In some embodiments, particulate material is an aggregated protein (e.g., beta-amyloid).

The sample can have any conductivity including a high or low conductivity. In some embodiments, the conductivity is between about 1 μS/m to about 10 mS/m. In some embodiments, the conductivity is between about 10 μS/m to about 10 mS/m. In other embodiments, the conductivity is between about 50 μS/m to about 10 mS/m. In yet other embodiments, the conductivity is between about 100 μS/m to about 10 mS/m, between about 100 μS/m to about 8 mS/m, between about 100 μS/m to about 6 mS/m, between about 100 μS/m to about 5 mS/m, between about 100 μS/m to about 4 mS/m, between about 100 μS/m to about 3 mS/m, between about 100 μS/m to about 2 mS/m, or between about 100 μS/m to about 1 mS/m.

In some embodiments, the conductivity is about 1 μS/m. In some embodiments, the conductivity is about 10 μS/m. In some embodiments, the conductivity is about 100 μS/m. In some embodiments, the conductivity is about 1 mS/m. In other embodiments, the conductivity is about 2 mS/m. In some embodiments, the conductivity is about 3 mS/m. In yet other embodiments, the conductivity is about 4 mS/m. In some embodiments, the conductivity is about 5 mS/m. In some embodiments, the conductivity is about 10 mS/m. In still other embodiments, the conductivity is about 100 mS/m. In some embodiments, the conductivity is about 1 S/m. In other embodiments, the conductivity is about 10 S/m.

In some embodiments, the conductivity is at least 1 μS/m. In yet other embodiments, the conductivity is at least 10 μS/m. In some embodiments, the conductivity is at least 100 μS/m. In some embodiments, the conductivity is at least 1 mS/m. In additional embodiments, the conductivity is at least 10 mS/m. In yet other embodiments, the conductivity is at least 100 mS/m. In some embodiments, the conductivity is at least 1 S/m. In some embodiments, the conductivity is at least 10 S/m. In some embodiments, the conductivity is at most 1 μS/m. In some embodiments, the conductivity is at most 10 μS/m. In other embodiments, the conductivity is at most 100 μS/m. In some embodiments, the conductivity is at most 1 mS/m. In some embodiments, the conductivity is at most 10 mS/m. In some embodiments, the conductivity is at most 100 mS/m. In yet other embodiments, the conductivity is at most 1 S/m. In some embodiments, the conductivity is at most 10 S/m.

In some embodiments, the sample is a small volume of liquid including less than 10 ml. In some embodiments, the sample is less than 8 ml. In some embodiments, the sample is less than 5 ml. In some embodiments, the sample is less than 2 ml. In some embodiments, the sample is less than 1 ml. In some embodiments, the sample is less than 500 μl. In some embodiments, the sample is less than 200 μl. In some embodiments, the sample is less than 100 μl. In some embodiments, the sample is less than 50 μl. In some embodiments, the sample is less than 10 μl. In some embodiments, the sample is less than 5 μl. In some embodiments, the sample is less than 1 μl.

In some embodiments, the quantity of sample applied to the device or used in the method comprises less than about 100,000,000 cells. In some embodiments, the sample comprises less than about 10,000,000 cells. In some embodiments, the sample comprises less than about 1,000,000 cells. In some embodiments, the sample comprises less than about 100,000 cells. In some embodiments, the sample comprises less than about 10,000 cells. In some embodiments, the sample comprises less than about 1,000 cells.

In some embodiments, isolation of an analyte from a sample with the devices, systems and methods described herein takes less than about 30 minutes, less than about 20 minutes, less than about 15 minutes, less than about 10 minutes, less than about 5 minutes or less than about 1 minute. In other embodiments, isolation of an analtye from a sample with the devices, systems and methods described herein takes not more than 30 minutes, not more than about 20 minutes, not more than about 15 minutes, not more than about 10 minutes, not more than about 5 minutes, not more than about 2 minutes or not more than about 1 minute. In additional embodiments, isolation of an analyte from a sample with the devices, systems and methods described herein takes less than about 15 minutes, preferably less than about 10 minutes or less than about 5 minutes.

In one aspect, described herein are methods for isolating a nanoscale analyte from a sample. In some embodiments, the nanoscale analyte is less than 1000 nm in diameter. In other embodiments, the nanoscale analyte is less than 500 nm in diameter. In some embodiments, the nanoscale analyte is less than 250 nm in diameter. In some embodiments, the nanoscale analyte is between about 100 nm to about 1000 nm in diameter. In other embodiments, the nanoscale analyte is between about 250 nm to about 800 nm in diameter. In still other embodiments, the nanoscale analyte is between about 300 nm to about 500 nm in diameter.

In some embodiments, the nanoscale analyte is less than 1000 μm in diameter. In other embodiments, the nanoscale analyte is less than 500 μm in diameter. In some embodiments, the nanoscale analyte is less than 250 μm in diameter. In some embodiments, the nanoscale analyte is between about 100 μm to about 1000 μm in diameter. In other embodiments, the nanoscale analyte is between about 250 μm to about 800 μm in diameter. In still other embodiments, the nanoscale analyte is between about 300 μm to about 500 μm in diameter.

In some embodiments, the analyte is not nanoscale, and comprises materials including but not limited to large cellular debris, aggregated proteins, subcellular components, such as exosomes, mitochondria, nuclei, nuclear fragments, nucleosomes, endoplasmic reticuli, lysosomes, large lysosomes, lipid bilayer vesicles, lipid unilayer vesicles, cellular membranes, cellular membrane fragments, cell surface proteins complexed with cellular membranes, chromatin fragments, histone complexes, exosomes, and exosomes with subcomponents, for example proteins, and single and double stranded nucleic acids including mRNA, miRNA, siRNA and DNA.

In some embodiments, the cartridge components, cartridges, systems, and methods described herein are used to obtain, isolate, or separate any desired analyte. In some embodiments, the analyte is a nucleic acid. In other embodiments, the nucleic acids isolated by the methods, devices and systems described herein include DNA (deoxyribonucleic acid), RNA (ribonucleic acid), and combinations thereof. In some embodiments, the analyte is protein fragments. In some embodiments, the nucleic acid is isolated in a form suitable for sequencing or further manipulation of the nucleic acid, including amplification, ligation or cloning.

In various embodiments, an isolated or separated analyte is a composition comprising analyte that is free from at least 99% by mass of other materials, free from at least 99% by mass of residual cellular material, free from at least 98% by mass of other materials, free from at least 98% by mass of residual cellular material, free from at least 95% by mass of other materials, free from at least 95% by mass of residual cellular material, free from at least 90% by mass of other materials, free from at least 90% by mass of residual cellular material, free from at least 80% by mass of other materials, free from at least 80% by mass of residual cellular material, free from at least 70% by mass of other materials, free from at least 70% by mass of residual cellular material, free from at least 60% by mass of other materials, free from at least 60% by mass of residual cellular material, free from at least 50% by mass of other materials, free from at least 50% by mass of residual cellular material, free from at least 30% by mass of other materials, free from at least 30% by mass of residual cellular material, free from at least 10% by mass of other materials, free from at least 10% by mass of residual cellular material, free from at least 5% by mass of other materials, or free from at least 5% by mass of residual cellular material.

In various embodiments, the analyte has any suitable purity. For example, if an enzymatic assay requires analyte samples having about 20% residual cellular material, then isolation of the analyte to 80% is suitable. In some embodiments, the isolated analyte comprises less than about 80%, less than about 70%, less than about 60%, less than about 50%, less than about 40%, less than about 30%, less than about 20%, less than about 10%, less than about 5%, or less than about 2% non-analyte cellular material and/or protein by mass. In some embodiments, the isolated analyte comprises greater than about 99%, greater than about 98%, greater than about 95%, greater than about 90%, greater than about 80%, greater than about 70%, greater than about 60%, greater than about 50%, greater than about 40%, greater than about 30%, greater than about 20%, or greater than about 10% analyte by mass.

The analytes are isolated in any suitable form including unmodified, derivatized, fragmented, non-fragmented, and the like. In some embodiments, when the analyte is a nucleic acid, the nucleic acid is collected in a form suitable for sequencing. In some embodiments, the nucleic acid is collected in a fragmented form suitable for shotgun-sequencing, amplification or other manipulation. The nucleic acid may be collected from the device in a solution comprising reagents used in, for example, a DNA sequencing procedure, such as nucleotides as used in sequencing by synthesis methods.

In some embodiments, the methods described herein result in an isolated analyte sample that is approximately representative of the analyte of the starting sample. In some embodiments, the devices and systems described herein are capable of isolating analyte from a sample that is approximately representative of the analyte of the starting sample. That is, the population of analytes collected by the method, or capable of being collected by the device or system, are substantially in proportion to the population of analytes present in the cells in the fluid. In some embodiments, this aspect is advantageous in applications in which the fluid is a complex mixture of many cell types and the practitioner desires an analyte-based procedure for determining the relative populations of the various cell types.

In some embodiments, the analyte isolated by the methods described herein has a concentration of at least 0.5 ng/mL. In some embodiments, the analyte isolated by the methods described herein has a concentration of at least 1 ng/mL. In some embodiments, the analyte isolated by the methods described herein has a concentration of at least 5 ng/mL. In some embodiments, the analyte isolated by the methods described herein has a concentration of at least 10 ng/ml.

In some embodiments, about 50 pico-grams of analyte is isolated from a sample comprising about 5,000 cells using the cartridge components, cartridges, systems, and methods described herein. In some embodiments, the cartridge components, cartridges, systems, and methods described herein yield at least 10 pico-grams of analyte from a sample comprising about 5,000 cells. In some embodiments, the cartridge components, cartridges, systems, and methods described herein yield at least 20 pico-grams of analyte from a sample comprising about 5,000 cells. In some embodiments, the cartridge components, cartridges, systems, and methods described herein yield at least 50 pico-grams of analyte from about 5,000 cells. In some embodiments, the cartridge components, cartridges, systems, and methods described herein yield at least 75 pico-grams of analyte from a sample comprising about 5,000 cells. In some embodiments, the cartridge components, cartridges, systems, and methods described herein yield at least 100 pico-grams of analyte from a sample comprising about 5,000 cells. In some embodiments, the cartridge components, cartridges, systems, and methods described herein yield at least 200 pico-grams of analyte from a sample comprising about 5,000 cells. In some embodiments, the cartridge components, cartridges, systems, and methods described herein yield at least 300 pico-grams of analyte from a sample comprising about 5,000 cells. In some embodiments, the cartridge components, cartridges, systems, and methods described herein yield at least 400 pico-grams of analyte from a sample comprising about 5,000 cells. In some embodiments, the cartridge components, cartridges, systems, and methods described herein yield at least 500 pico-grams of analyte from a sample comprising about 5,000 cells. In some embodiments, the cartridge components, cartridges, systems, and methods described herein yield at least 1,000 pico-grams of analyte from a sample comprising about 5,000 cells. In some embodiments, the cartridge components, cartridges, systems, and methods described herein yield at least 10,000 pico-grams of analyte from a sample comprising about 5,000 cells. In some embodiments, the cartridge components, cartridges, systems, and methods described herein yield at least 20,000 pico-grams of analyte from a sample comprising about 5,000 cells. In some embodiments, the cartridge components, cartridges, systems, and methods described herein yield at least 30,000 pico-grams of analyte from a sample comprising about 5,000 cells. In some embodiments, the cartridge components, cartridges, systems, and methods described herein yield at least 40,000 pico-grams of analyte from a sample comprising about 5,000 cells. In some embodiments, the cartridge components, cartridges, systems, and methods described herein yield at least 50,000 pico-grams of analyte from a sample comprising about 5,000 cells.

When the analyte is a nucleic acid, the nucleic acid isolated using the methods described herein or capable of being isolated by the devices described herein is high-quality and/or suitable for using directly in downstream procedures such as DNA sequencing, nucleic acid amplification, such as PCR, or other nucleic acid manipulation, such as ligation, cloning or further translation or transformation assays. In some embodiments, the collected nucleic acid comprises at most 0.01% protein. In some embodiments, the collected nucleic acid comprises at most 0.5% protein. In some embodiments, the collected nucleic acid comprises at most 0.1% protein. In some embodiments, the collected nucleic acid comprises at most 1% protein. In some embodiments, the collected nucleic acid comprises at most 2% protein. In some embodiments, the collected nucleic acid comprises at most 3% protein. In some embodiments, the collected nucleic acid comprises at most 4% protein. In some embodiments, the collected nucleic acid comprises at most 5% protein.

When the analyte is a protein or protein fragment, the protein or protein fragment isolated using the methods described herein or capable of being isolated by the devices described herein is high-quality and/or suitable for using directly in downstream procedures. In some embodiments, the collected protein or protein fragment comprises at most 0.01% non-target protein. In some embodiments, the collected protein or protein fragment comprises at most 0.5% non-target protein. In some embodiments, the collected protein or protein fragment comprises at most 0.1% non-target protein. In some embodiments, the collected protein or protein fragment comprises at most 1% non-target protein. In some embodiments, the collected protein or protein fragment comprises at most 2% non-target protein. In some embodiments, the collected protein or protein fragment comprises at most 3% non-target protein. In some embodiments, the collected protein or protein fragment comprises at most 4% non-target protein. In some embodiments, the collected protein or protein fragment comprises at most 5% non-target protein.

Removal of Residual Material

In some embodiments, following isolation of the analytes, the method includes optionally flushing residual material from the isolated analytes. In some embodiments, the cartridge components, cartridges, systems, and methods described herein may optionally comprise a reservoir comprising a fluid suitable for flushing residual material from the analytes. "Residual material" is anything originally present in the sample, originally present in the cells, added during the procedure, created through any step of the process including but not limited to cells (e.g. intact cells or residual cellular material), and the like. For example, residual material includes intact cells, cell wall fragments, proteins, lipids, carbohydrates, minerals, salts, buffers, plasma, and the like. In some embodiments, a certain amount of analyte is flushed with the residual material.

In some embodiments, the residual material is flushed in any suitable fluid, for example in water, TBE buffer, or the like. In some embodiments, the residual material is flushed with any suitable volume of fluid, flushed for any suitable period of time, flushed with more than one fluid, or any other variation. In some embodiments, the method of flushing residual material is related to the desired level of isolation of the analyte, with higher purity analyte requiring more stringent flushing and/or washing. In other embodiments, the method of flushing residual material is related to the particular starting material and its composition. In some instances, a starting material that is high in lipids requires a flushing procedure that involves a hydrophobic fluid suitable for solubilizing lipids.

In some embodiments, the method includes degrading residual material including residual protein. In some embodiments, the devices or systems are capable of degrading residual material including residual protein. For example, proteins are degraded by one or more of chemical degradation (e.g. acid hydrolysis) and enzymatic degradation. In some embodiments, the enzymatic degradation agent is a protease. In other embodiments, the protein degradation agent is Proteinase K. The optional step of degradation of residual material is performed for any suitable time, temperature, and the like. In some embodiments, the degraded residual material (including degraded proteins) is flushed from the isolated analytes.

In some embodiments, the agent used to degrade the residual material is inactivated or degraded. In some embodiments, the devices or systems are capable of degrading or inactivating the agent used to degrade the residual material. In some embodiments, an enzyme used to degrade the residual material is inactivated by heat (e.g., 50 to 95° C. for 5-15 minutes). For example, enzymes including proteases, (for example, Proteinase K) are degraded and/or inactivated using heat (typically, 15 minutes, 70° C.). In some embodiments wherein the residual proteins are degraded by an enzyme, the method further comprises inactivating the degrading enzyme (e.g., Proteinase K) following degradation of the proteins. In some embodiments, heat is provided by a heating module in the device (temperature range, e.g., from 30 to 95° C.).

The order and/or combination of certain steps of the method can be varied. In some embodiments, the devices or methods are capable of performing certain steps in any order or combination. For example, in some embodiments, the residual material and the degraded proteins are flushed in separate or concurrent steps. That is, the residual material is flushed, followed by degradation of residual proteins, followed by flushing degraded proteins from the isolated analytes. In some embodiments, the residual proteins are first degraded, and then both the residual material and degraded proteins are flushed from the analytes in a combined step.

In some embodiments, the analytes are retained in the device and optionally used in further procedures, such as PCR, enzymatic assays or other procedures that analyze, characterize or amplify the analytes.

For example, in some embodiments, the isolated analyte is a nucleic acid, and the cartridge components, cartridges, systems, and methods described herein are capable of performing PCR or other optional procedures on the isolated nucleic acids. In other embodiments, the nucleic acids are collected and/or eluted from the device. In some embodiments, the cartridge components, cartridges, systems, and methods described herein are capable of allowing collection and/or elution of nucleic acid from the device or system. In some embodiments, the isolated nucleic acid is collected by (i) turning off the second dielectrophoretic field region; and (ii) eluting the nucleic acid from the array in an eluant. Exemplary eluants include water, TE, TBE and L-Histidine buffer.

Assays and Applications

In some embodiments, the cartridge components, cartridges, systems, and methods described herein may allow for performing enzymatic reactions. In other embodiments, the cartridge components, cartridges, systems, and methods described herein may allow for performing polymerase chain reaction (PCR), isothermal amplification, ligation reactions, restriction analysis, nucleic acid cloning, transcription or translation assays, or other enzymatic-based molecular biology assay.

In some embodiments, the methods described herein are performed in a short amount of time, the devices are operated in a short amount of time, and the systems are operated in a short amount of time. In some embodiments, the period of time is short with reference to the "procedure time" measured from the time between adding the fluid to the device and obtaining isolated analyte. In some embodiments, the procedure time is less than 3 hours, less than 2 hours, less than 1 hour, less than 30 minutes, less than 20 minutes, less than 10 minutes, or less than 5 minutes. In another aspect, the period of time is short with reference to the "hands-on time" measured as the cumulative amount of time that a person must attend to the procedure from the time between adding the fluid to the device and obtaining isolated analyte. In some embodiments, the hands-on time is less than 20 minutes, less than 10 minutes, less than 5 minute, less than 1 minute, or less than 30 seconds.

In some embodiments, the cartridge components, cartridges, systems, and methods described herein may comprise optionally amplifying the isolated nucleic acid by polymerase chain reaction (PCR). In some embodiments, the PCR reaction is performed on or near the array of electrodes or in the device or systems to be used with the cartridge components, cartridges, systems, and methods described herein. In some embodiments, the device or system comprises a heater and/or temperature control mechanisms suitable for thermocycling.

PCR is optionally done using traditional thermocycling by placing the reaction chemistry analytes in between two efficient thermoconductive elements (e.g., aluminum or silver) and regulating the reaction temperatures using TECs. Additional designs optionally use infrared heating through optically transparent material like glass or thermo polymers. In some instances, designs use smart polymers or smart glass that comprise conductive wiring networked through the substrate. This conductive wiring enables rapid thermal conductivity of the materials and (by applying appropriate DC voltage) provides the required temperature changes and gradients to sustain efficient PCR reactions. In certain instances, heating is applied using resistive chip heaters and other resistive elements that will change temperature rapidly and proportionally to the amount of current passing through them. Yet other methods require no heat (isothermal reactions) for sufficient amplification of the nucleic acid template.

In some embodiments, the cartridge components, cartridges, systems, and methods described herein may be used in conjunction with traditional fluorometry (ccd, pmt, other optical detector, and optical filters), fold amplification is monitored in real-time or on a timed interval. In certain instances, quantification of final fold amplification is reported via optical detection converted to AFU (arbitrary fluorescence units correlated to analyze doubling) or translated to electrical signal via impedance measurement or other electrochemical sensing.

In some instances, light delivery schemes are utilized to provide the optical excitation and/or emission and/or detection of fold amplification. In certain embodiments, this includes using the flow cell materials (thermal polymers like acrylic (PMMA) cyclic olefin polymer (COP), cyclic olefin co-polymer, (COC), etc.) as optical wave guides to remove the need to use external components. In addition, in some instances light sources-light emitting diodes—LEDs, vertical-cavity surface-emitting lasers—VCSELs, and other lighting schemes are integrated directly inside the flow cell or built directly onto the micro electrode array surface to have internally controlled and powered light sources. Miniature PMTs, CCDs, or CMOS detectors can also be built into the flow cell. This minimization and miniaturization enables compact devices capable of rapid signal delivery and detection while reducing the footprint of similar traditional devices (i.e. a standard bench top PCR/QPCR/Fluorometer).

The isolated sample disclosed herein may be further utilized in a variety of assay formats. For instance, devices which are addressed with nucleic acid probes or amplicons may be utilized in dot blot or reverse dot blot analyses, base-stacking single nucleotide polymorphism (SNP) analysis, SNP analysis with electronic stringency, or in STR analysis. In addition, such cartridge components, cartridges, systems, and methods described herein may be utilized in formats for enzymatic nucleic acid modification, or protein-nucleic acid interaction, such as, e.g., gene expression analysis with enzymatic reporting, anchored nucleic acid amplification, or other nucleic acid modifications suitable for solid-phase formats including restriction endonuclease cleavage, endo- or exo-nuclease cleavage, minor groove binding protein assays, terminal transferase reactions, polynucleotide kinase or phosphatase reactions, ligase reactions, topoisomerase reactions, and other nucleic acid binding or modifying protein reactions.

In addition, the cartridge components, cartridges, systems, and methods described herein can be useful in immunoassays. For instance, in some embodiments, some of the cartridge components, cartridges, systems, and methods described herein can be used with antigens (e.g., peptides, proteins, carbohydrates, lipids, proteoglycans, glycoproteins, etc.) in order to assay for antibodies in a bodily fluid sample by sandwich assay, competitive assay, or other formats. Alternatively, the locations of the device may be addressed with antibodies, in order to detect antigens in a sample by sandwich assay, competitive assay, or other assay formats. In some embodiments, the isolated nucleic acids are useful for use in immunoassay-type arrays or nucleic acid arrays.

Fluidic Cartridges

In some embodiments, the cartridge components, cartridges, systems, and methods described herein use a fluidic cartridge. In some embodiments, the fluidic cartridge comprises an inlet port, a reagent reservoir, a sample reservoir, a bubble trap, a flow cell, a waste reservoir, and an outlet port, each connected by a fluidic channel. In some embodiments, an inlet port is an opening into the fluidic cartridge to which pressure is applied to move a sample through the fluidic cartridge. In some embodiments, an outlet port is an opening into the device through which gasses escape the fluidic cartridge to allow a sample to move through the fluidic cartridge. In some embodiments, the fluidic cartridge comprises a chip alignment feature for interfacing an electronic chip with the fluidic cartridge. In some embodiments the chip alignment feature is molded into the fluidic cartridge. In some embodiments, the fluidic cartridge comprises an electrical contact window comprising an opening for passage of electric signal from a compact device to an electronic chip. In some embodiments, the electrical contact window is an absence of material in the fluidic cartridge sized to fit electric contacts contacting the electronic chip. In some embodiments, the fluidic cartridge comprises a slider which covers the fluidic cartridge allowing access to at least one of an inlet port, a sample reservoir port, a waste reservoir port, and a reagent reservoir port. The fluidic cartridge is configured to receive pressure in order to move a sample into the device for assaying an analyte. In some embodiments, pressure is applied to the inlet port. In some embodiments, pressure is applied to the reagent reservoir port. In some embodiments, pressure is applied with a pump. In some embodiments, the pump is a syringe, a peristaltic pump, or a piezo pump.

In some embodiments, the fluidic cartridge comprises fluidic channels sized to prevent flow of a fluid in absence of pressure applied to one of the ports. In some embodiments, fluidic channels are measured by a width and a height. A width herein is the measurement inside of the fluidic channel, parallel to a surface on which the fluidic cartridge is resting. A height herein is a measurement taken inside of the fluidic channel, perpendicular to the surface on which the fluidic cartridge is resting. In some embodiments, a height is the same measurement as a depth. In some embodiments, the fluidic channel has a width of about 1 mm. In some embodiments, the fluidic channel has a height of about 0.2 mm. In some embodiments, the fluidic channel has a width of no more than 1.5, 1.4, 1.3, 1.2, 1.1, 1.0, 0.9, 0.8, 0.7, 0.6, 0.5, 0.3, 0.2, 0.1, or 0.05 mm. In some embodiments, the fluidic channel has a height of no more than 1.5, 1.4, 1.3, 1.2, 1.1, 1.0, 0.9, 0.8, 0.7, 0.6, 0.5, 0.3, 0.2, 0.1, or 0.05 mm. In some embodiments, fluid loaded into the reagent port and the sample port is contained until external pressure is introduced at the inlet port and the sample moves unidirectionally. In some embodiments, the fluidic cartridge comprises a self sealing frit for preventing escape of liquids from the cartridge. In some embodiments, the self sealing frit comprises a self-sealing polymer comprising an acrylic, a polyolefin, a polyester, a polyamide, a poly(estersulfone), a polytetraflorethylene, a polyvinylchloride, a polycarbonate, a polyurethane, an ultra high molecular weight (UHMW) polyethylene frit, a hydrophilic polyurethane, a hydrophilic polyurea, or a hydrophilic polyureaurethane.

Fluidic cartridges herein are made of an injection molded polymer. In some embodiments, the fluidic cartridge is injection molded PMMA (acrylic), cyclic olefin copolymer (COC), cyclic olefin polymer (COP) or polycarbonate (PC). In some embodiments, the bubble trap material is selected for high levels of optical clarity, low autofluorescence, low water/fluid absorption, good mechanical properties (including compressive, tensile, and bend strength, Young's Modulus), and biocompatability.

Bubble Traps

In some embodiments, the cartridge components, cartridges, systems, and methods described herein are/contain a bubble trap. In other embodiments, the cartridge components, cartridges, systems, and methods described herein contain multiple traps. In some embodiments, the cartridge components, cartridges, systems, and methods described herein contain at least 1, at least 2, at least 3, at least 4, at least 5, at least 6, at least 7, at least 8, at least 9, at least 10, at least 12, at least 15, at least 20, at least 25, at least 30, at least 35, at least 40, at least 45, or at least 50, bubble traps. In some embodiments, the bubble traps require little to no surface treatment in order for the fluidic cartridge to obtain functional sample detection. In some embodiments, the bubble traps are connected to other cartridge components by way of a fluidic channel. In other embodiments, the cartridge components, cartridges, systems, and methods described herein contain at least 1, at least 2, at least 3, at least 4, at least 5, at least 6, at least 7, at least 8, at least 9, or at least 10, bubble traps sequentially connected to each other by a fluidic channel.

In some embodiments, the bubble traps are any functional shape for trapping bubbles. In other embodiments, the bubble traps are square, rectangular, oval, circle, triangle, trapezoid, rhombus, pentagon, hexagon, octagon, parallelogram, or any other shape functional for trapping bubbles. In some embodiments, bubble traps are measured by a length, a width, and a height. A length herein is the measurement along one side of the bubble trap, in the direction of fluid movement, parallel to a surface on which the device is resting. A width herein is the measurement along one side of the bubble trap, across the direction of fluid movement, parallel to a surface on which the device is resting. In some embodiments, the length is greater than the width. In some embodiments, the width is greater than the length. A height herein is a measurement taken inside the bubble trap, perpendicular to the surface on which the device is resting. In some embodiments, a height is the same measurement as a depth. In some embodiments, the bubble trap is at least 3 mm×3 mm×1 mm (width×length×height). In some embodiments, the bubble trap is at least 3 mm×5 mm×1 mm (width×length×height). In some embodiments, the bubble trap is at least 5 mm×8 mm×3 mm (width×length×height). In some embodiments, the bubble trap is at least 7 mm×10 mm×5 mm (width×length×height). In some embodiments, the bubble trap is at maximum 10 mm×10 mm×5 mm (width×length×height). In some embodiments, the bubble trap is at maximum 7 mm×10 mm×5 mm (width×length×height). In some embodiments, the bubble trap is at maximum 5 mm×8 mm×3 mm (width×length×height). In some embodiments, the bubble trap is at maximum 5 mm×5 mm×3 mm (width×length×height). In some embodiments the bubble trap is round. In some embodiments, the bubble trap has a circular shape when looking down at the top of the fluidic cartridge. In some embodiments, a bubble trap having a shape of a cylinder or a sphere. In some embodiments, the bubble trap has a diameter of at least 3 mm. In some embodiments, the bubble trap has a diameter of at least 5 mm. In some embodiments, the bubble trap has a diameter of at least 7 mm. In some embodiments, the bubble trap has a diameter of at least 10 mm. In some embodiments, the bubble trap has a height of at least 1 mm. In some embodiments, the bubble trap has a height of at least 2 mm. In some embodiments, the bubble trap has a height of at least 3 mm. In some embodiments, the bubble trap has a height of at least 4 mm. In some embodiments, the bubble trap has a height of at least 5 mm. In some embodiments, the bubble trap has a length of at least 3 mm. In some embodiments, the bubble trap has a length of at least 4 mm. In some embodiments, the bubble trap has a length of at least 5 mm. In some embodiments, the bubble trap has a length of at least 6 mm. In some embodiments, the bubble trap has a length of at least 7 mm. In some embodiments, the bubble trap has a length of at least 8 mm. In some embodiments, the bubble trap has a length of at least 10 mm. In some embodiments, the bubble trap has a width of at least 3 mm. In some embodiments, the bubble trap has a width of at least 4 mm. In some embodiments, the bubble trap has a width of at least 5 mm. In some embodiments, the bubble trap has a width of at least 6 mm. In some embodiments, the bubble trap has a width of at least 7 mm. In some embodiments, the bubble trap has a width of at least 8 mm. In some embodiments, the bubble trap has a width of at least 10 mm. In yet other embodiments, the bubble traps is any other dimension suitable for trapping bubbles. In other embodiments, the volume of one bubble trap is larger than the air gap native to the cartridge. In other embodiments, the total volume of the sequentially connected bubble traps is larger than the air gap native to the cartridge.

In some embodiments, the bubble trap is made of the same material as the rest of the fluidic cartridge. In some embodiments, the bubble trap is injection molded PMMA (acrylic), cyclic olefin copolymer (COC), cyclic olefin polymer (COP) or polycarbonate (PC). In some embodiments, the bubble trap material is selected for high levels of optical clarity, low autofluorescence, low water/fluid absorption, good mechanical properties (including compressive, tensile, and bend strength, Young's Modulus), and biocompatability.

Essentially, the threshold is that the cross sectional area of the bubble trap is greater than the expected cross sectional area of a bubble of air that could reach the trap. Once the amount of air in the trap is large enough such that a bubble can fill the cross sectional area of the trap, the air will then move with the fluid motion and is capable of exiting the trap. Contemplated herein, the cross sectional area of the inlet fluidic channel is about 0.25 $mm^2$ and the cross sectional area of the bubble trap is about 8 $mm^2$. In some embodiments, the cross sectional areal of the inlet fluidic channel is about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.2, 1.3, 1.4, 1.5, 1.6, 1.7, 1.8, 1.9, or 2.0 $mm^2$. In some embodiments, the cross sectional area of the bubble trap is about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, or 12.0 $mm^2$. In some embodiments, the cross sectional area of the bubble trap is at least two times the cross sectional area of the inlet fluidic channel.

Closed Cartridge System

In some embodiments, the cartridge components, cartridges, systems, and methods described herein utilize a closed cartridge system. In other embodiments, the closed cartridge system described herein utilizes one or more air inlet/outlets comprising at least one reservoir, at least one filter, and a self-sealing polymer, wherein the self-sealing polymer is contained within the at least one reservoir and activated upon contact with liquid. In some embodiments, the self-sealing polymer comprises an acrylic, a polyolefin, a polyester, a polyamide, a poly(estersulfone), a polytetraflorethylene, a polyvinylchloride, a polycarbonate, a polyurethane, an ultra high molecular weight (UHMW) polyethylene frit, a hydrophilic polyurethane, a hydrophilic polyurea, or a hydrophilic polyureaurethane. In yet other embodiments the closed cartridge system, further comprises an air inlet/outlet port, comprising an opening smaller than the reservoir itself. In some embodiments of the closed cartridge system, the filter of the closed cartridge system is a porous polyurethane filter. In some embodiments, the filter of the closed cartridge system is a porous nylon filter. In some embodiments of the closed cartridge system, the inactivated self-sealing polymer is air-permeable and the activated self-sealing polymer is air-impermeable. In other embodiments, the activated self-sealing polymer does not allow liquid to leak from the fluidic cartridge component. In yet other embodiments of the closed cartridge system, the activated self-sealing polymer creates a self-contained, disposable fluidic cartridge. In some embodiments, closed cartridge systems comprise a waste reservoir. In some embodiments, waste reservoirs have fluid that neutralizes biological fluids. In some embodiments, fluids that neutralize biological fluids comprise 10% chlorine bleach. In some embodiments, fluids that neutralize biological fluids comprise an alcohol such as isopropanol or ethanol, such as 70% ethanol or 70% isopropanol. In some embodiments, the neutralizing fluids are incorporated into an absorbent pad.

Measurements

Measurements herein, in some embodiments, are described as a length, a width, and a height. A length herein is the measurement along one side of the feature in the direction of fluidic movement, parallel to a surface on which the device or cartridge is resting. A width herein is the measurement from one side to the other, across the direction of fluidic movement, parallel to a surface on which the device or cartridge is resting, when the device or cartridge is lying flat on a surface. For example, from the perspective of the fluid movement from left to right in FIG. 1, the length would be the distance of fluid travel moving forward, width would be left to right from that perspective. In some embodiments, the length is greater than the width. In some embodiments, the width is greater than the length. A height herein is a measurement taken along either the length or the width of the feature, perpendicular to the surface on which the device or cartridge is resting, when the device or cartridge is lying flat on a surface. In some embodiments, a height is the same measurement as a depth. In some embodiments, a height or a depth is less than a width or a length.

EXAMPLES

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Example 1: Detection of DNA in a Patient Sample

A sample of blood is taken from an individual and is placed on the sample input port. The sample is drawn into the fluidics cartridge by capillary forces. The slider on the fluidics cartridge is moved from the initial position to the final position, closing the sample input port from the outside environment. The fluidics cartridge is then inserted into the compact device for the assay. A pump moves the sample into the test chamber where it is mixed with reagent from the reagent reservoir. A bubble trap in the fluidics prevents any air from entering the test chamber. The electronic chip applies a 14 Volt peak to peak (Vp-p) at 10 kHz sine wave for one minute, establishing AC dielectrophoretic (DEP) high field regions and AC dielectrophoretic (DEP) low field regions in order to isolate nanoparticulate DNA molecules to the DEP high field regions of the test chamber from larger particles in the blood sample, such as cells, aggregated proteins and exosomes, which are moved to the DEP low regions of the test chamber. A detection reagent in the sample reagent labels the DNA molecules in the sample with a SYBR Green label specific for the DNA molecules. At the conclusion of one minute, an image is taken through the optical pathway using an endoscope lens using the camera of a smart phone that is connected to the compact device. An application on the smart phone controls the compact device and processes the image generating a positive result for the DNA that is detected. The result is stored in an online database accessible to the individual and the individual's physician, in compliance with US HIPAA medical privacy laws.

Example 2: Fluidic Cartridges

FIG. 1 shows a top view of an exemplary embodiment of a fluidic cartridge 1. The fluidic cartridge 1 comprises an inlet port 2, a reagent reservoir 3, a sample reservoir 4, a bubble trap 5, a flow cell 6, a waste reservoir 7, and an outlet port 8, all connected by a fluidic channel 9. The exemplary fluidic cartridge of FIG. 1 also comprises a chip alignment feature 10. A sample is input into the fluidic cartridge 1 at the sample reservoir 4. Pressure is applied to the inlet port 2 which drives reagent, such as a buffer, from the reagent reservoir 3 to mix with the sample. The sample mixture travels through fluidic channels 9 which connect each of the inlet port 2, the reagent reservoir 3, the sample reservoir 4, the bubble trap 5, the flow cell 6, the waste reservoir 7, and the outlet port 8. Samples pass through the bubble trap 5, to remove any trapped air from the fluidic cartridge 1 to avoid clogs and allow detection of analytes without interfering bubbles in the flow cell detection window 6. Samples pass into the flow cell 6 for assay of presence of an analyte. Waste from the assay is kept in the waste reservoir 7. The outlet port 8 vents trapped air from the waste reservoir 8. The exemplary fluidic cartridge 1 also features a chip alignment feature 10 which allows a silicon chip to be properly aligned in the fluidic cartridge.

Figure 2:
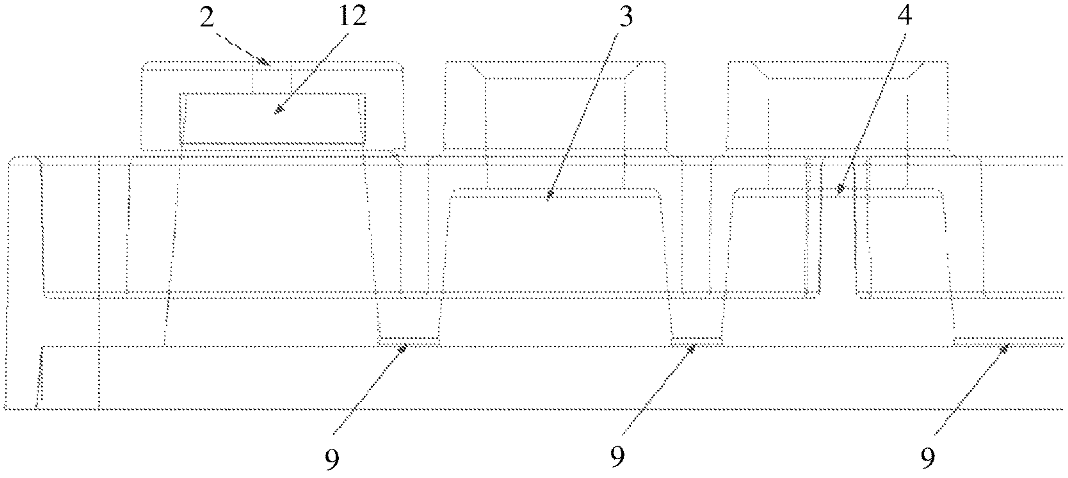
FIG. 2 shows a cross sectional view of the inlet side of the cartridge. A self sealing frit is sealed directly underneath the inlet port, allowing air to pass (and thus the pressure inside of the cartridge to be manipulated) for fluid motion control. The reagent reservoir and sample reservoir are initially open to the atmosphere allowing the user to insert said reagent and sample, and following insertion the user seals the reservoirs with an appropriate rubber, plastic, adhesive, or similar. Once these reservoirs are sealed, fluid motion control is possible, and the self sealing frits prevent any liquids (particularly biohazardous samples) from being able to exit the device.

FIG. 2 shows a cross-sectional view of a portion of an exemplary fluidic cartridge 1. In this view, there is an inlet port 2, a reagent reservoir 3, and a sample reservoir 4, connected by a fluidic channel 9. A self sealing frit 12 is sealed directly underneath the inlet port 2, allowing air to pass (and thus the pressure inside of the cartridge to be manipulated) for fluid motion control. The reagent reservoir 3 and sample reservoir 4 are initially open to the atmosphere allowing the user to insert said reagent and sample, and following insertion the user seals the reservoirs with an appropriate rubber, plastic, adhesive, or similar Once these reservoirs are sealed, fluid motion control is possible, and the self sealing frit 12 prevents any liquids (for example biohazardous samples) from being able to exit the device.

Figure 3:
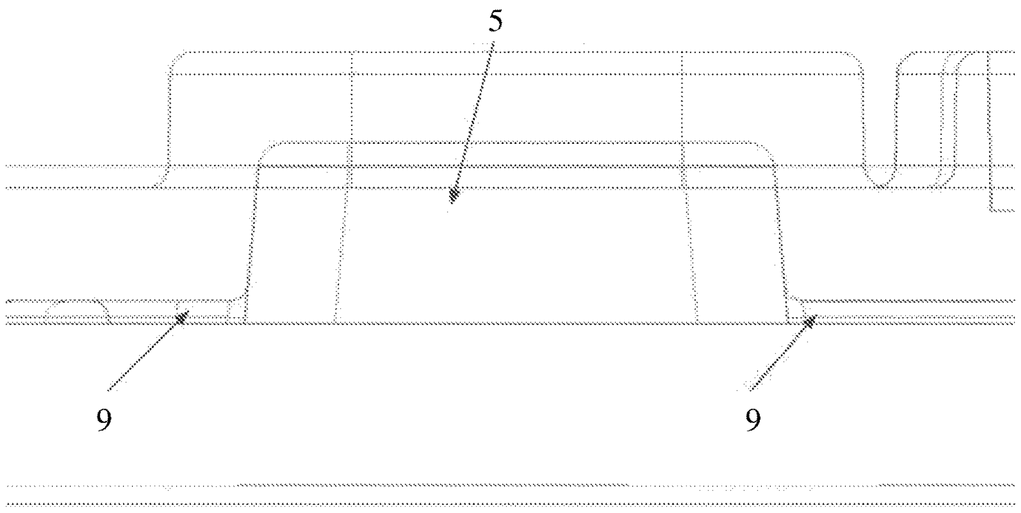
FIG. 3 shows an example bubble trap. The fluidic channels leading into and out of the bubble trap are typically ~1 mm wide and ~0.25 mm deep. The bubble trap is typically ~4 mm wide and ~2 mm deep. The two important design traits of the bubble trap are 1) the intentional increase in cross sectional area (our design goes from ~0.25 $mm^2$ to ~8 $mm^2$, and 2) the intentional design such that the bubble trap is elevated in the z-direction such that air in the fluidic channel will naturally rise (buoyancy) in the bubble trap, allowing the rest of the fluid to easily pass underneath.

FIG. 3 shows a cross sectional view of a portion of an exemplary fluidic cartridge 1. In this view, there is a bubble trap 5 connected upstream and downstream to the rest of the fluidic cartridge by a fluidic channel 9.

Figure 4:
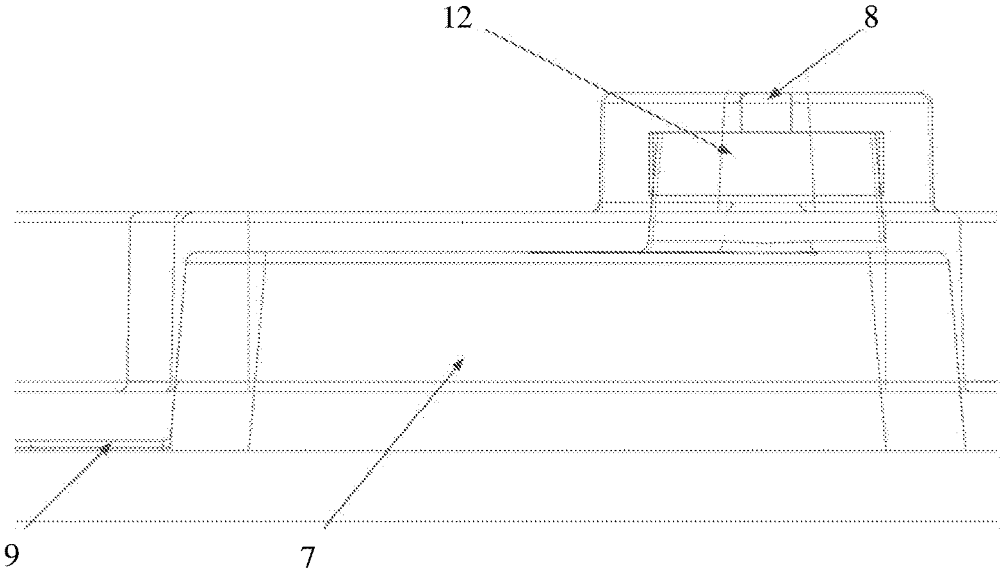
FIG. 4 shows a cross sectional view of the outlet side of the cartridge. A self sealing frit is sealed directly underneath the outlet port, allowing air to pass (and thus the pressure inside of the cartridge to be manipulated) for fluid motion control. The waste reservoir gives space for fluid to remain once it has passed through the flowcell, but if the fluid manages to reach the outlet port (user takes the cartridge and shakes it around, etc.), the self sealing frits prevent any liquids (particularly biohazardous samples) from being able to exit the device.

FIG. 4 shows a cross sectional view of a portion of an exemplary fluidic cartridge 1. In this view there is a waste reservoir 7, sealed by a self sealing frit 12, and an outlet port 8 for venting trapped air from the waste reservoir 7 which allows pressure inside of the fluidic cartridge 1 to be manipulated. The waste reservoir 7 gives space for fluid to remain once it has passed through the flowcell, but if the fluid manages to reach the outlet port (for example if a the fluidic cartridge is shaken or dropped), the self sealing frit 12 prevents any liquids (for example, biohazardous samples) from being able to exit the device. Fluidic channel 9 enables fluid communication of the waste reservoir with the rest of the fluidic cartridge.

Example 3: Compact Devices and Systems

Figure 5:
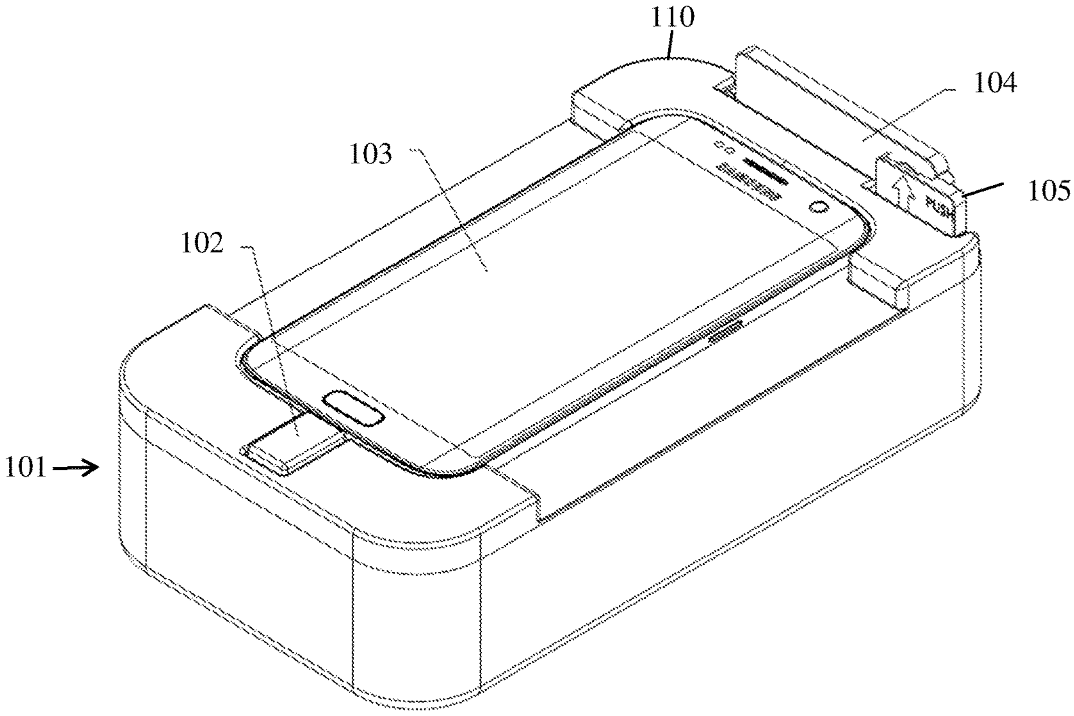
FIG. 5 shows a tilted top view of an exemplary compact device which connects to a smart phone via the USB port of the phone.

FIG. 5 shows a tilted top view of an exemplary compact device 101 having a hinged USB adapter 102, an exemplary portable computing system or mobile phone 103, a cartridge 104 with a slider 105. This exemplary compact device 101 has a concave top plate 110 sized and shaped to accommodate a mobile phone 103. The hinged USB adapter 102 is connected to the power port of the mobile phone 103.

Figure 6A:
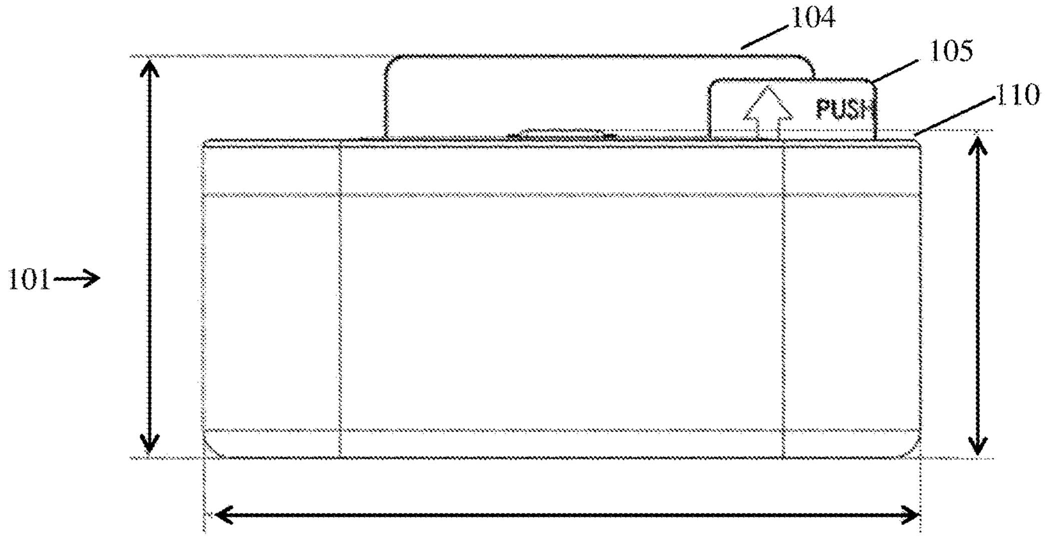
FIG. 6A shows side view of an exemplary compact device connected to a smart phone.

FIG. 6A shows a side view of an exemplary compact device 101 having a top plate 110, a cartridge 104 with a slider 105.

Figure 6B:
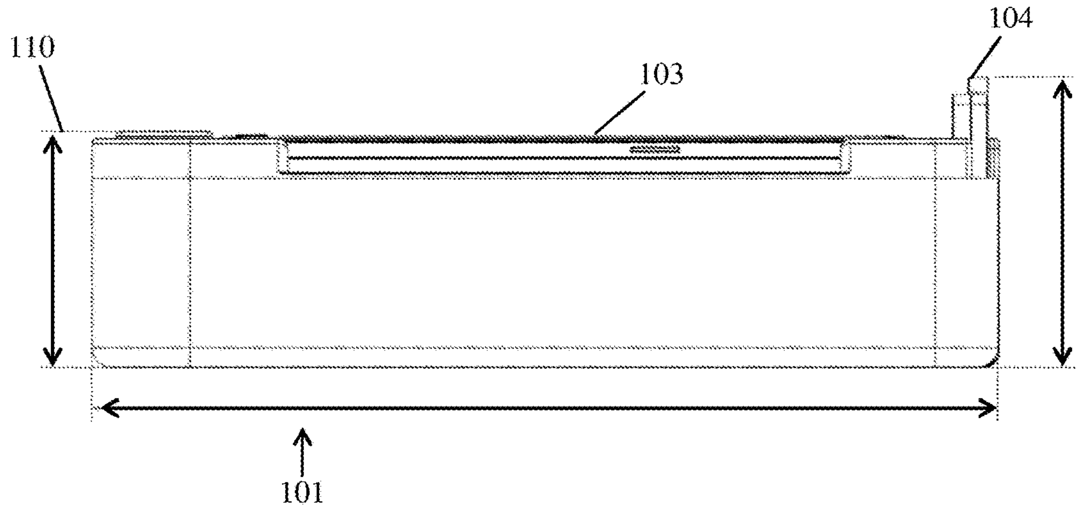
FIG. 6B shows a side view of an exemplary compact device connected to a smart phone.

FIG. 6B shows a side view of an exemplary compact device 101 having a concave top plate 110 configured to receive a mobile phone 103. The compact device 101 also has a cartridge 104.

Figure 6C:
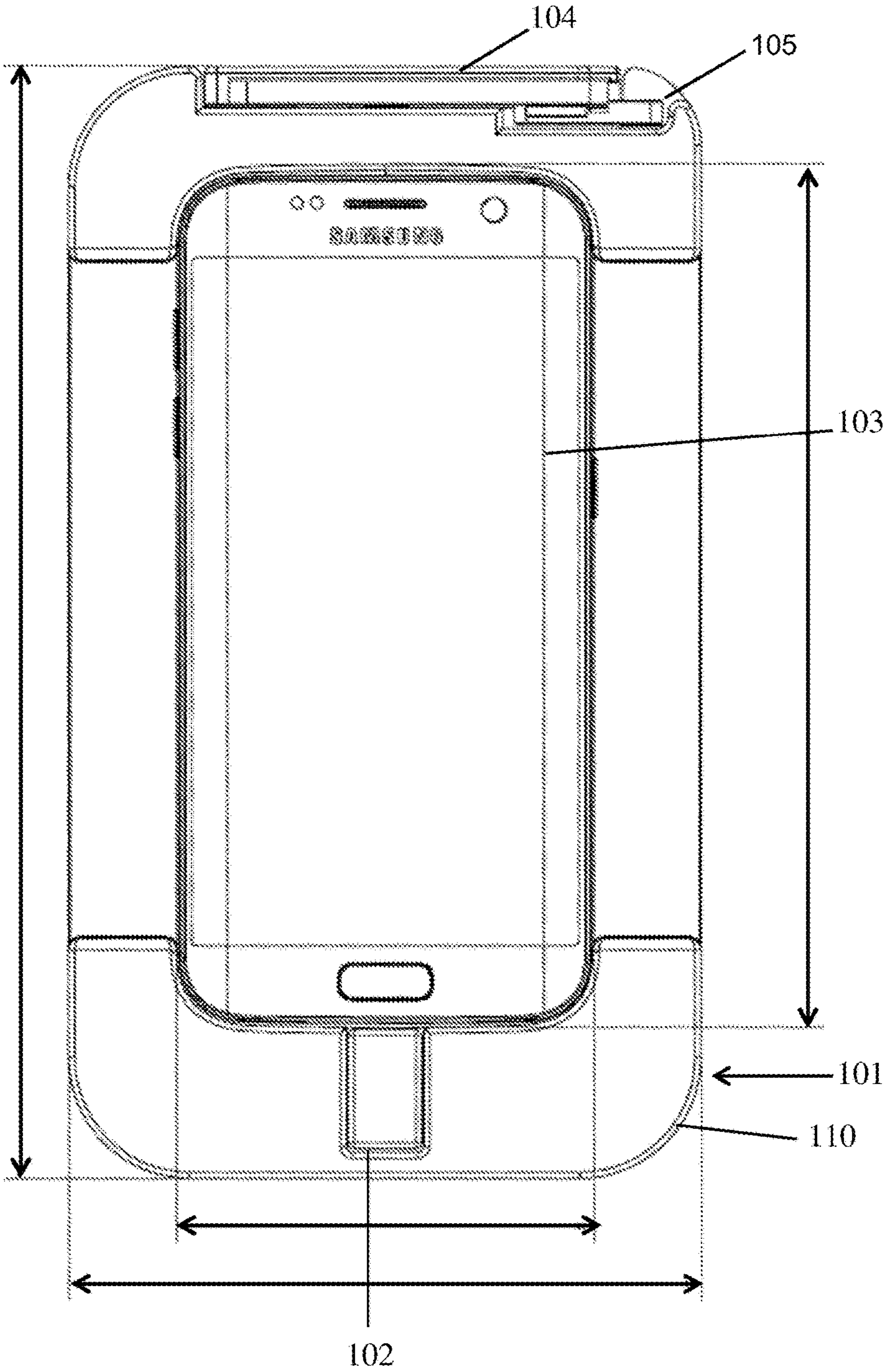
FIG. 6C shows a top view of an exemplary compact device connected to a smart phone.

FIG. 6C shows a top view of an exemplary compact device 101 having a hinged USB adapter 102, a concave top plate 110 configured to receive a mobile phone 103, and a cartridge 104 with a slider 105. The hinged USB adapter 102 is connected to the power port of the mobile phone 103.

Figure 7A:
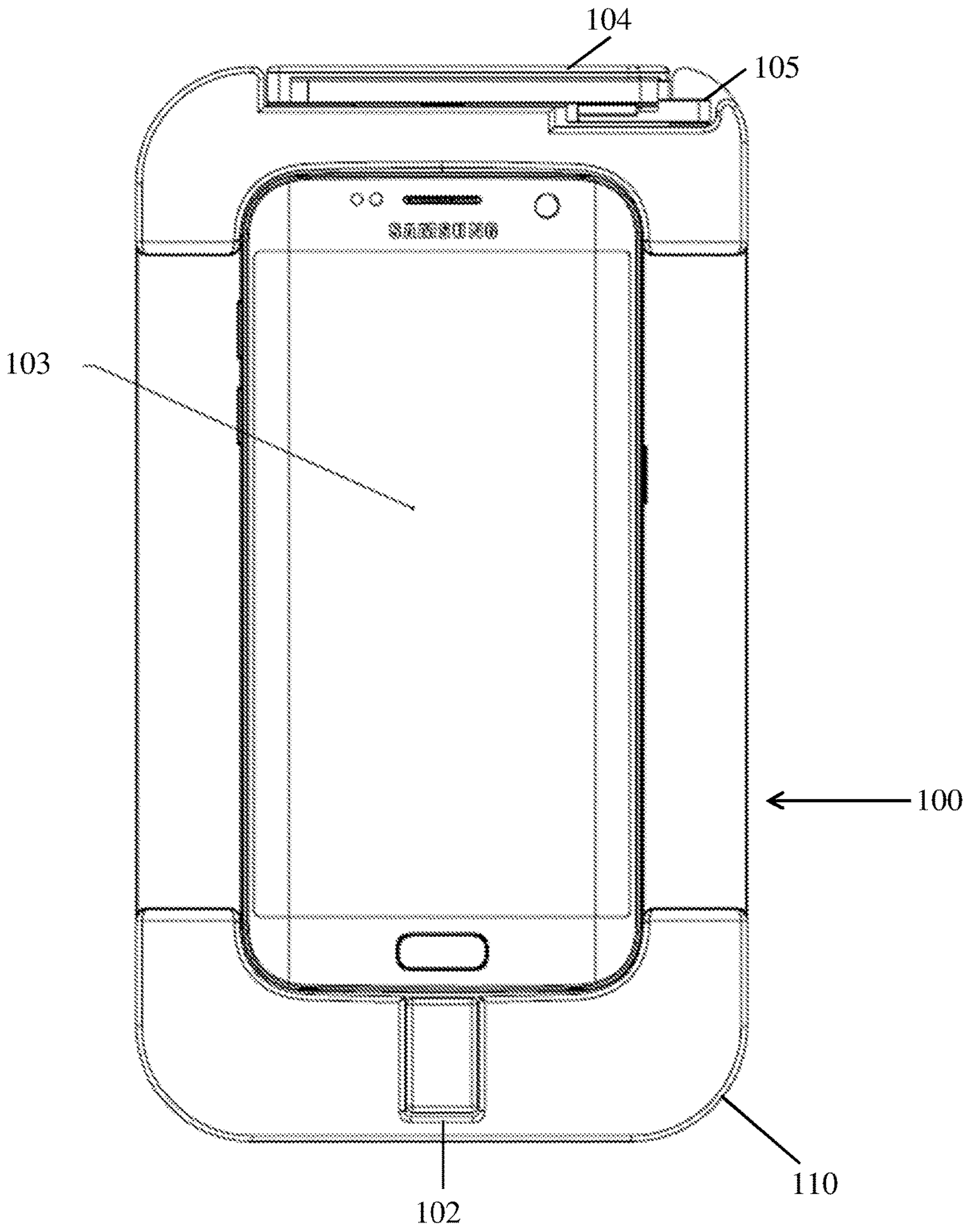
FIG. 7A shows a top view of an exemplary compact device connected to a smart phone.

FIG. 7A shows a top view of the compact device 101 with a mobile phone 103 connected via the hinged USB adapter 102. The compact device also has a cartridge 104 with a slider 105.

Figure 7B:
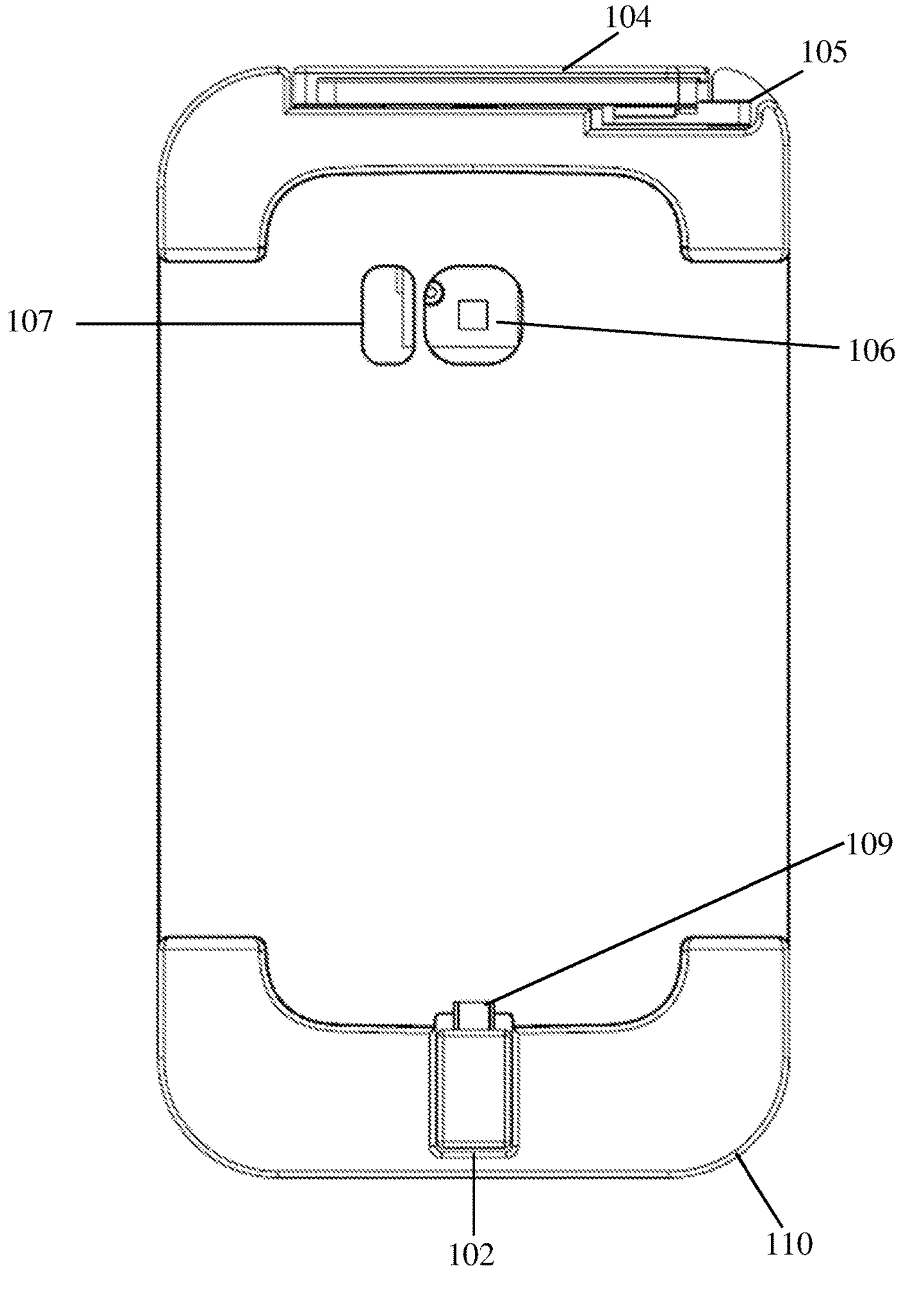
FIG. 7B shows a top view of an exemplary compact device without a smart phone connected.

FIG. 7B shows a top view of the compact device without a mobile phone. This view shows a USB adapter 102 having a USB connecter 109 and a concave top plate 110 configured to receive a mobile phone having an optical path window 106 and a LED illumination window 107. The compact device 101 has a cartridge 104 with a slider 105.

Figure 8A:
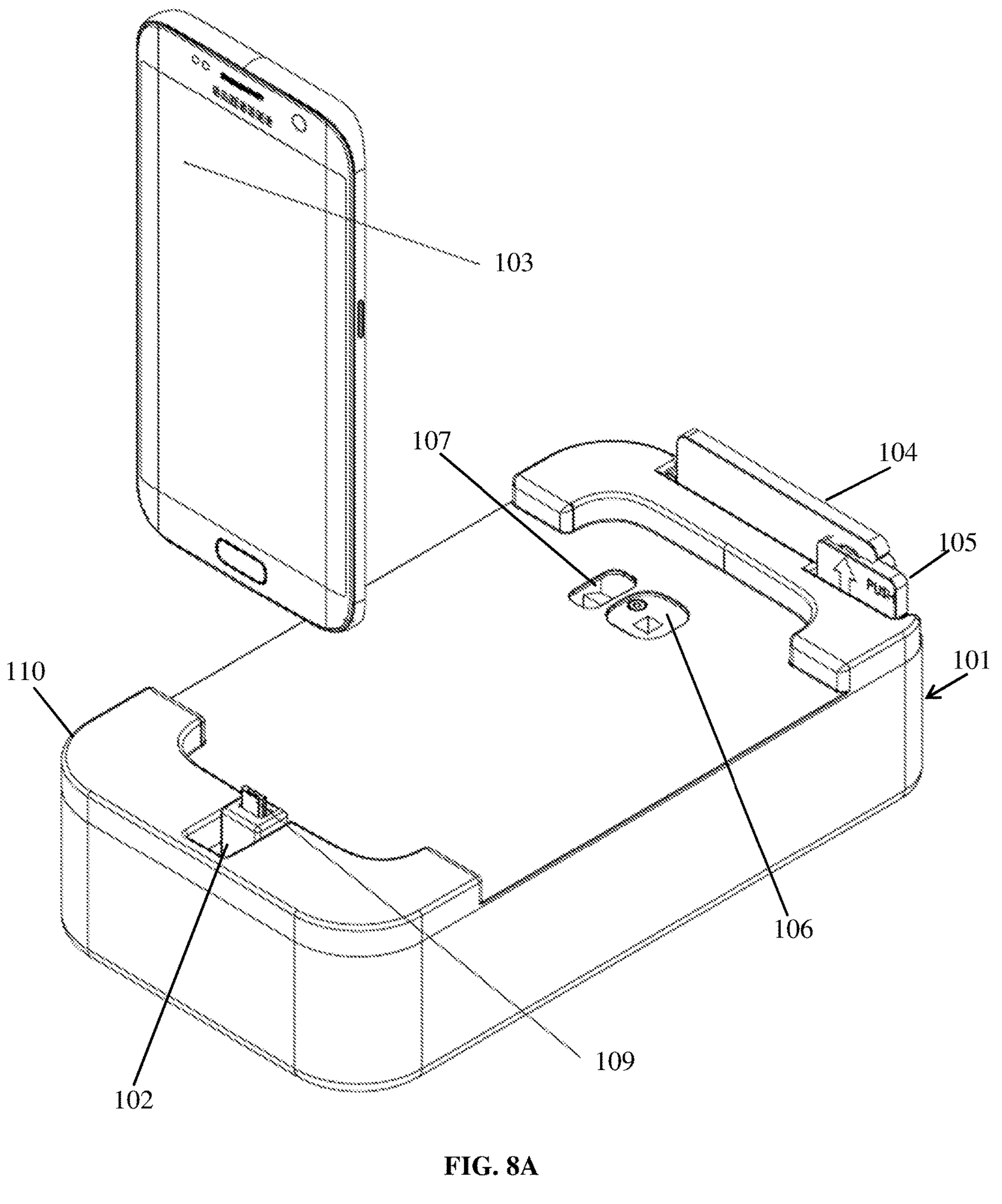
FIG. 8A shows a tilted top view of an exemplary compact device including a USB phone mount and a smart phone.

FIG. 8A shows a tilted top view of a compact device 101 having a hinged USB adapter 102 with a USB connecter 109, positioned to receive a mobile phone 103. The compact device 101 has a concave top plate 110 having an optical path window 106 and a LED window 107. The compact device also has a cartridge 104 with a slider 105.

Figure 8B:
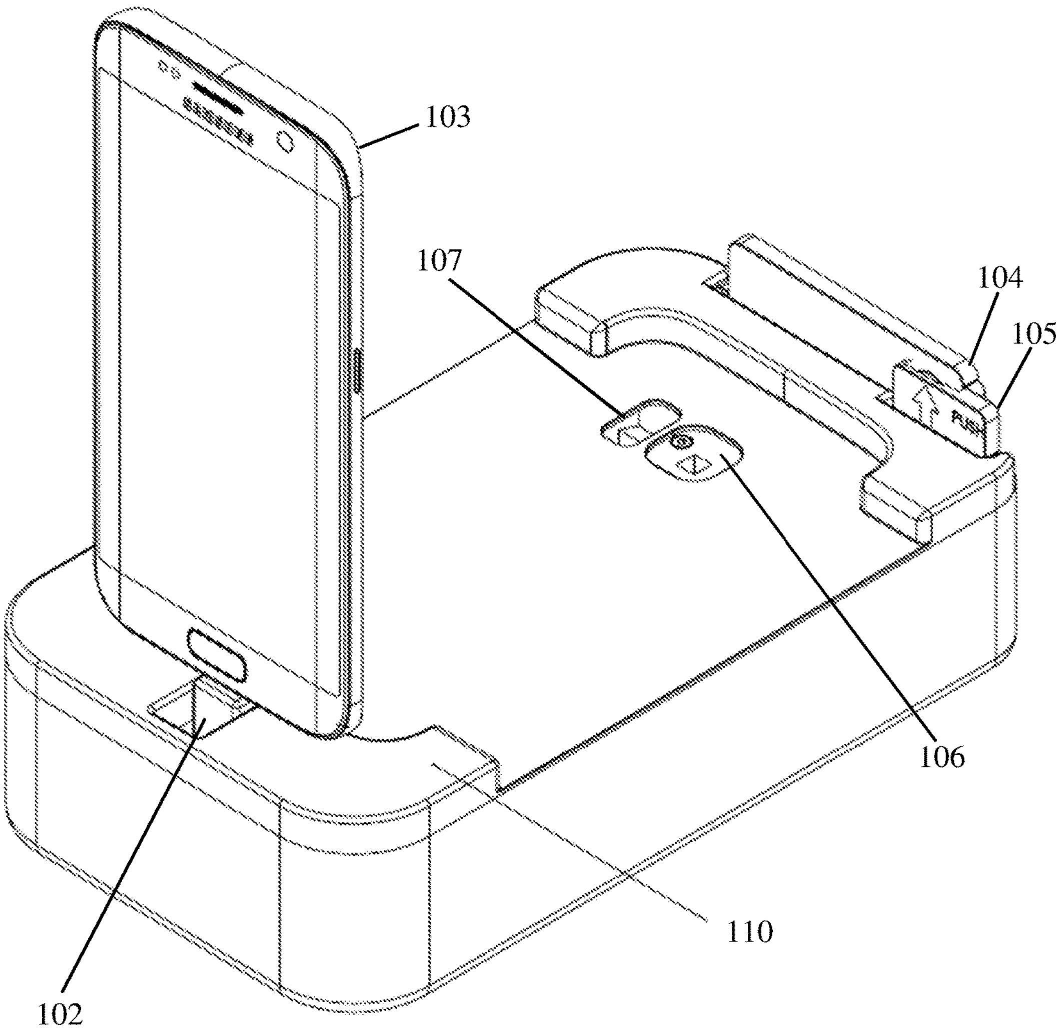
FIG. 8B shows a tilted top view of an exemplary compact device with a smart phone connected to the USB mount.

FIG. 8B shows a tilted top view of a compact device 101 having a hinged USB adapter 102 connected to a mobile phone 103. The compact device 101 has a concave top plate 110 having an optical path window 106 and a LED window 107. The compact device also has a cartridge 104 with a slider 105.

Figure 9A:
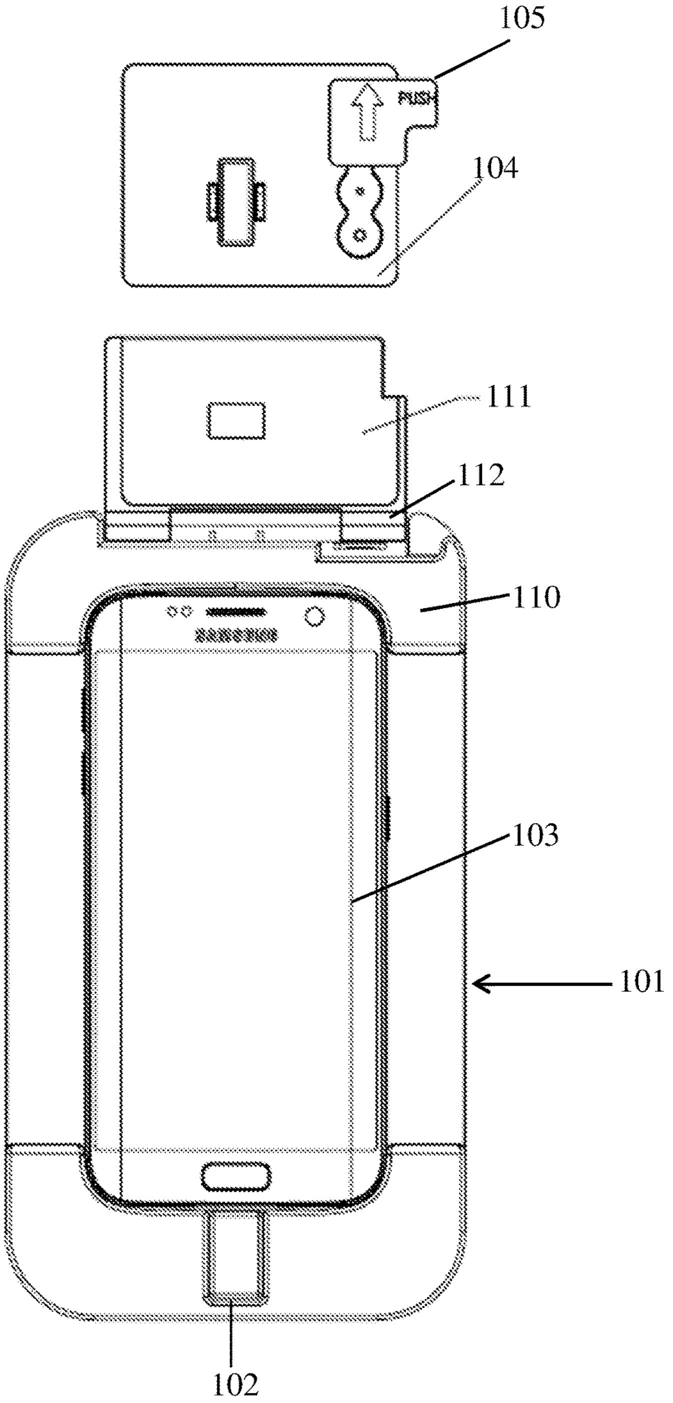
FIG. 9A shows a top view of an exemplary compact device connected to a smart phone with an open cartridge door and a compact cartridge that fits into the cartridge door.

FIG. 9A shows a top view of a compact device 101 having a hinged USB adapter 102 connected to a mobile phone 103. The compact device 101 has a concave top plate 110 configured to receive a mobile phone 103. The compact device 101 also has an open cartridge door 111 with a hinge 112 configured to receive a cartridge 104 having a slider 105.

Figure 9B:
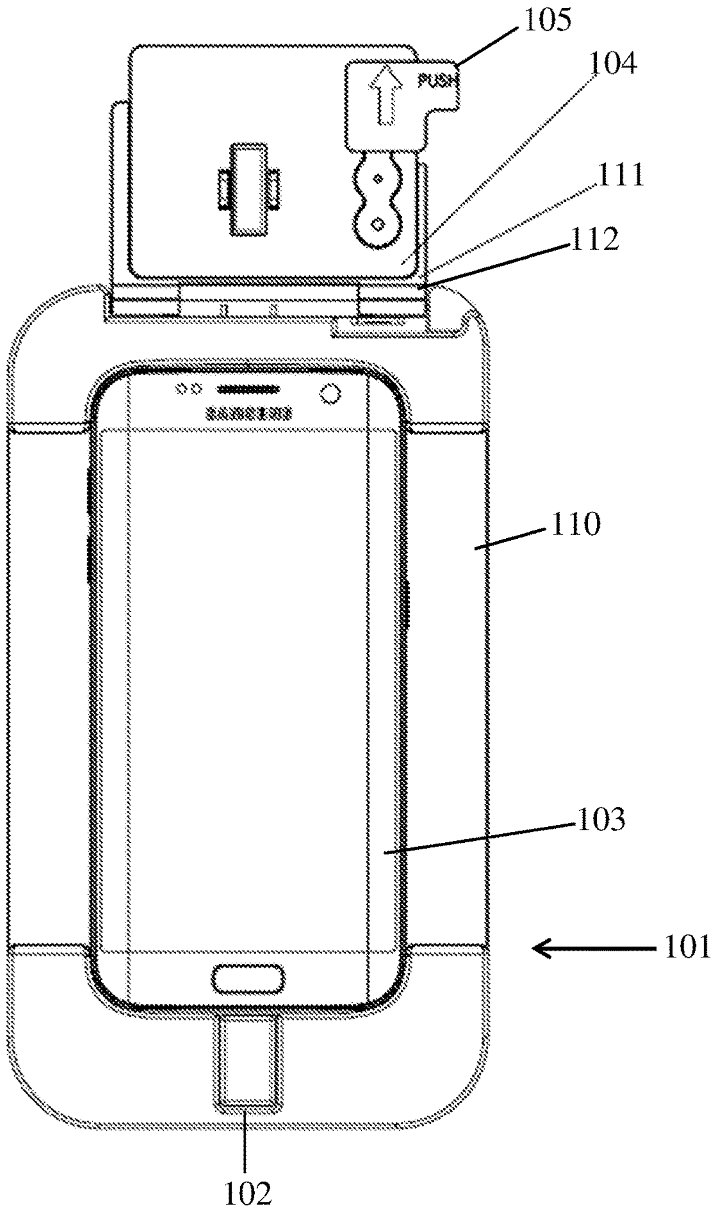
FIG. 9B shows a top view of an exemplary compact device connected to a smart phone with a cartridge loaded into an open cartridge door.

FIG. 9B shows a top view of a compact device 101 having a hinged USB adapter 102 connected to a mobile phone 103. The compact device 101 has a concave top plate 110 configured to receive a mobile phone 103. The compact device 101 also has an open cartridge door 111 with a hinge 112 receiving a cartridge 104 having a slider 105.

Figure 10A:
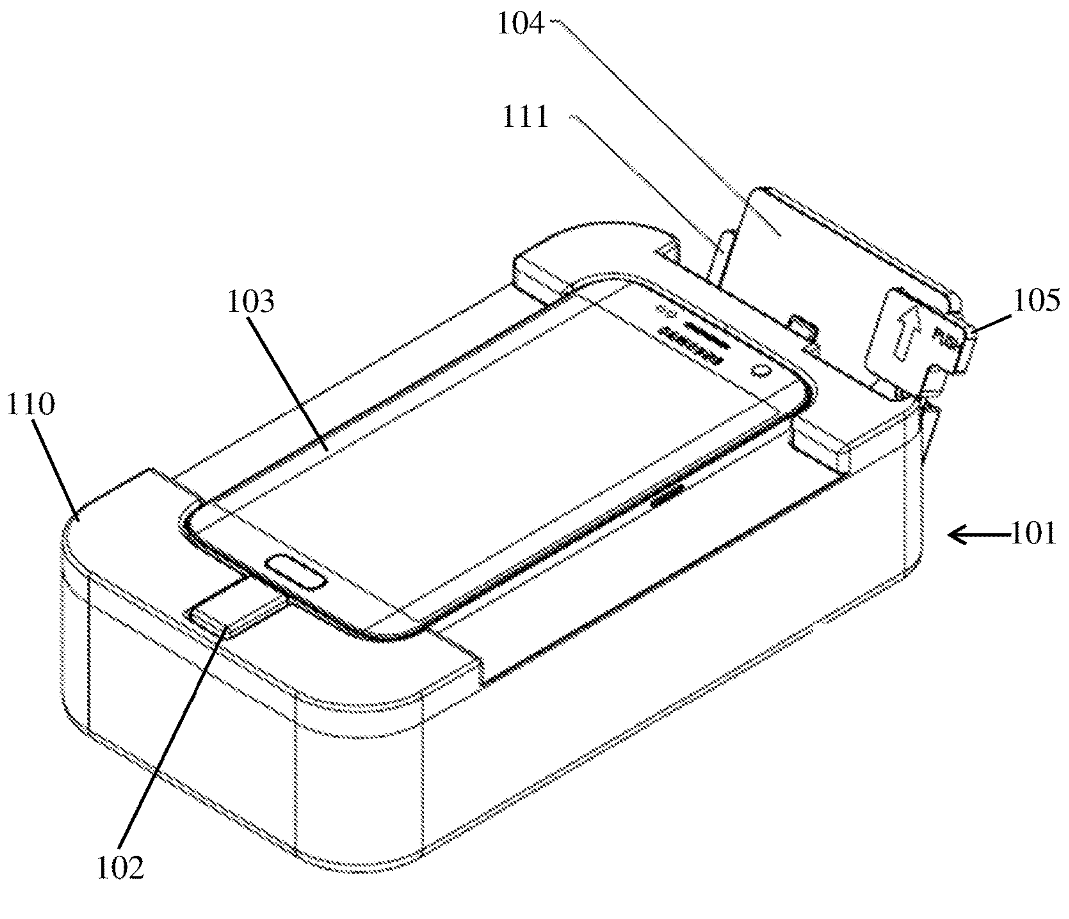
FIG. 10A shows a tilted top view of an exemplary compact device connected to a smart phone with a cartridge loaded into open cartridge door that opens at an angle.

FIG. 10A shows a tilted top view of a compact device 101 having a hinged USB adapter 102 connected to a mobile phone 103. The compact device 101 has a concave top plate 110 configured to receive a mobile phone 103. The compact device 101 also has a partially open cartridge door 111 with a hinge 112 receiving a cartridge 104 having a slider 105.

Figure 10B:
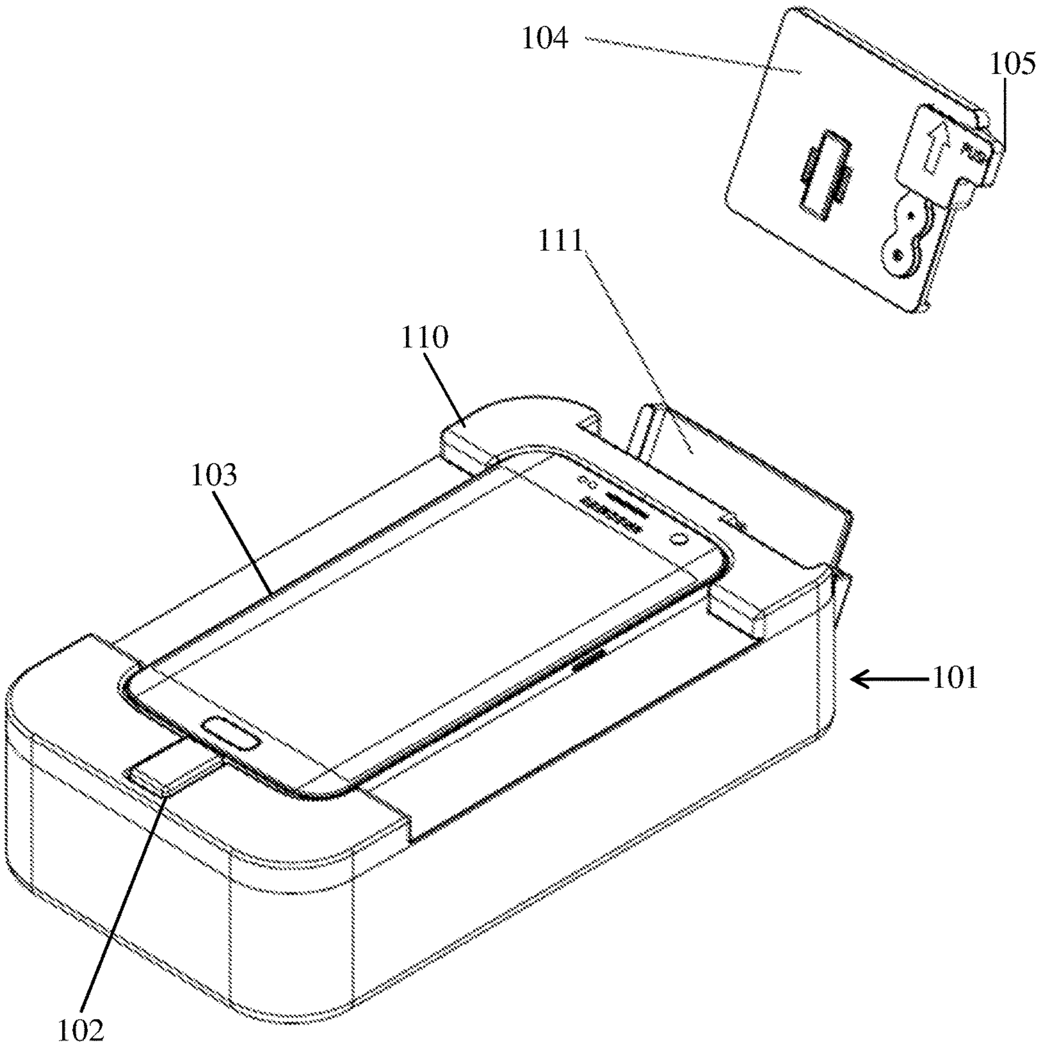
FIG. 10B shows a tilted top view of an exemplary compact device connected to a smart phone with an open cartridge door that opens at an angle and a compact cartridge that fits into the cartridge door.

FIG. 10B shows a tilted top view of a compact device 101 having a hinged USB adapter 102 connected to a mobile phone 103. The compact device 101 has a concave top plate 110 configured to receive a mobile phone 103. The compact device 101 also has a partially open cartridge door 111 with a hinge 112 configured to receive a cartridge 104 having a slider 105.

Figure 11A:
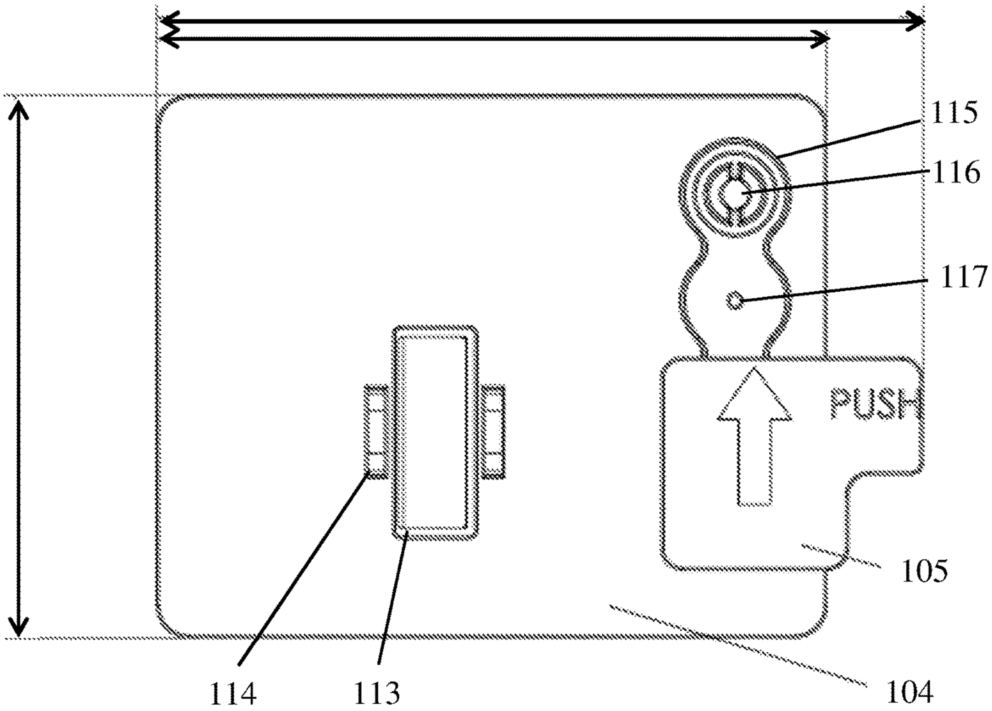
FIG. 11A shows a top view of an exemplary compact cartridge which includes a slider component.

FIG. 11A shows a top view of a cartridge 104 having a slider 105, a chip alignment feature 113, an electrical contact window 114, a sample input port 115, and a sample reservoir port 117. The slider 105 is configured to cover the sample input port 115 and the sample reservoir port 117 once a sample has been put into the cartridge 104.

Figure 11B:
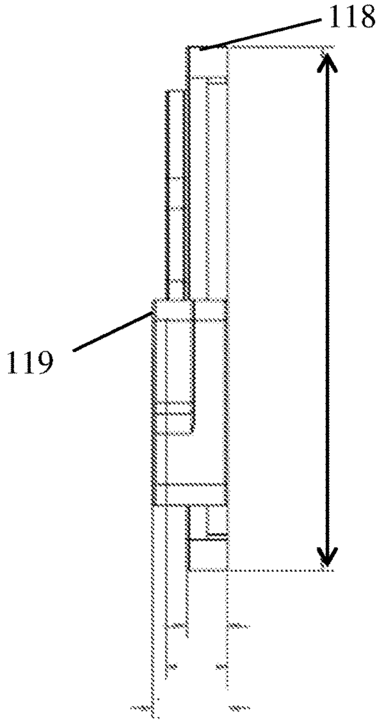
FIG. 11B shows a side view of an exemplary compact cartridge.

FIG. 11B shows a side view of a cartridge 104 having a slider 105.

Figure 11C:
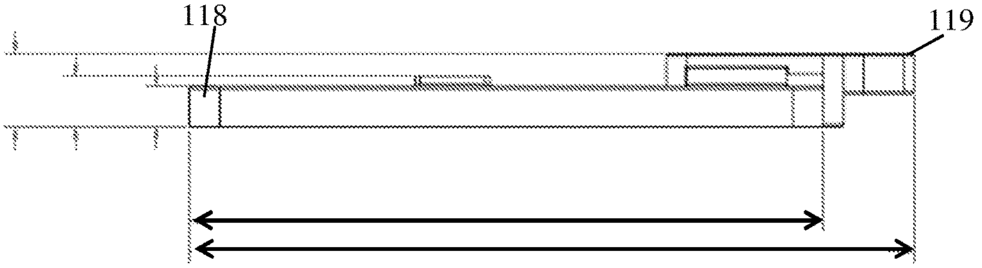
FIG. 11C shows a side view of an exemplary compact cartridge.

FIG. 11C shows a side view of a cartridge 104 having a slider 105.

Example 4: Single Sample Fluidic Cartridge

Figure 12:
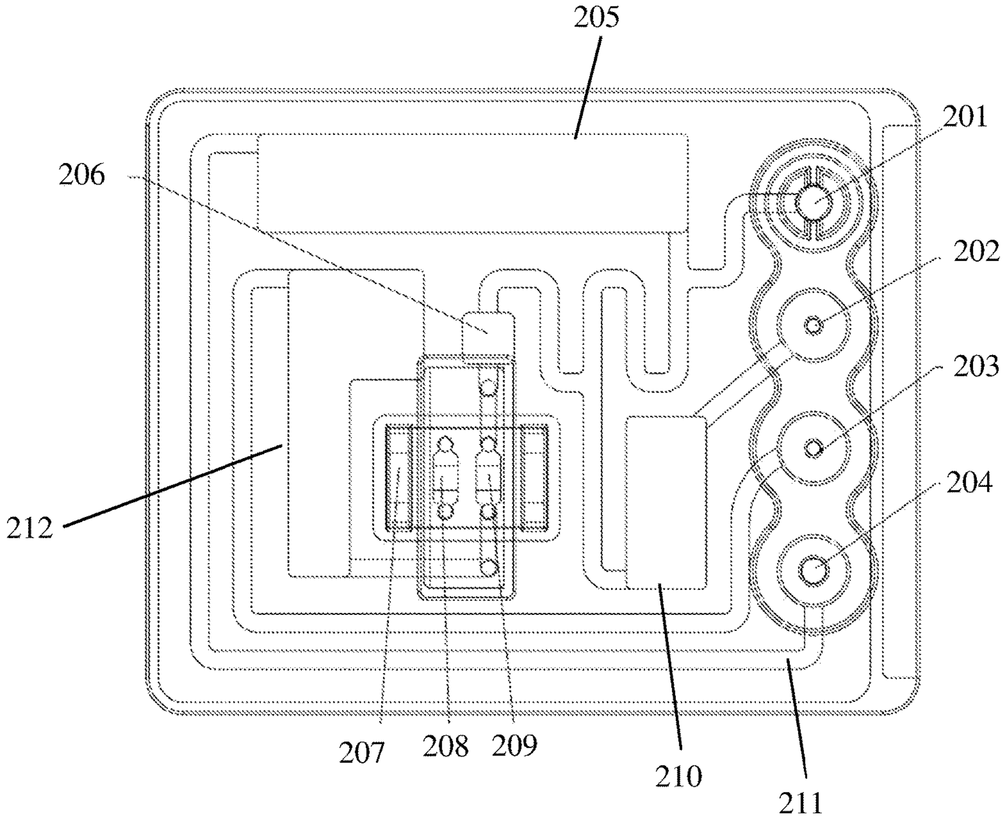
FIG. 12 shows a top view of an exemplary compact cartridge without a slider component. The exemplary compact cartridge has a blood input port, a blood reservoir port, a waste reservoir port, a reagent reservoir port and pump interface location, a blood reservoir, a reagent reservoir, a waste reservoir, a bubble trap, a chip, a control solution chamber, and a test chamber.

FIG. 12 shows a top view of an exemplary single sample fluidic cartridge 200 without a slider having a sample input port 201, a sample reservoir port 202, a waste reservoir port 203, a reagent reservoir port 204 which is the location of the pump interface, a reagent reservoir 205, a bubble trap 206, a chip 207, a control solution chamber 208, a test chamber 209, a chip alignment feature 212, a sample reservoir 210, and a fluidic channel 211. Pressure applied at the pump interface location at the reagent reservoir 204 moves the sample through the fluidic channel in the fluidic cartridge 200 allowing measurement of an analyte at the test chamber 209. Wash/reagent is loaded into wash reagent chamber 205 in manufacturing, control solution/reagent is loaded into control chamber 208 in manufacturing, sample port 201 and sample reservoir port 202 are open to atmosphere, waste reservoir port 203 and wash reservoir port 204 are closed, sample is inserted by the user into sample port (201), sample fills fluidic line between sample port and sample reservoir (210) through capillary action, excess sample flows into sample reservoir (210), sample port (201) and sample reservoir port (202) are closed, waste reservoir port (203) and wash reservoir port (204) opened to atmosphere, cartridge is loaded into device to create fluidic interface with wash reservoir port (204) and electrical interface with electrical contacts on chip (207), waste reservoir port (203) remains open to atmosphere, pressure is induced to wash reservoir port (204), pressure drives wash reagent from reagent chamber (205) into fluidic line between reagent chamber (205) and bubble trap (206), sample which was previously loaded into fluidic line between reagent chamber (205) and bubble trap (206) is driven towards bubble trap (206) by wash reagent, sample flows through bubble trap (206) to remove air, sample flows through flowcell (209) during which an electrical signal is applied to the chip (207) to capture sample material, sample flows into waste reservoir (212), wash reagent flows through bubble trap (206) to remove air, wash reagent flows through flowcell (209) to wash captured sample material, wash reagent flows into waste reservoir (212), control chamber (208) and flowcell (209) are imaged simultaneously to quantify collected sample material within flowcell (209), cartridge is removed and discarded.

Figure 13A:
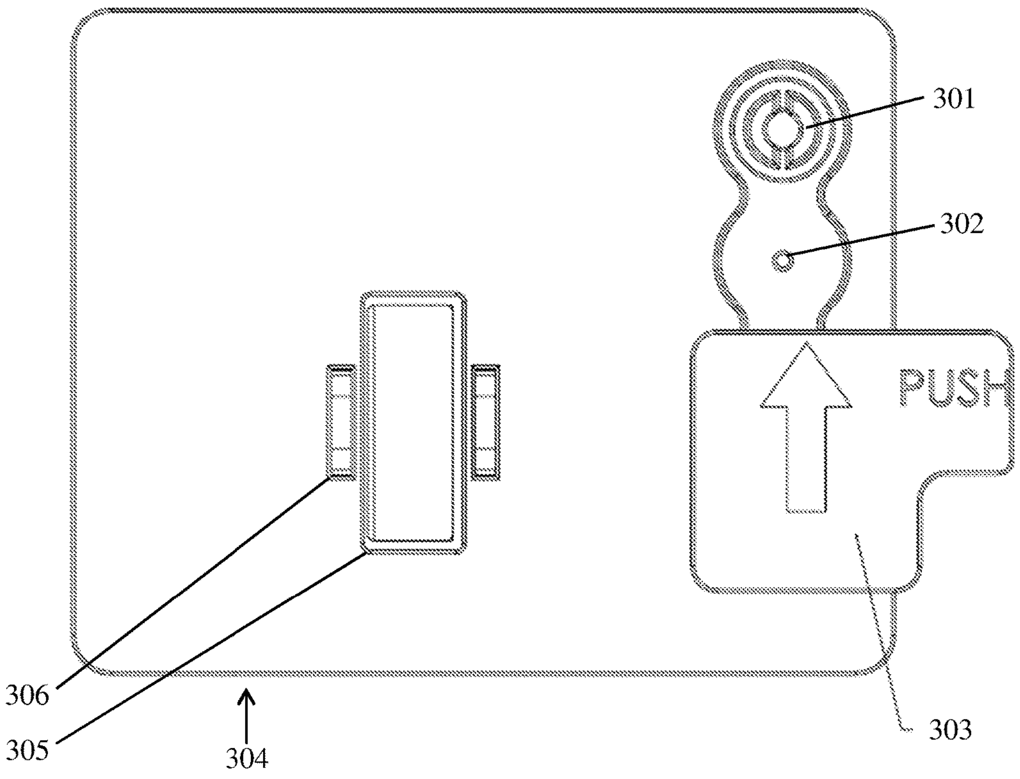
FIG. 13A shows a top view of an exemplary compact cartridge with a slider in an initial position.

FIG. 13A shows a top view of an exemplary single sample fluidic cartridge 304 with a slider 303. In this view, the slider is in the initial position and the sample input port 301 and sample reservoir port 302 are exposed for inputting sample. This view also shows a chip alignment feature 305 and an electrical contact window 306.

Figure 13B:
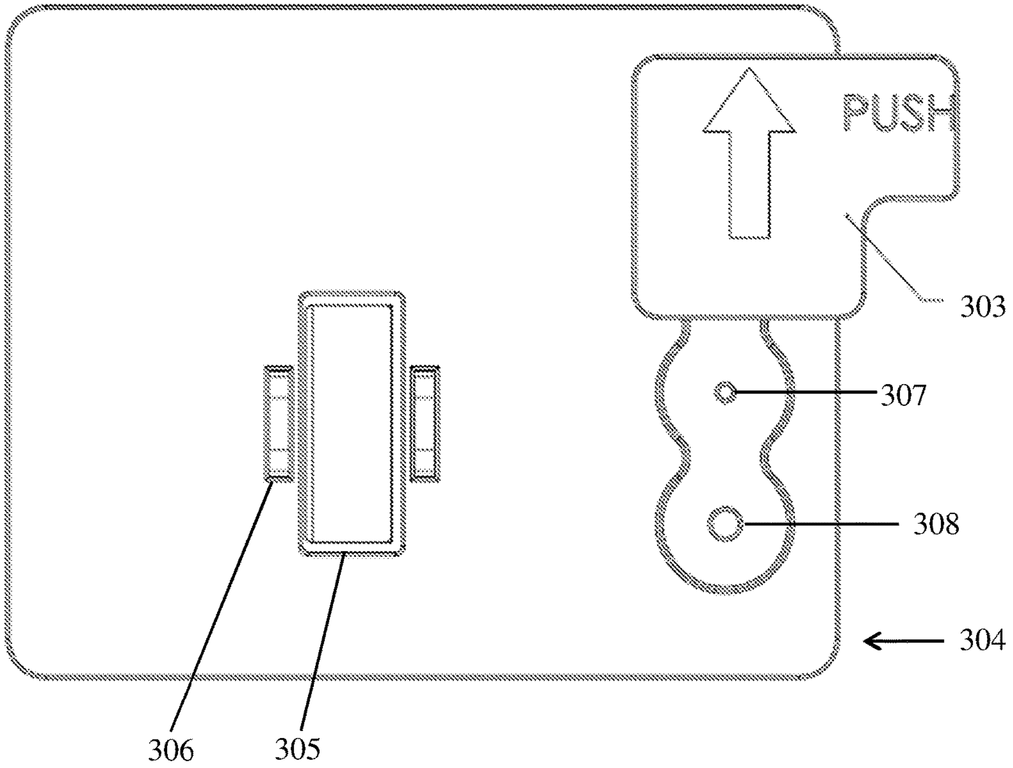
FIG. 13B shows a top view of an exemplary compact cartridge with a slider in a final position. The slider is used to cover the blood input port and blood reservoir port once the sample has been loaded into the cartridge. By moving the slider, the user opens the waste reservoir port and reagent reservoir port and allows for pump interfacing. The slider must be moved to the final position before placing the cartridge into the system.

FIG. 13B shows a top view of an exemplary single sample fluidic cartridge 304 with a slider 303. In this view, the slider is in the final position and the waste reservoir port 307 and reagent port 308 are exposed to allow for pump interfacing. The slider 303 must be in the final position before placing the cartridge 304 into the compact device. This view also shows a chip alignment feature 305 and an electrical contact window 306.

Example 5: Compact Devices and Systems

Figure 14A:
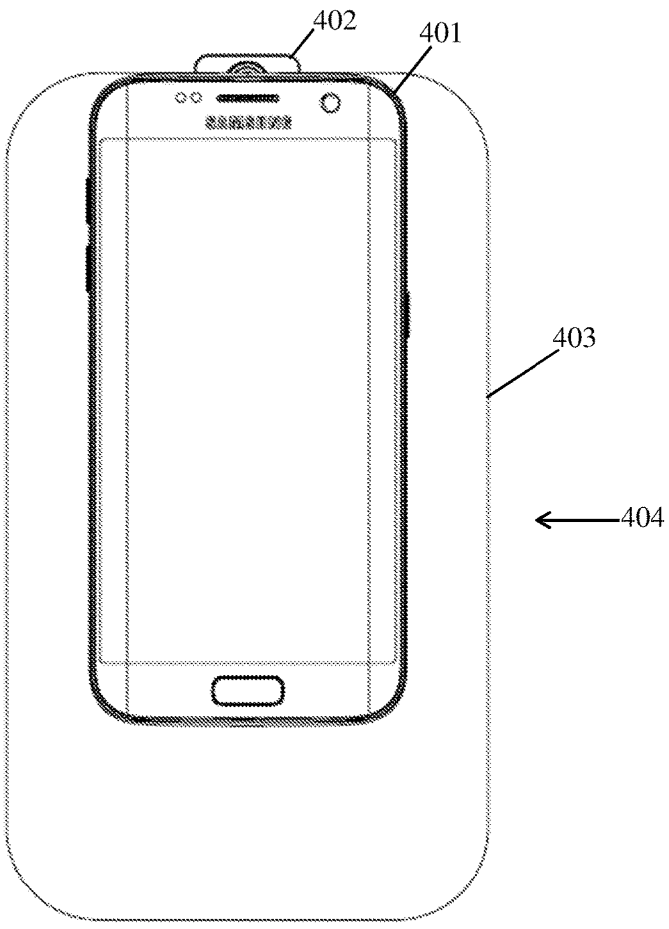
FIG. 14A shows a top view of an exemplary compact device with a smart phone and a cartridge inserted into the slot.

FIG. 14A shows a top view of a compact device 404 having flat top plate 403 capable of use with any computing device such as a mobile phone 401. The compact device 404 also has a cartridge 402 inserted into a cartridge slot. The compact device 404 is not connected to the mobile phone 401.

Figure 14B:
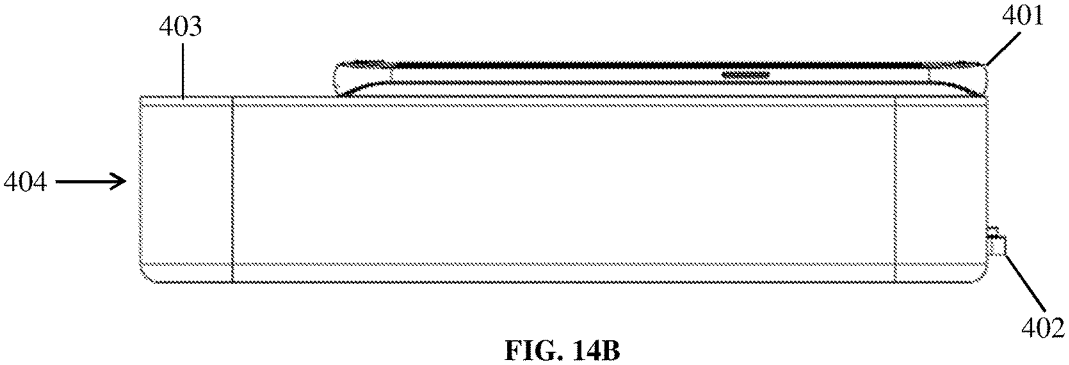
FIG. 14B shows a side view of an exemplary compact device with a smart phone and a cartridge inserted into the slot.

FIG. 14B shows a side view of a compact device 404 having a flat top plate 403, a mobile phone 401, and a cartridge 402 inserted into a cartridge slot (not shown). The compact device 404 is not connected to the mobile phone 401.

Figure 14C:
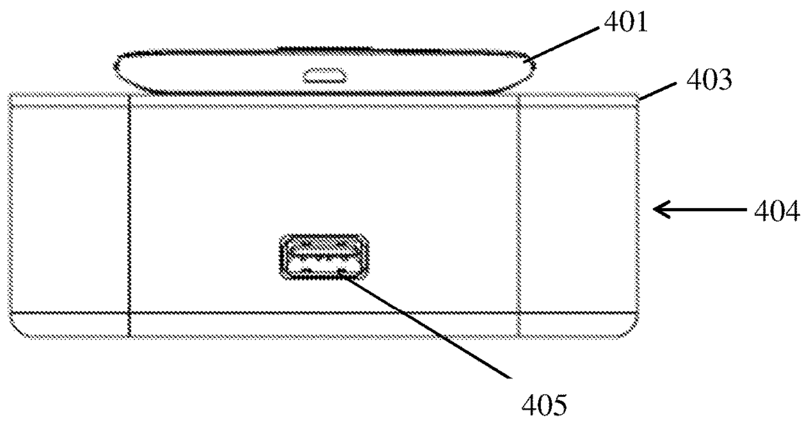
FIG. 14C shows a side view of an exemplary compact device with a smart phone.

FIG. 14C shows a side view of a compact device 404 having flat top plate 403, a mobile phone 401, and a USB port 405. The compact device 404 is not connected to the mobile phone 401.

Figure 14D:
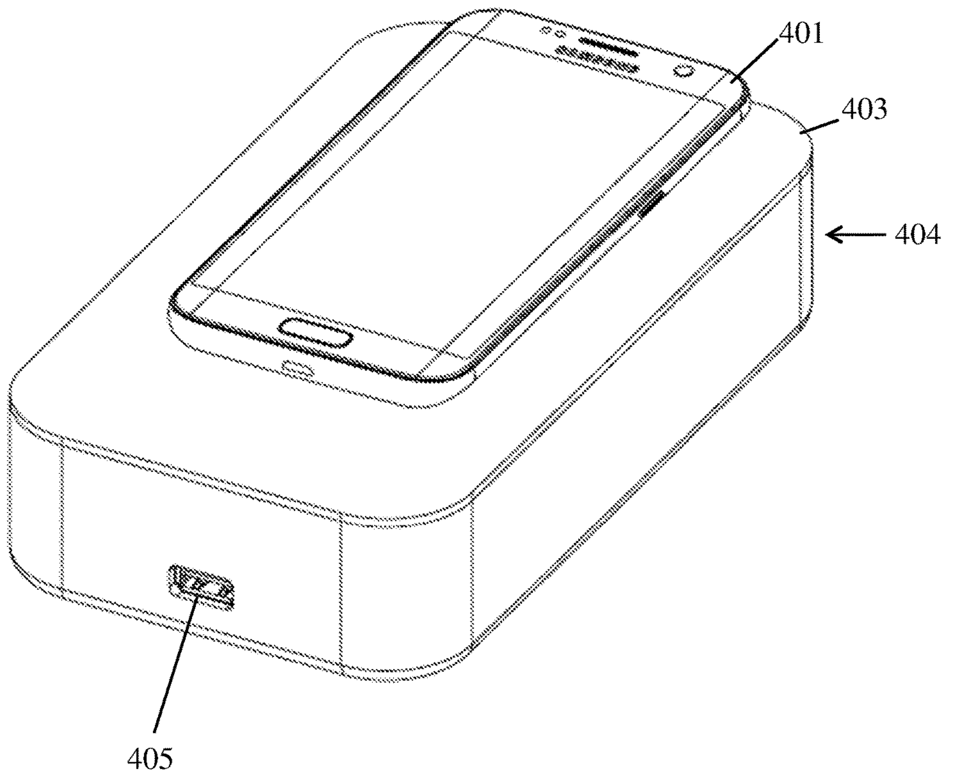
FIG. 14D shows a tilted top view of an exemplary compact device with a smart phone.

FIG. 14D shows a tilted top view of a compact device 404 having flat top plate 403, a mobile phone 401, and a USB port 405. The compact device 404 is not connected to the mobile phone 401.

Figure 15A:
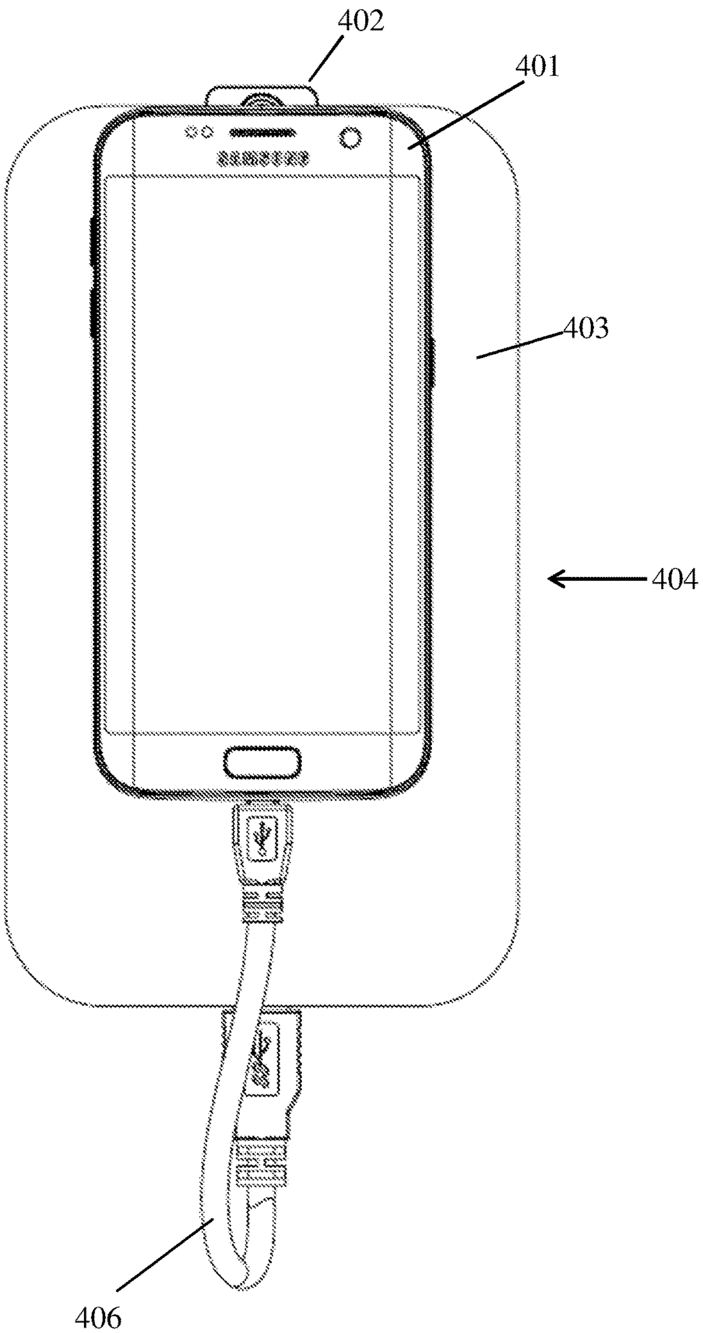
FIG. 15A shows a top view of an exemplary compact device with a smart phone connected to the USB adapter with a cartridge inserted into the slot.

FIG. 15A shows a top view of a compact device 404 having a flat top plate 403 capable of use with any computing device such as a mobile phone 401. The compact device 404 also has a cartridge 402 inserted into a cartridge slot (not shown). The compact device 404 is connected to the mobile phone 401 with a USB cord 406.

Figure 15B:
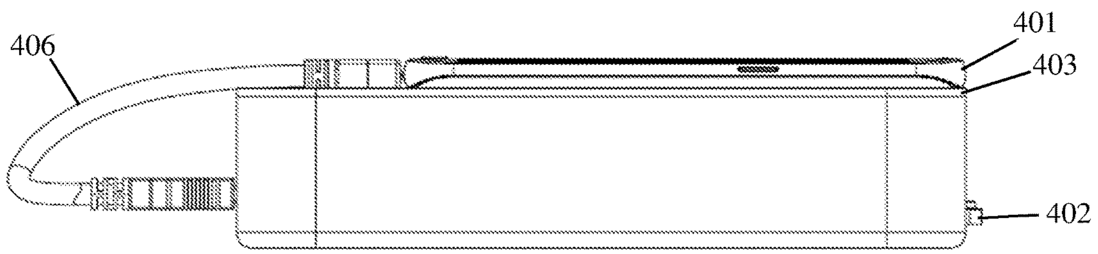
FIG. 15B shows a side view of an exemplary compact device with a smart phone connected to the USB adapter with a cartridge inserted into the slot.

FIG. 15B shows a side view of a compact device 404 having a flat top plate 403, a mobile phone 401, and a cartridge 402 inserted into a cartridge slot (not shown). The compact device 404 is connected to the mobile phone 401 with a USB cord 406.

Figure 15C:
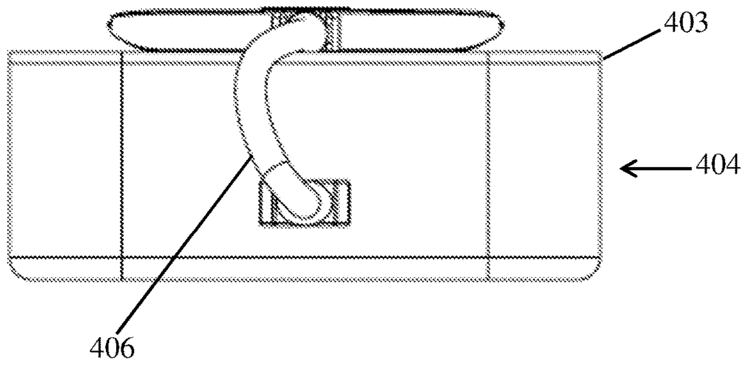
FIG. 15C shows a side view of an exemplary compact device with a smart phone connected to the USB adapter.

FIG. 15C shows a side view of a compact device 404 having flat top plate 403, a mobile phone 401 connected to a compact device 404 with a USB cord 406.

Figure 15D:
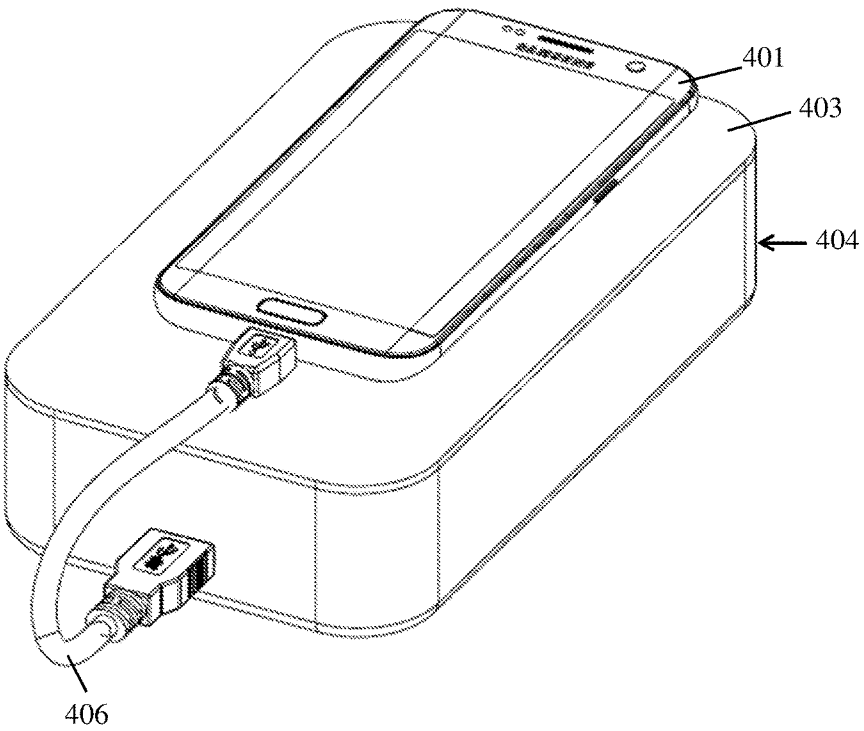
FIG. 15D shows a tilted top view of an exemplary compact device with a smart phone connected to the USB adapter.

FIG. 15D shows a tilted top view of a compact device 404 having flat top plate 403, a mobile phone 401 connected to compact device 404 with a USB cord 406.

Figure 16A:
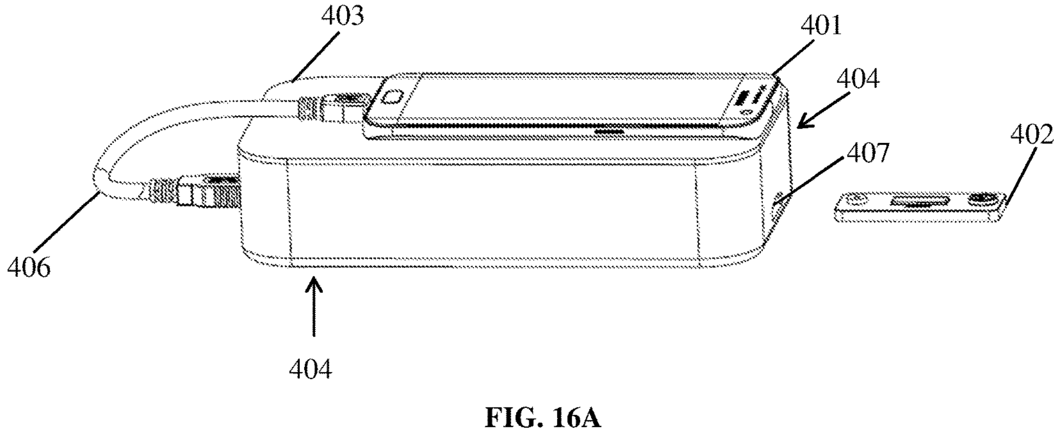
FIG. 16A shows a tilted top view of an exemplary compact device with a smart phone connected to the USB adapter with a cartridge to be inserted into a slot.

FIG. 16A shows a tilted top view of a compact device 404 having a flat top plate 403 capable of use with any computing device, such as a mobile phone 401. The compact device 404 also has a cartridge slot 407 configured to receive a cartridge 402. The compact device 404 is connected to the mobile phone 401 with a USB cord 406. The cartridge is inserted into the cartridge slot in order to test a sample. The cartridge 402 is removed from the cartridge slot 407 by pressing the cartridge 402 into the cartridge slot 407 and releasing.

Figure 16B:
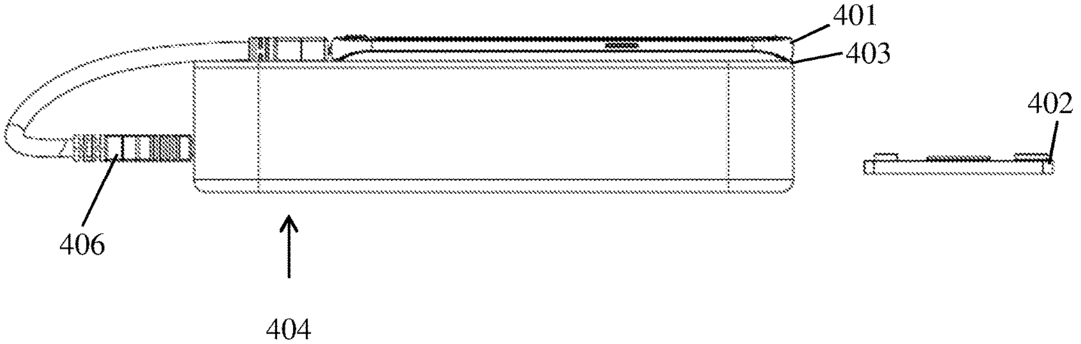
FIG. 16B shows a slide view of an exemplary compact device with a smart phone connected to the USB adapter with a cartridge to be inserted into a slot.

FIG. 16B shows a side view of a compact device 404 having a flat top plate 403, a mobile phone 401 connected to compact device 404 with a USB cord 406. A cartridge 402 is shown before insertion into a cartridge slot.

Figure 16C:
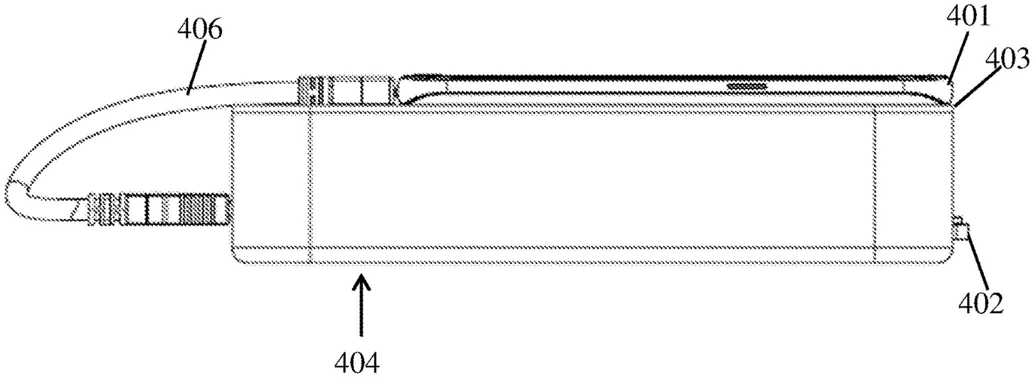
FIG. 16C shows a side view of an exemplary compact device with a smart phone connected to the USB adapter with a cartridge inserted into a slot.

FIG. 16C shows a side view of a compact device 404 having a flat top plate 403, a mobile phone 401 connected to compact device 404 with a USB cord 406. A cartridge 402 is shown inserted into a cartridge slot.

What is claimed is:

1. A fluidic cartridge configured to close upon activation, the fluidic cartridge comprising:

a. at least one inlet comprising a first self-sealing polymer;

b. a sample reservoir;

c. a reagent reservoir;

d. at least one bubble trap reservoir configured to trap air bubbles;

e. a detection window configured for analysis of the biological sample; and f. a waste reservoir, comprising at least one outlet comprising a second self-sealing polymer, wherein the sample reservoir and the reagent reservoir each comprise a sealing, gas-impermeable, removable cover, wherein the at least one inlet, reagent reservoir, sample reservoir, bubble trap reservoir, detection window, and waste reservoir are connected by a continuous fluidic channel, and wherein the first self-sealing polymer and second self-sealing polymer are activated upon contact with liquid to form a liquid-tight seal in the fluidic cartridge.

2. The fluidic cartridge of claim 1, wherein liquids in the sample reservoir and the reagent reservoir stay within the sample reservoir or the reagent reservoir until pressure is applied to the inlet.

3. The fluidic cartridge of claim 1, wherein the at least one inlet and the at least one outlet each further comprise: a port and a filter.

4. The fluidic cartridge of claim 3, wherein the port is an opening smaller than the inlet or outlet and the filter is a porous polyurethane filter.

5. The fluidic cartridge of claim 1, wherein the self-sealing polymer comprises a hydrophilic polyurethane, a hydrophilic polyurea, or a hydrophilic polyureaurethane.

6. The fluidic cartridge of claim 1, wherein the bubble trap reservoir is positioned downstream of and fluidly connected to the sample reservoir and the reagent reservoir by a continuous fluidic channel.

7. The fluidic cartridge of claim 1, further comprising two or more bubble trap reservoirs.

8. The fluidic cartridge of claim 7, wherein the two or more bubble trap reservoirs are sequentially connected by the continuous fluidic channel.

9. The fluidic cartridge of claim 1, wherein the size of the cross sectional area of the fluidic channel going into and out of the sample reservoir and the fluidic channel going into and out of the reagent reservoir provides sufficient fluidic resistance to prevent fluid in the sample reservoir or the reagent reservoir from leaving the reservoir without pressure applied to the inlet.

10. The fluidic cartridge of claim 1, wherein the bubble trap has a cross sectional area that is at least two times larger than a cross sectional area of the fluidic channel.

11. The fluidic cartridge of claim 1, wherein the fluidic channel has a cross sectional area of about 0.25 $mm^2$ and the bubble trap has a cross sectional area of about 8 $mm^2$.

12. The fluidic cartridge of claim 1, wherein the bubble trap has a length of at least 3 mm, a width of least 3 mm, and a height of least 1 mm.

13. The fluidic cartridge of claim 1, wherein the bubble trap has a length of at least 3 mm, a width of at least 5 mm, and a height of at least 1 mm.

14. The fluidic cartridge of claim 1, wherein the bubble trap has a maximum length of 7 mm, a maximum width of 10 mm, and a maximum height of 5 mm.

15. The fluidic cartridge of claim 1, wherein the bubble trap has a maximum length of 5 mm, a maximum width of 8 mm, and a maximum height of 3 mm.

16. The fluidic cartridge of claim 1, wherein the bubble trap is a cylinder or sphere, the cylinder or sphere having a diameter of at least 3 mm.

17. The fluidic cartridge of claim 1, wherein the bubble trap is a cylinder or sphere, the cylinder or sphere having a diameter of at least 5 mm.

18. A compact device for isolating nanoscale analytes in a sample, the compact device comprising:

a. a housing;

b. an optical pathway;

c. a fluid-moving mechanism;

d. an electronic chip; and e. the fluidic cartridge system of claim 1;

wherein the compact device is controlled by a mobile computing device and the compact device has a power requirement of no more than 5 Watts.

19. The compact device of claim 18, wherein the analyte in the sample is detected with a camera on the mobile computing device and the camera produces an image that is analyzed by the mobile computing device.

20. The compact device of claim 18, wherein the fluid-moving mechanism comprises a pump, wherein the pump is a syringe, a peristaltic pump, or a piezo pump.

21. The compact device of claim 18, wherein the electronic chip is configured to control the fluidic cartridge and to apply an electric current to the sample.

22. The compact device of claim 18, wherein the fluidic cartridge further comprises a plurality of alternating current (AC) electrodes configured to be selectively energized to establish dielectrophoretic (DEP) high field and dielectrophoretic low field regions, wherein AC electrokinetic effects separate nanoscale analytes from larger molecular entities.

23. The compact device of claim 18, wherein the fluidic cartridge is inserted into a fluidic cartridge slot of the compact device.

24. A system for detecting analytes or other microparticulates in a sample, the system comprising:

a. a compact device comprising: a housing, an optical pathway, a fluid-moving mechanism, and an electrical chip;

b. a mobile computing device comprising: at least one processor, a memory, and an operating system configured to perform executable instructions; and c. the fluidic cartridge of claim 1, wherein the compact device is configured to receive a mobile computing device and a fluidic cartridge; and wherein the compact device positions the mobile computing device and the fluidic cartridge relative to each other to detect analytes or other microparticulates in the sample.

25. The system of claim 24, wherein the mobile computing device is a smart phone, a tablet computer, or a laptop computer.

26. The system of claim 24, wherein the mobile computing device comprises a connection port that connects to the compact device via a charging port, a USB port, or a headphone port of the mobile computing device.

27. The system of claim 24, wherein the compact device is powered by the mobile computing device, a battery, a solar panel, or a wall outlet.

28. The system of claim 24, wherein the analyte or other microparticulates in the sample are detected with a camera on the mobile computing device.

* * * * *